United States Patent
Segawa et al.

(10) Patent No.: US 11,648,978 B2
(45) Date of Patent: May 16, 2023

(54) TORQUE TRANSMISSION JOINT AND ELECTRIC-POWERED POWER STEERING APPARATUS

(71) Applicant: NSK LTD., Tokyo (JP)

(72) Inventors: Toru Segawa, Maebashi (JP); Ryou Oosawa, Maebashi (JP); Toru Ishii, Maebashi (JP); Ryota Sugihara, Maebashi (JP); Takeshi Yamamoto, Maebashi (JP); Akihide Fujita, Maebashi (JP)

(73) Assignee: NSK, LTD., Tokyo (JP)

( * ) Notice: Subject to any disclaimer, the term of this patent is extended or adjusted under 35 U.S.C. 154(b) by 908 days.

(21) Appl. No.: 16/492,268

(22) PCT Filed: Mar. 28, 2018

(86) PCT No.: PCT/JP2018/012668
§ 371 (c)(1),
(2) Date: Sep. 9, 2019

(87) PCT Pub. No.: WO2018/181437
PCT Pub. Date: Oct. 4, 2018

(65) Prior Publication Data
US 2021/0139072 A1    May 13, 2021

(30) Foreign Application Priority Data

Mar. 7, 2017 (JP) .............................. JP2017-130198
Mar. 30, 2017 (JP) .............................. JP2017-069363
(Continued)

(51) Int. Cl.
*B62D 5/04* (2006.01)
*F16D 3/74* (2006.01)

(52) U.S. Cl.
CPC ......... *B62D 5/0409* (2013.01); *B62D 5/0454* (2013.01); *F16D 3/74* (2013.01)

(58) Field of Classification Search
CPC .. B62D 5/0409; B62D 5/0454; B62D 5/0472; F16D 3/74
See application file for complete search history.

(56) References Cited

U.S. PATENT DOCUMENTS 4,613,316 A    9/1986 Reynolds
5,738,585 A    4/1998 Hoyt, III
(Continued)

FOREIGN PATENT DOCUMENTS

CN    201256417 Y    6/2009
EP    2918862          9/2015
(Continued)

OTHER PUBLICATIONS

International Search Report for International Application No. PCT/JP2018/012668, dated Jun. 19, 2018, (1 page).
(Continued)

*Primary Examiner* — Tony H Winner
(74) *Attorney, Agent, or Firm* — Hartman Global IP Law; Gary M. Hartman; Domenica N. S. Hartman

(57) ABSTRACT

A torque transmission joint to suppress occurrence of noise when reversing the direction of rotation of a drive shaft. A first transmission member fixed to an output shaft (the drive shaft) is engaged with a first elastic member such that a first gap in a circumferential direction is interposed, as well as with an intermediate transmission member such that a larger gap in the circumferential direction is interposed. A second transmission member fixed to an end portion of a worm is engaged with a second elastic member such that a second gap in the circumferential direction is interposed, as well as with the intermediate transmission member such that a
(Continued)

larger gap in the circumferential direction is interposed. First and second annular convex portions are fitted to, respectively, first and second concave portions to prevent separation of the first and second elastic members with respect to the intermediate transmission member.

28 Claims, 53 Drawing Sheets

(30) Foreign Application Priority Data

Oct. 17, 2017 (JP) .............................. JP2017-201226
Mar. 2, 2018 (JP) .............................. JP2018-037168

(56) References Cited

U.S. PATENT DOCUMENTS

| | | | | |
|---|---|---|---|---|
| 8,505,675 | B2* | 8/2013 | Suzuki | B62D 5/0409 |
| | | | | 180/444 |
| 9,787,903 | B2* | 10/2017 | Yazawa | H04N 5/2328 |
| 9,937,949 | B2* | 4/2018 | Kikuchi | F16H 55/22 |
| 11,015,656 | B2* | 5/2021 | Ishii | F16H 1/16 |
| 11,104,371 | B2* | 8/2021 | Yoshida | F16D 3/68 |
| 2008/0063827 | A1* | 3/2008 | Clarke | C08G 18/10 |
| | | | | 428/36.9 |
| 2014/0116608 | A1* | 5/2014 | Sato | F16D 3/68 |
| | | | | 156/245 |
| 2014/0295978 | A1* | 10/2014 | Louwersheimer | F16D 3/54 |
| | | | | 464/87 |
| 2017/0058991 | A1* | 3/2017 | Kim | F16F 1/377 |
| 2017/0114837 | A1 | 4/2017 | Yamaguchi et al. | |
| 2017/0175821 | A1 | 6/2017 | Segawa et al. | |

FOREIGN PATENT DOCUMENTS

| | | |
|---|---|---|
| EP | 3412925 | 12/2018 |
| EP | 3453906 | 3/2019 |
| EP | 3499070 | 6/2019 |
| JP | 2004149070 | 5/2004 |
| JP | 201732105 | 2/2017 |
| WO | 2015190054 | 12/2015 |
| WO | 2016047643 | 3/2016 |

OTHER PUBLICATIONS

European Search Report—PCT/JP2018012668, dated Oct. 5, 2020, 11 pages.
First Office Action, for 201880020382.0, dated Jun. 16, 2021, (English/ Chinese), 19 pages.

* cited by examiner

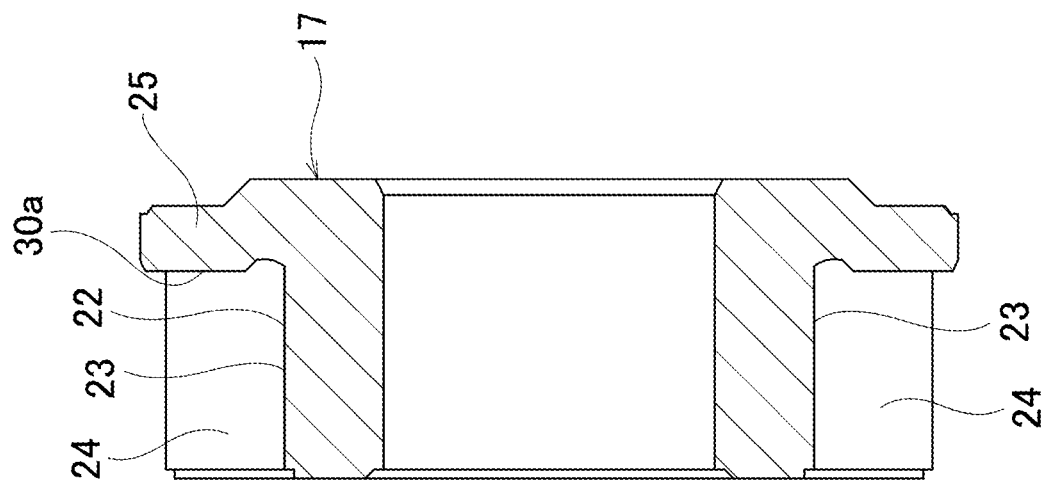
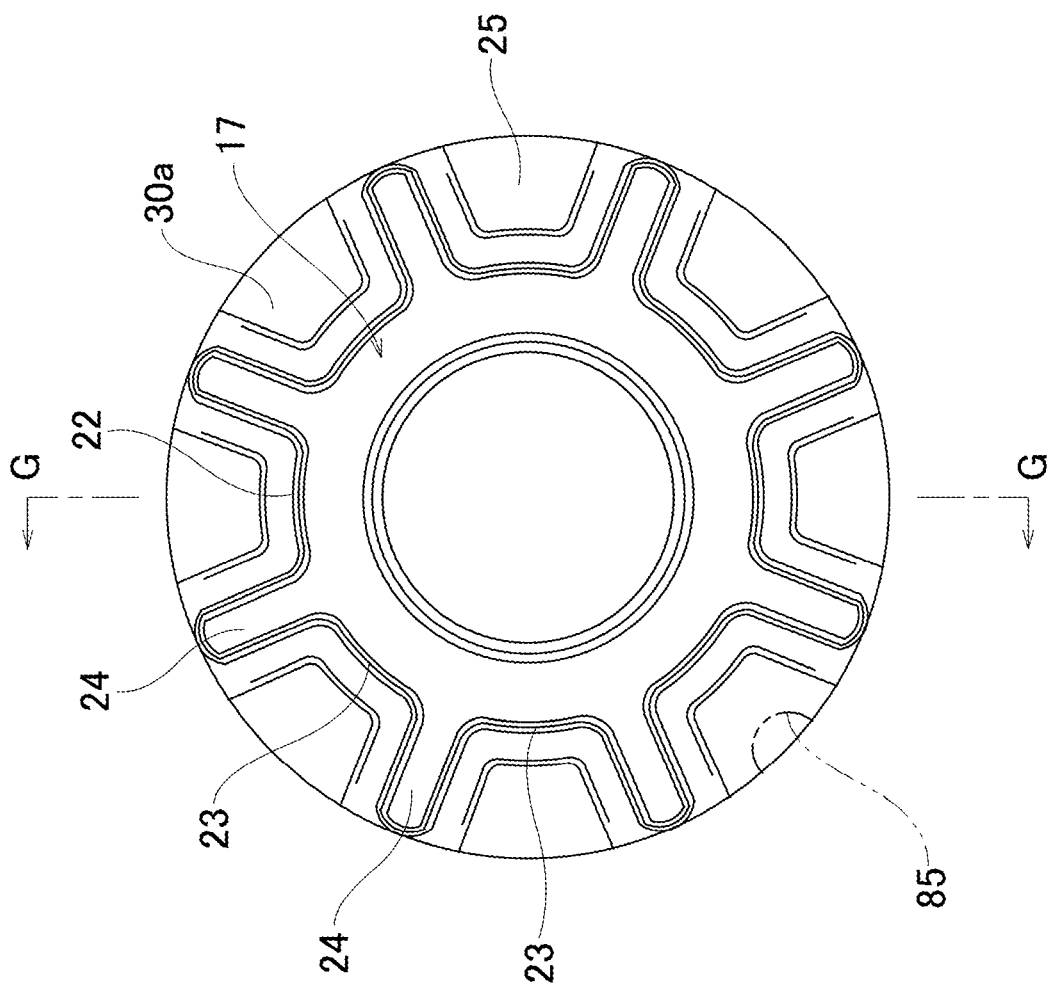

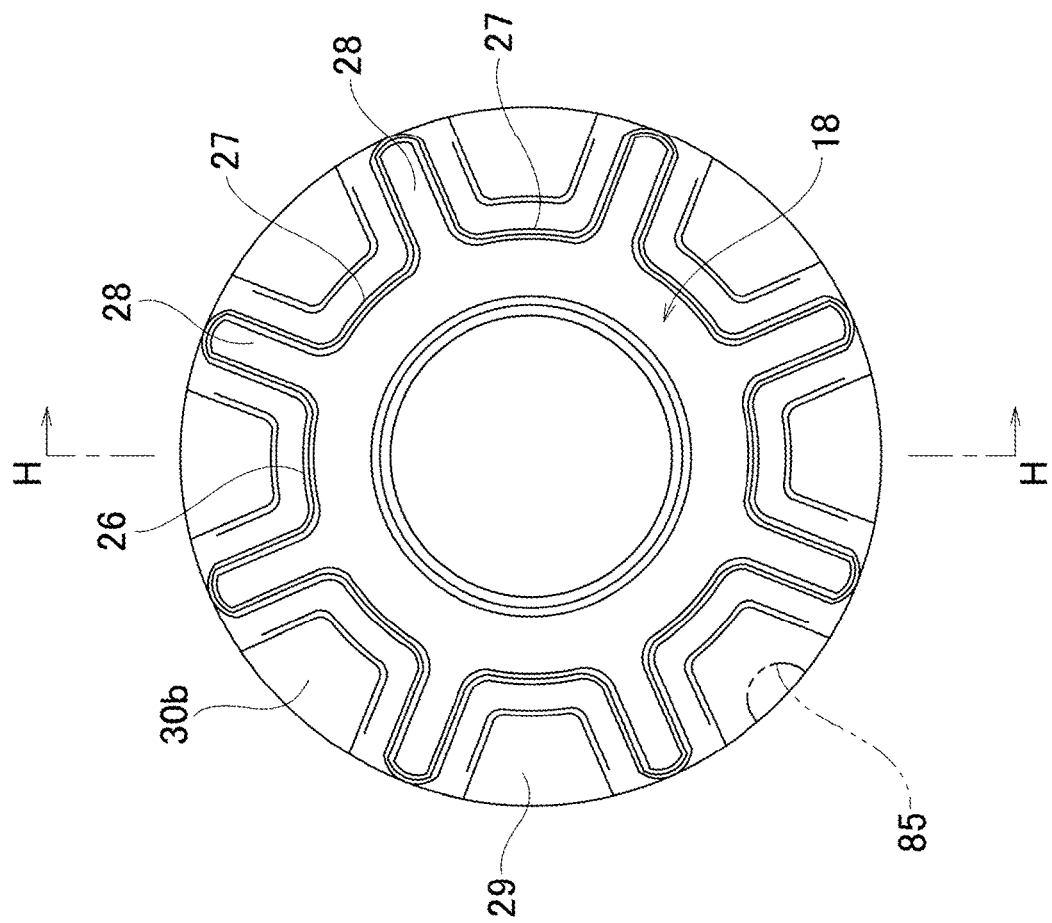
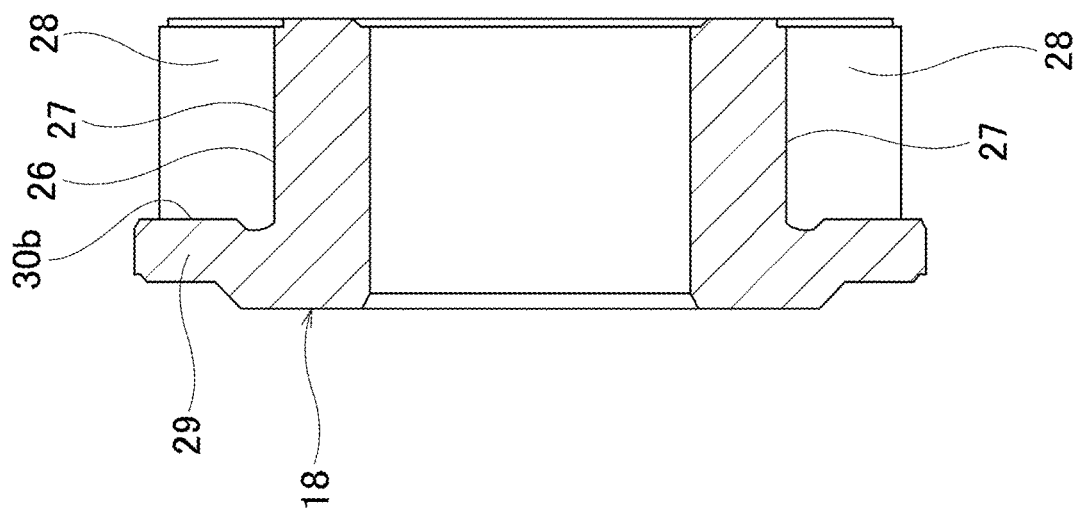

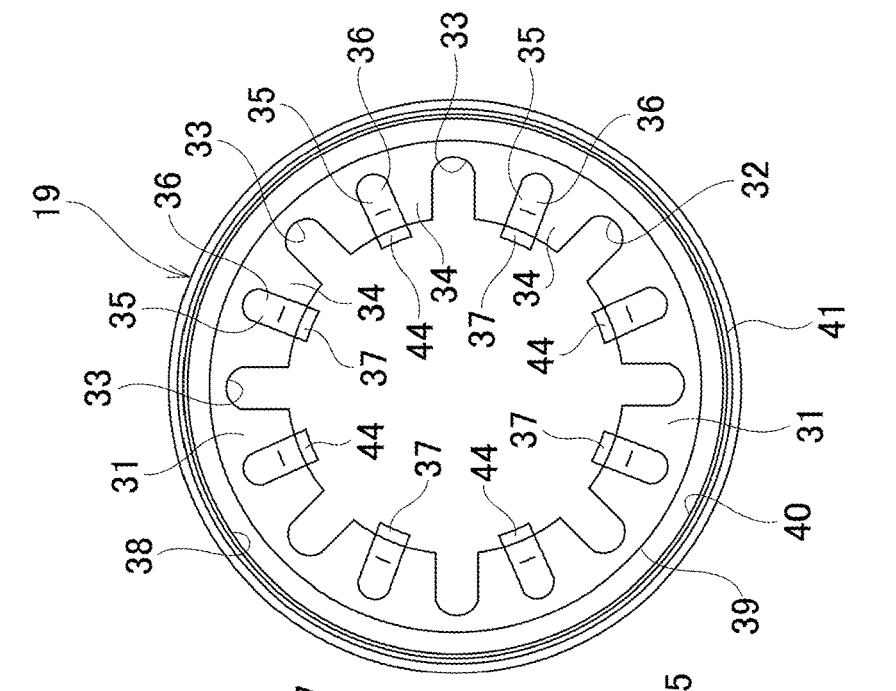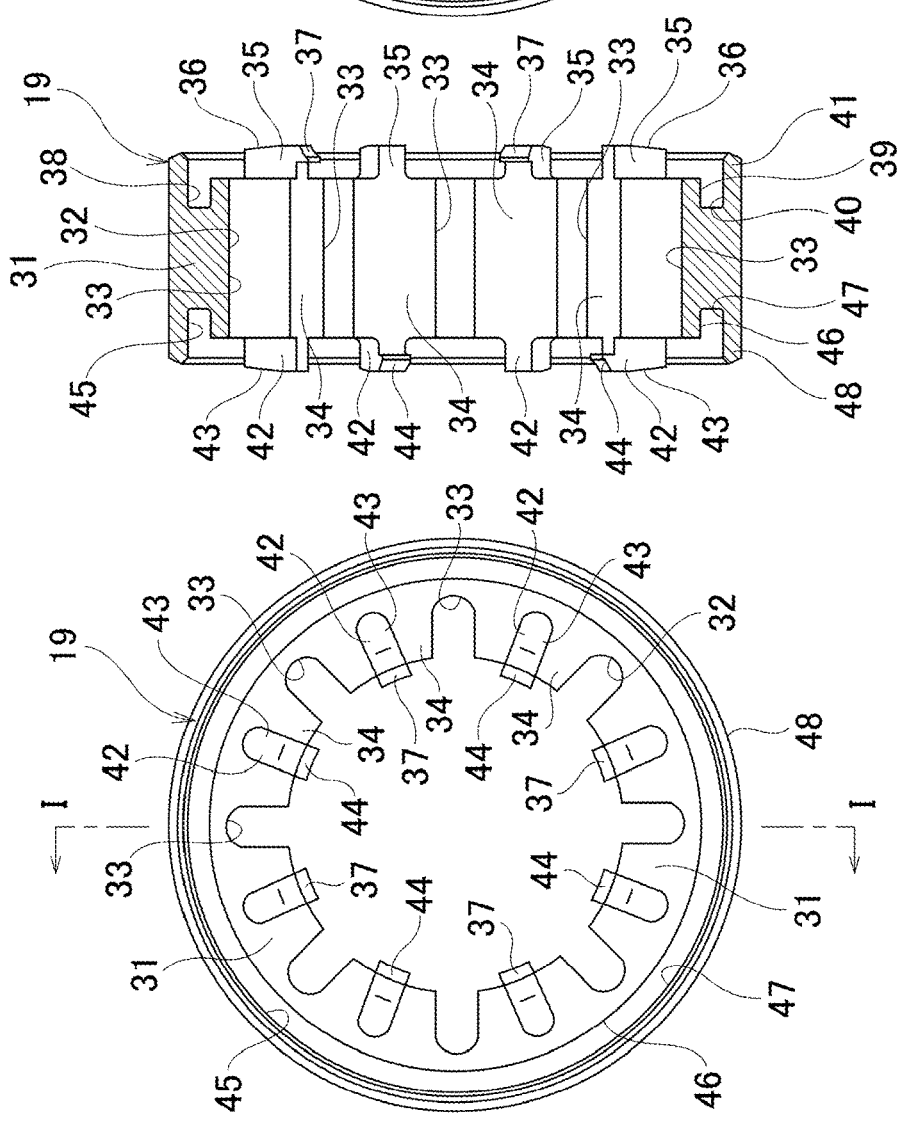

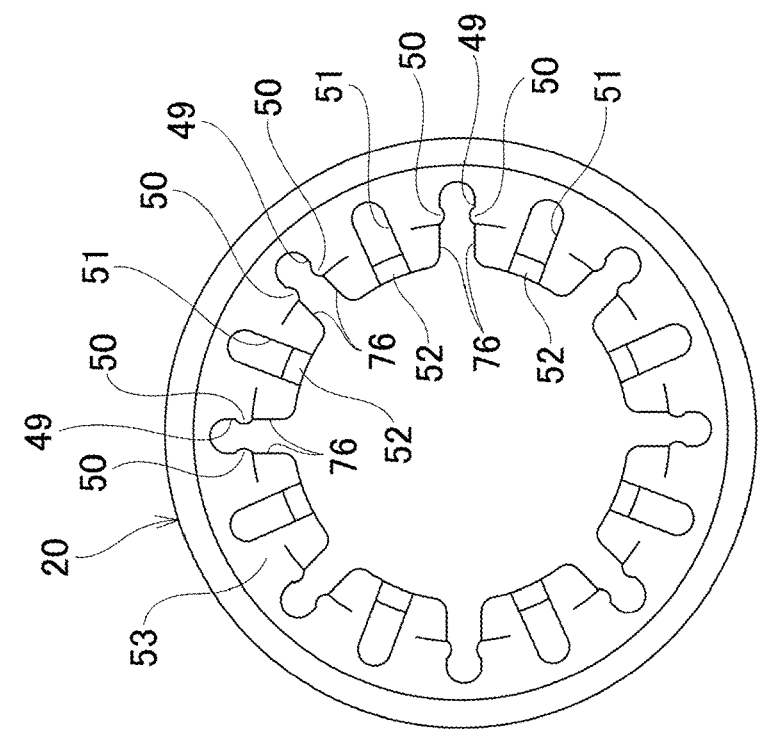
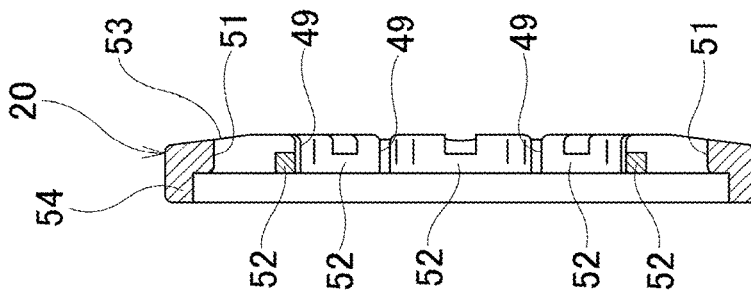
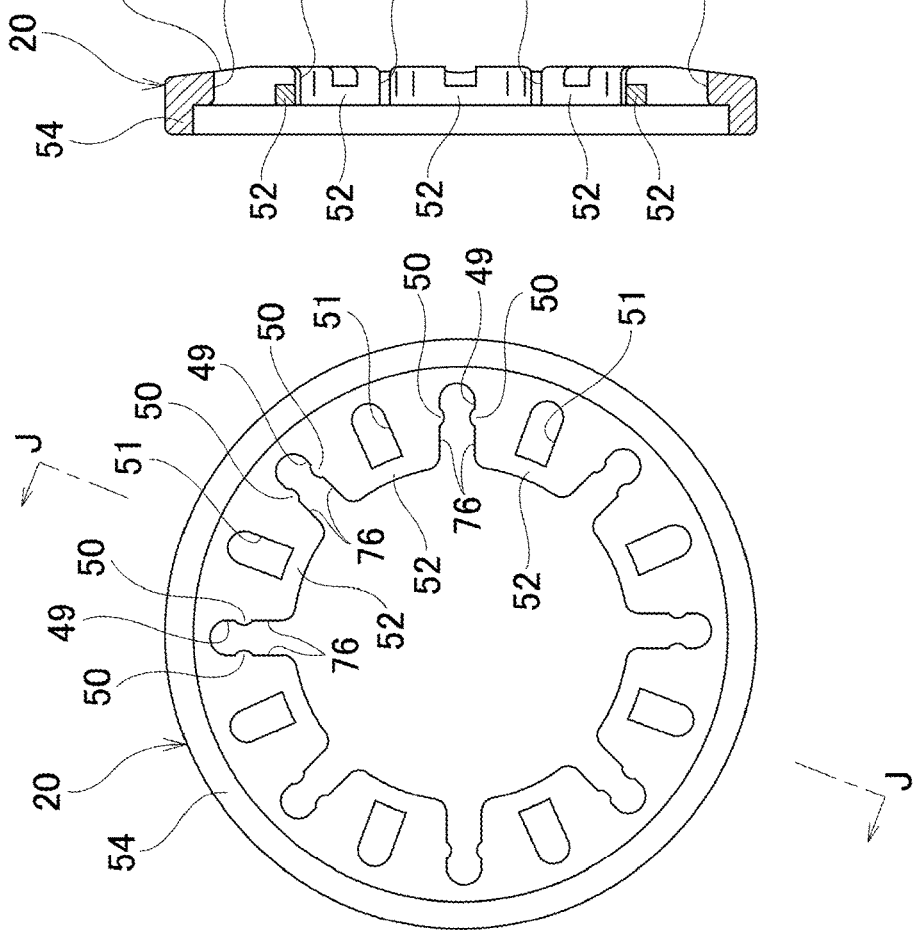

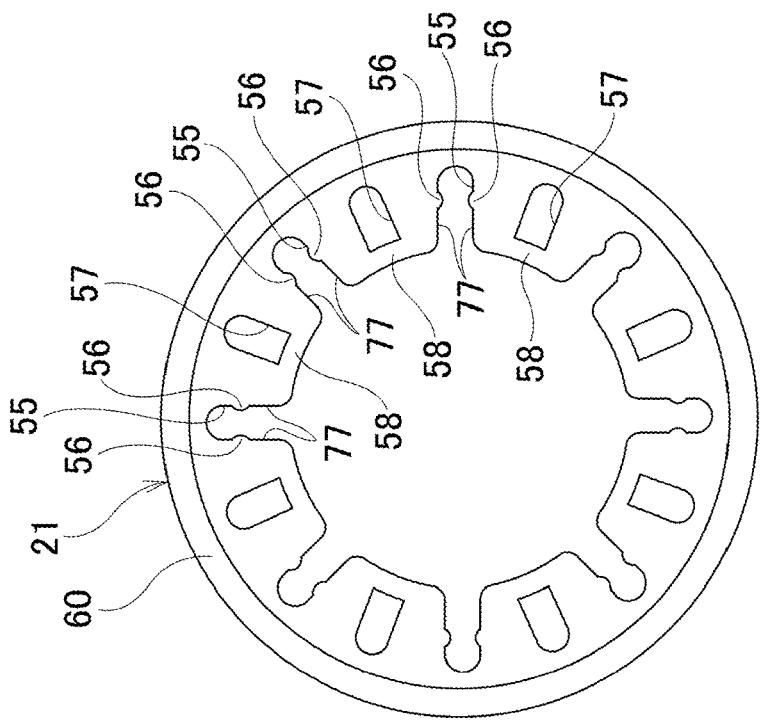
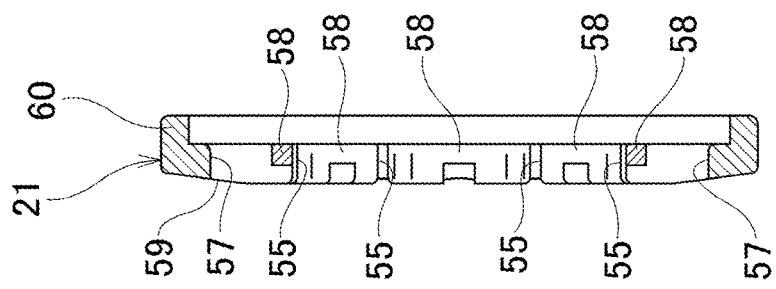
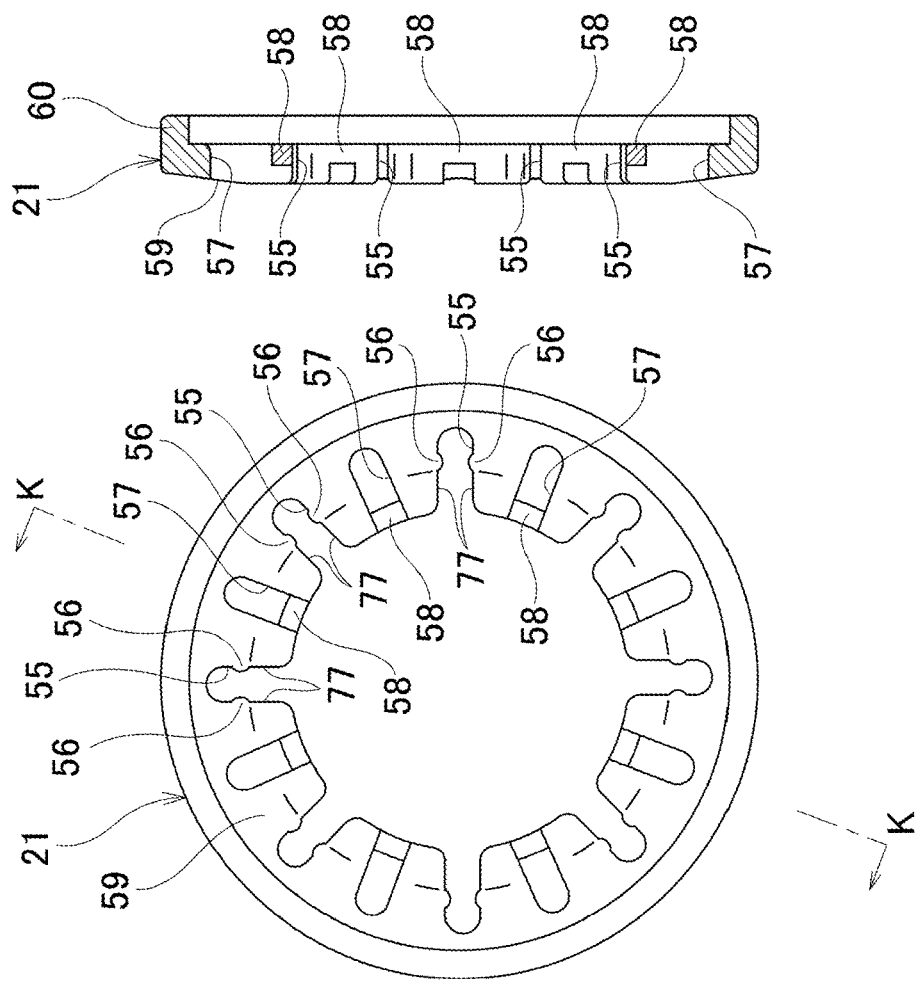

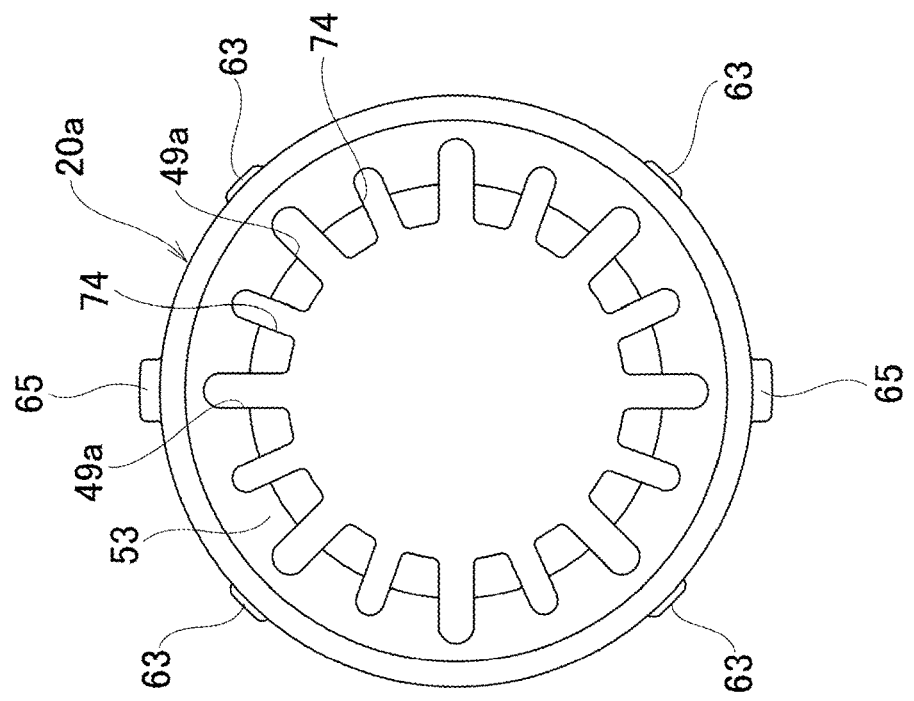
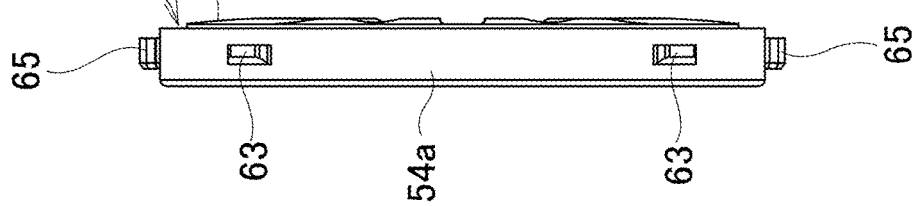
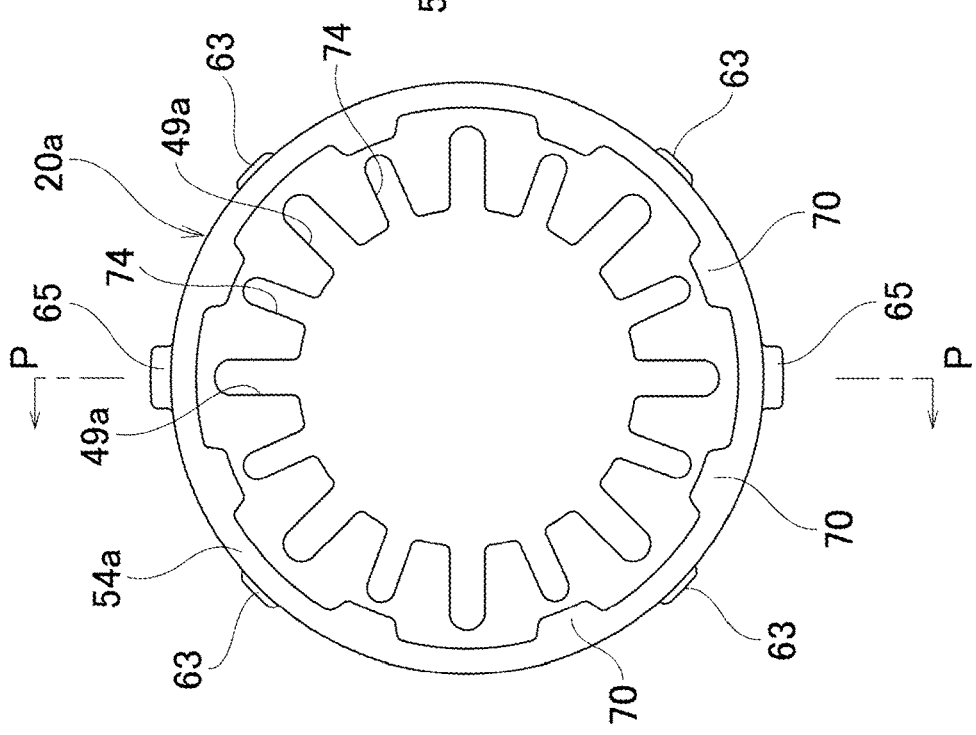

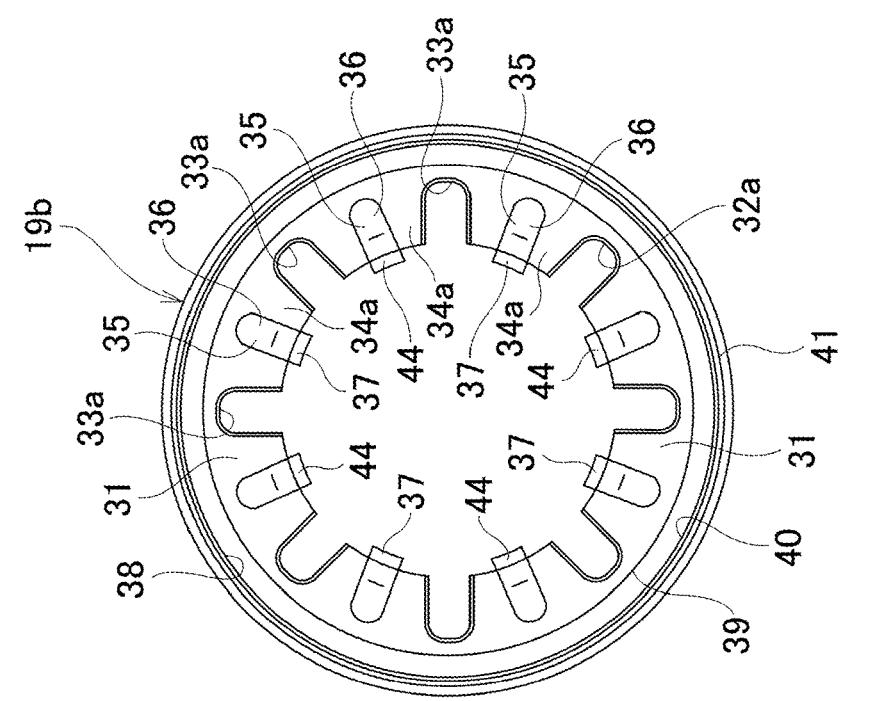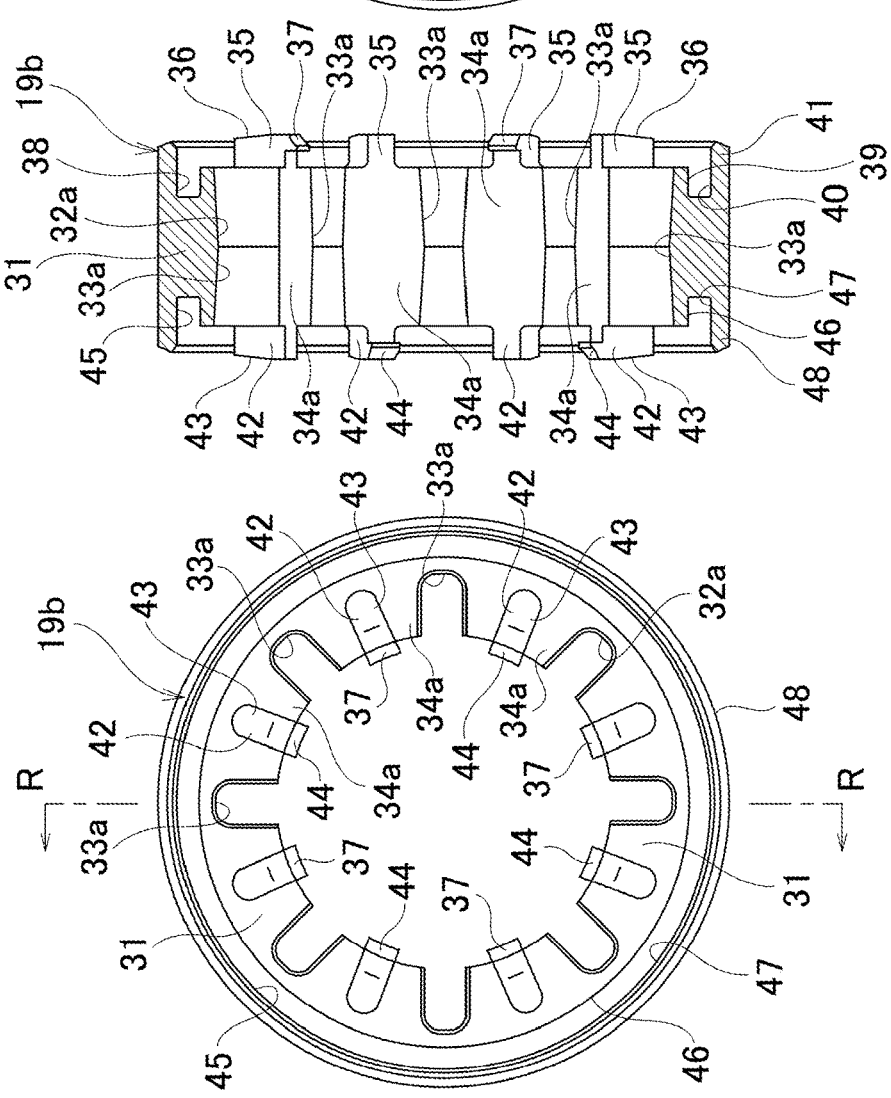

TORQUE TRANSMISSION JOINT AND ELECTRIC-POWERED POWER STEERING APPARATUS

CROSS REFERENCE TO RELATED APPLICATIONS

This application claims the benefit of PCT/JP2018/012668 filed Mar. 28, 2018, having a priority claim to Japanese Patent Application Nos. 2017-069363 filed Mar. 30, 2017, 2017-130198 filed Mar. 7, 2017, 2017-201226 filed Oct. 17, 2017, and 2018-037168 filed Mar. 2, 2018. The contents of these prior patent documents are incorporated herein by reference.

TECHNICAL FIELD

The present invention relates to a torque transmission joint that is assembled in various kinds of machinery for transmitting torque between a drive shaft and a driven shaft, and relates to an electric-powered power steering apparatus that includes the torque transmission joint.

BACKGROUND ART

FIG. 52 and FIG. 53 illustrate an example of an electric-powered power steering apparatus that is conventionally known as it is described in JP 2004306898 (A) and the like. The front-end section of a steering shaft 2 to which a steering wheel 1 has been attached to the rear end portion is rotatably supported on the inside of a housing 3, and a worm wheel 4 is fastened to a section that is rotated and driven by this steering shaft 2. A worm 8 having a worm shaft 6 and worm teeth 5 that are provided in the middle section in the axial direction of the worm shaft 6 and engage with the worm wheel 4. The worm 8 is rotated and driven by an electric motor 7. Both end sections in the axial direction of the worm 8 are rotatably supported inside the housing 3 by a pair of rolling bearings 9a, 9b such as deep-groove ball bearings. A pressure piece 10 is fitted around the outside of a portion of the tip-end section of the worm shaft 6 that protrudes out further than the rolling bearing 9a, and an elastic member such as a coil spring 11 is provided between the pressure piece 10 and the housing 3. The coil spring 11 presses the worm teeth 5 that are provided on the worm shaft 6 toward the worm wheel 4 by way of the pressure piece 10. With this kind of construction, backlash that occurs between the worm teeth 7 and the worm wheel 4 is suppressed, and the occurrence of chattering is reduced.

In the conventional electric-powered power steering apparatus, although it is possible to suppress chattering that occurs at the meshing portion between the warm teeth 5 and the warm wheel 4, there is room for improvement to suppress noise that occurs at the joint between the tip-end section of the output shaft 12 of the electric motor 7 and the base-end section of the worm shaft 6. This point is explained as follows.

In the conventional electric-powered power steering apparatus, the tip-end section of the output shaft 12 of the electric motor 7 and the base-end section of the worm shaft 6 are joined so that torque can be transmitted by spline engagement between a spline hole 13 that is provided in the base-end section of the worm shaft 6 and a spline shaft section 14 that is provided on the tip-end section of the output shaft 12. As long as the spline shaft section 14 and the spline hole 13 engage as spline engagement with no space between them in the circumferential direction (i.e. no backlash), noise will not occur at the spline engagement section between the tip-end section of the output shaft 12 and the base-end section of the worm shaft 6. However, in actuality, there is backlash in the spline engagement section. Particularly, in construction for suppressing backlash between the worm teeth 5 and the worm wheel 4, it is necessary to allow for rocking displacement of the worm shaft 6, so it is not possible to completely eliminate backlash in the spline engagement section. Thus, there is room for improvement to suppress the occurrence of noise due to the existence of the backlash when reversing the direction of rotation of the output shaft 12 of the electric motor 7.

On the other hand, JP 2012131249 (A) describes construction where pivotal displacement of the worm shaft can be smoothly done by joining the output shaft of the electric motor and the worm shaft via a cylindrical power transmission member made of metal. However, even in such construction, in order to allow for rocking displacement of the worm shaft, backlash exists in the spline engagement section between the spline shaft section provided at both end sections of the power transmission member and the spline hole provided at each end section of the worm shaft and the output shaft of the electric motor. Therefore, there is room for improvement to suppress the occurrence of noise due to the existence of such backlash.

RELATED LITERATURE

Patent Literature

[Patent Literature 1] JP 2004306898 (A)
[Patent Literature 2] JP 2012131249 (A)

SUMMARY OF INVENTION

The object of the present invention is to provide a torque transmission joint that is able to suppress occurrence of noise when reversing the direction of rotation of a drive shaft.

The torque transmission joint of the present invention comprises a combined body and a couple of end transmission members.

The combined body comprises an intermediate transmission member having an intermediate uneven section with concave portions and convex portions alternately arranged in the circumferential direction, and a couple of elastic members made of elastic material are respectively assembled to the intermediate transmission member at both sides in the axial direction of the combined body and respectively have elastic slits provided at a plurality of positons in the circumferential direction that are in the same phase with the concave portions of the intermediate uneven section. Every space in the circumferential direction of both side edges in the circumferential direction of the elastic slits is made smaller than every space in the circumferential direction of both side edges in the circumferential direction of the concave portions of the intermediate uneven section.

The couple of end transmission members are respectively inserted and arranged in both side sections in the axial direction of the combined body and the couple of end transmission members respectively has an end uneven section with concave portions and convex portions alternately arranged in the circumferential direction.

At each of the both side sections in the axial direction of the combined body, the convex portions of the end uneven section engage with the elastic slits as well as engage with the concave portions of the intermediate uneven section with a gap intervening in the circumferential direction therebetween.

In at least one of the both side sections in the axial direction of the combined body, one of the intermediate transmission member and one elastic member of the couple of elastic members has a concave portion in the circumferential direction that is opened in the axial direction and extends in the circumferential direction, and the other of the intermediate transmission member and the one elastic member has a convex portion in the circumferential direction that protrudes in the axial direction and extends in the circumferential direction, and the convex portion in the circumferential direction contacts to at least one circumferential surface of both circumferential surfaces in the radial direction of an inner surface of the concave portions in the circumferential direction elastically, that is, with an interference provided therebetween.

In the present invention, it is possible to employ the following construction in at least one of the both side sections in the axial direction of the combined body. That is, the intermediate transmission member has a cylindrical portion that is provided at an outside portion in the axial direction of an outer end portion in the radial direction. The elastic member is covered with the cylindrical portion.

In this case, it is possible to employ construction such as follows. That is, the intermediate transmission member has a through-hole that is provided in the cylindrical portion so as to penetrate the cylindrical portion in the radial direction. The elastic member has a main convex portion that engages with the through-hole.

In this case, it is possible to employ construction such as follows. That is, the intermediate transmission member has a notch that is opened to an outer edge in the axial direction of the cylindrical portion. The elastic member has a sub convex portion that engages with the notch.

In the present invention, it is possible to employ construction such as follows in at least one of the both side sections in the axial direction of the combined body. That is, the convex portion in the circumferential direction has a protruding section that protrudes in the radial direction in at least one place in the circumferential direction. The concave portion in the circumferential direction has an engaging concave portion that is opened in the radial direction and the axial direction and engages with the protruding section.

In the present invention, it is possible to employ construction such as follows in at least one of the both side sections in the axial direction of the combined body. That is, in at least one place in the circumferential direction of at least one circumferential surface of the circumferential surfaces of the concave portion in the circumferential direction and the circumferential surfaces of the convex portion in the circumferential direction, a communication concave portion that does not contact the other circumferential surface (opponent circumferential surface) thereof that faces in the radial direction is provided over the entire length in the axial direction.

In this case, it is possible to employ construction such as follows. That is, the communication concave portion is provided at a plurality of places in the circumferential direction of the at least one circumferential surface, and every width dimension in the circumferential direction of portions that are located between the communication concave portions that are adjacent in the circumferential direction is made smaller than every width dimension in the circumferential direction of the communication concave portions.

In the present invention, it is possible to employ construction such as follows in at least one of the both side sections in the axial direction of the combined body. That is, the intermediate transmission member has a tooth section that protrudes in the axial direction in at least one place in the circumferential direction of the outside surface in the axial direction. The elastic member has a section with material removed that engages at least in the circumferential direction with the tooth section.

In the present invention, it is possible to employ construction such as follows in at least one of the both side sections in the axial direction of the combined body. That is, the intermediate transmission member has an engaging projection that protrudes from one side surface in the radial direction of the tooth section. The elastic member engages with an inside surface in the axial direction of the engaging projection.

In the present invention, it is possible to employ construction such as follows in at least one of the both side sections in the axial direction of the combined body. That is, every inner surface of the concave portions of the intermediate uneven section is inclined to the direction where the cross sectional area of the concave portion becomes larger toward outside in the axial direction.

In the present invention, it is possible to employ construction such as follows. That is, the concave portion in the circumferential direction and the convex portion in the circumferential direction are provided over the whole circumference (continuous over the entire circumference). Alternatively, the concave portion in the circumferential direction is provided over the whole circumference, and the convex portion in the circumferential direction is provided in a plurality of places that are arranged apart from one another in the circumferential direction. Further, the bottom end section in the axial direction of the concave portion in the circumferential direction and the tip end section in the axial direction of the convex portion in the circumferential direction are ultrasonically welded.

In the present invention, it is possible to employ construction such as follows in at least one of the both side sections in the axial direction of the combined body. That is, a tilted side surface section is provided in the outside surface in the axial direction, in which the tilted side surface section is inclined inwards in the axial direction (center side of the combined body in the axial direction) towards the other side in the radial direction.

In the present invention, it is possible to employ construction such as follows in at least one of the both side sections in the axial direction of the combined body. That is, a side surface for positioning that contacts or closely faces the outside surface in the axial direction of the combined body is provided on the end transmission member.

The electric-powered power steering apparatus of the present invention comprises a housing, a worm wheel, a worm, an electric motor, and a torque transmission joint. The worm wheel is rotatably supported to the housing. The worm comprises a worm shaft and worm teeth that are provided on an outer circumferential surface of the worm shaft. The worm is rotatably supported to the housing in a state meshed with the worm wheel. The electric motor has an output shaft for rotating and driving the worm. The torque transmission joint connects the output shaft of the electric motor and the worm shaft so as to enable torque transmission.

Especially, in the electric-powered power steering apparatus of the present invention, the torque transmission joint is constructed by the torque transmission joint of the present invention, and one of the couple of end transmission members is fixed to or formed to be integral with the tip-end section of the output shaft of the electric motor. The other of the couple of end transmission members is fixed to or formed to be integral with the base-end section of the warm shaft.

In the electric-powered power steering apparatus of the present invention, it is possible to employ construction such as follows. That is, the couple of end transmission members respectively have a side surface for positioning, and the distance in the axial direction between the side surfaces for positioning of the couple of end transmission members is made to be larger than the width dimension in the axial direction of the combined body.

In the electric-powered power steering apparatus of the present invention, the worm is pilotable with respect to the output shaft of the electric motor, and it is possible to employ construction having a biasing mechanism that biases the worm towards the worm wheel and is provided between the tip-end section of the worm shaft and the housing.

According to the torque transmission joint and electric-powered power steering apparatus of the present invention, of a drive shaft to which either one of a couple of end transmission members is fixed or integrally formed, and a driven shaft to which the other of the couple of end transmission members is fixed or integrally formed, it is possible to suppress occurrence of noise when reversing the direction of rotation of the drive shaft.

BRIEF DESCRIPTION OF DRAWINGS

FIG. 13(a) and FIG. 13(b) show the first transmission member of the first example. FIG. 13(a) is a figure which is viewed from left in FIG. 13(b), and FIG. 13(b) is a G-G cross sectional view of FIG. 13(a).

FIG. 14(a) and FIG. 14(b) show the second transmission member of the first example. FIG. 14(a) is a cross sectional view taken along the line H-H of FIG. 14(b), and FIG. 14(b) is a figure which is viewed from right in FIG. 14(a).

FIG. 15(a) through FIG. 15(c) show an intermediate transmission member of the first example. FIG. 15(a) is a figure which is viewed from left in FIG. 15(b), FIG. 15(b) is a cross sectional view taken along the line I-I of FIG. 15(a), and FIG. 15(c) is a figure which is viewed from right in FIG. 15(b).

FIG. 16(a) through FIG. 16(c) show the first elastic member of the first example. FIG. 16(a) is a figure which is viewed from left in FIG. 16(b), FIG. 16(b) is a cross sectional view taken along the line J-J of FIG. 16(a), and FIG. 16(c) is a figure which is viewed from right in FIG. 16(b).

FIG. 17(a) through FIG. 17(c) show the second elastic member of the first example. FIG. 17(a) is a figure which is viewed from left in FIG. 17(b), FIG. 17(b) is a cross sectional view taken along the line K-K of FIG. 17(a), and FIG. 17(c) is a figure which is viewed from right in FIG. 17(b).

FIG. 24(a) is a figure which is viewed from left in FIG. 24(b), FIG. 24(b) is a figure which is viewed from right in FIG. 24(a), and FIG. 24(c) is a figure which is viewed from right in FIG. 24(b).

FIG. 27(a) through FIG. 27(c) show the first elastic member of the second example. FIG. 27(a) is a figure which is viewed from left in FIG. 27(b), FIG. 27(b) is a figure which is viewed from right in FIG. 27(a), and FIG. 27(c) is a figure which is viewed from right in FIG. 27(b).

FIG. 28(a) is a figure which is viewed from left in FIG. 28(b), FIG. 28(b) is a figure which is viewed from right in FIG. 28(a), and FIG. 28(c) is a figure which is viewed from right FIG. 28(b).

FIG. 30 shows an intermediate transmission of the third example of an embodiment of the present invention. FIG. 30(a) is a figure which is viewed from left in FIG. 30(b), FIG. 30(b) is a cross sectional view taken along the line R-R of FIG. 30(a), and FIG. 30(c) is a figure which is viewed from right in FIG. 30(b).

MODES FOR CARRYING OUT INVENTION

First Example

Figure 52:
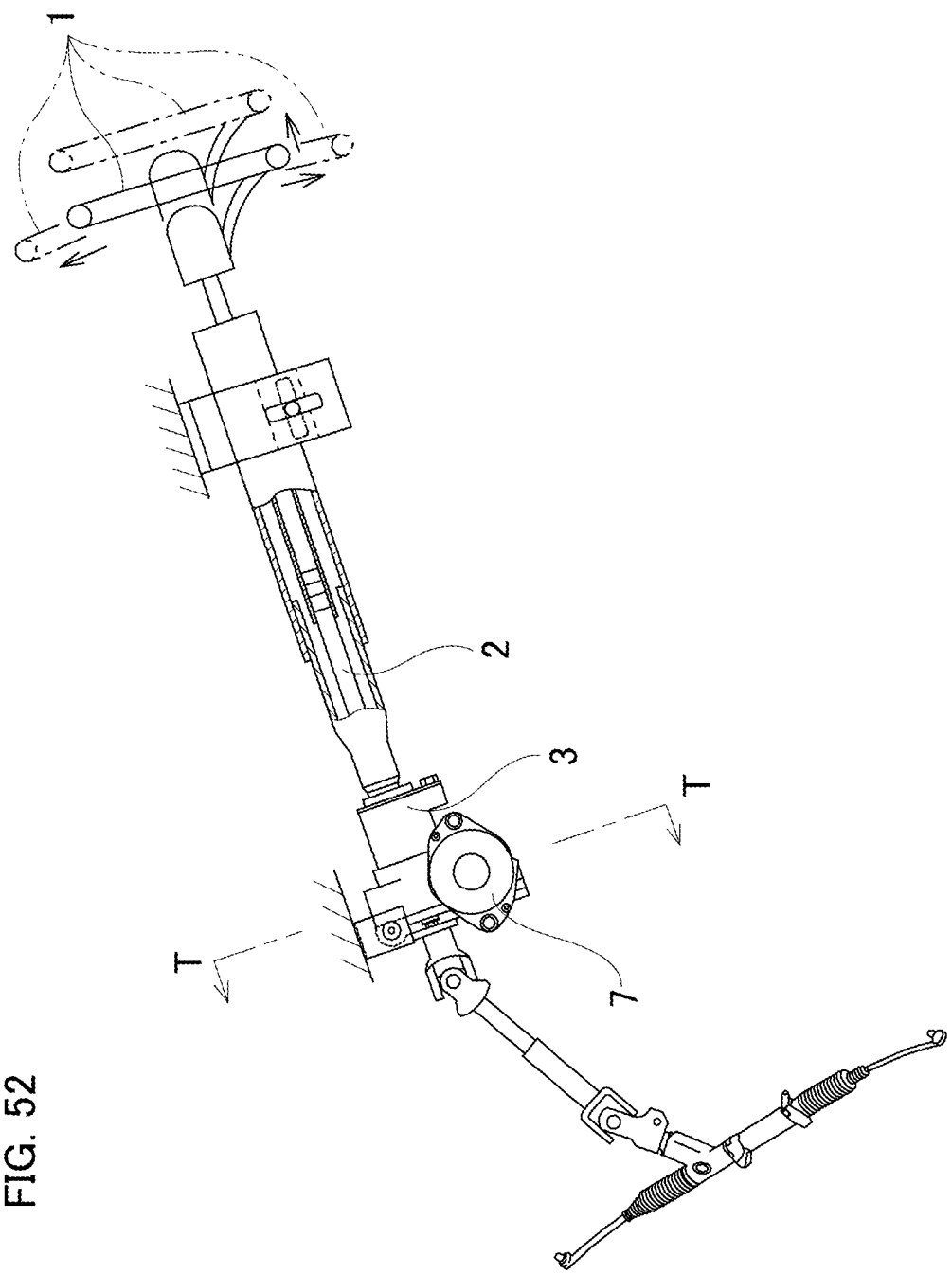
FIG. 52 is a partially cut side view illustrating an example of a conventional construction of an electric-powered power steering apparatus.
Figure 53:
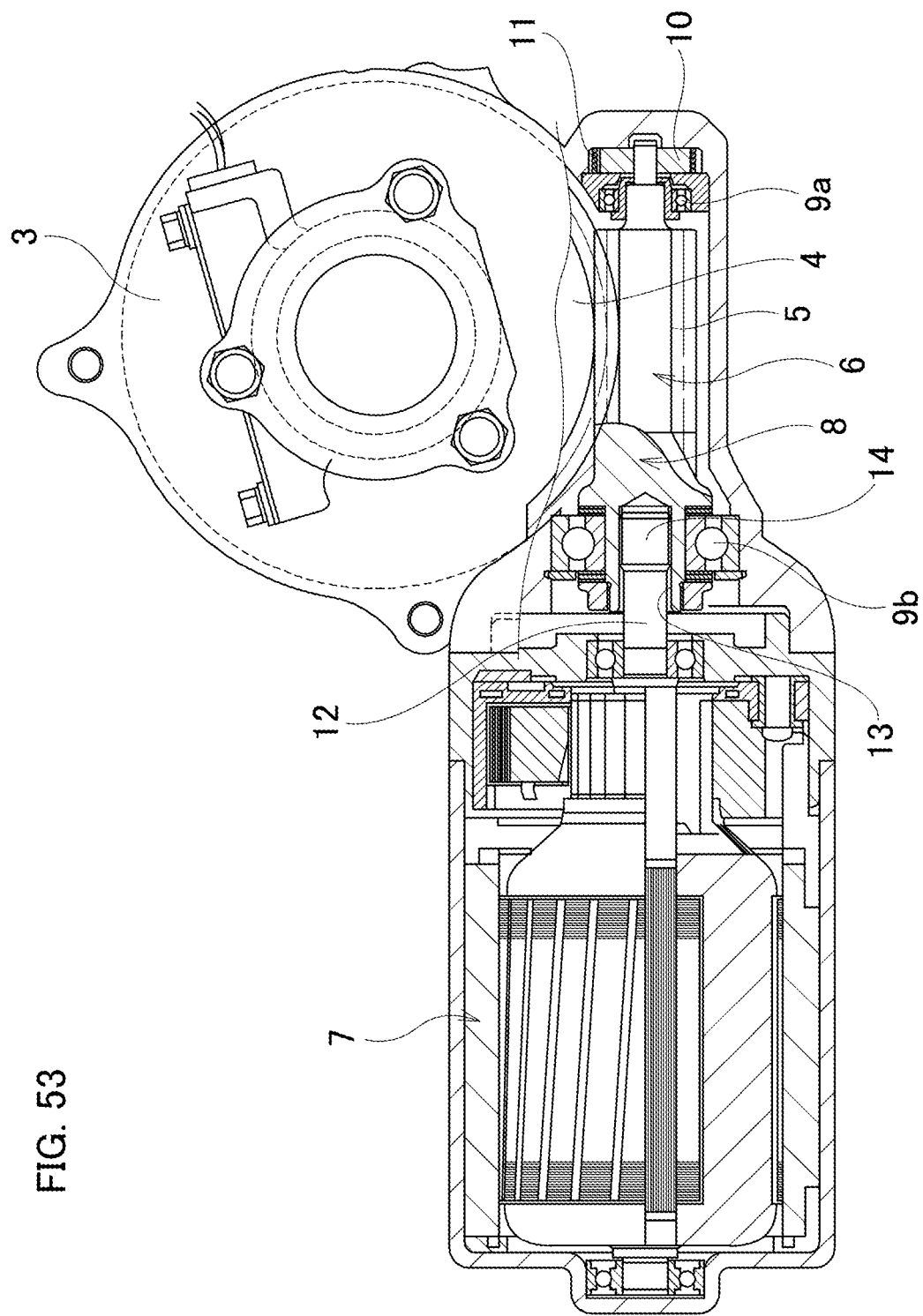
FIG. 53 is an enlarged cross sectional view taken along the line T-T of FIG. 52.

The first example of an embodiment will be explained with reference to FIG. 1 to FIG. 17. As similar to the conventional construction illustrated in FIG. 52 and FIG. 53, the electric-powered power steering apparatus of the present example has a housing 3, a worm wheel 4 which is rotatably supported to the housing 3, a warm 8 having a worm shaft 6a and worm teeth 5 that are provided on the outer circumferential surface of the worm shaft 6a, the warm being supported to the housing 3 in a state where the worm teeth 5 are meshed with the worm wheel 4, an electric motor 7 having an output shaft 12a for rotating and driving the worm 8, and a torque transmission joint 16 that connects the output shaft 12 of the electric motor 7a and the worm shaft 6a so as to enable torque transmission.

The steering shaft 2 has a rear-end section to which the steering wheel 1 is attached and a front-end section which is rotatably supported inside the housing 3. A worm wheel 4 is fixed to a portion which is rotated and driven by this steering shaft 2. The both end sections in the axial direction of the worm 8 is rotatably supported inside the housing 3 by a pair of rolling bearings 9a, 9b such as deep groove ball bearings. A biasing mechanism 15, which comprises an elastic body such as a coil spring and a leaf spring, is provided between the rolling bearing 9a which is externally fitted onto the tip-end section of the worm shaft 6a and the housing 3. Due to the biasing mechanism 15, the worm teeth 5 of the worm shaft 6a are pressed against or biased toward the worm wheel 4 based on the elasticity of elastic body. Due to such construction, backlash between the worm teeth 5 and the worm wheel 4 is suppressed and the occurrence of chattering is suppressed.

In the present example, the tip-end section of the output shaft 12 of the electric motor 7a which is a drive shaft and the base-end section of the worm shaft 6a which is a driven shaft, which are arranged in series with each other, are connected via a torque transmission joint 16 so as to enable torque transmission.

The torque transmission joint 16 comprises the first transmission member 17 and the second transmission member 18 of a couple of end transmission members, an intermediate transmission member 19, and the first elastic member 20 and the second elastic member 21 of a couple of elastic members. The combined body 61 is formed by the intermediate transmission member 19, the first elastic member 20, and the second elastic member 21.

Regarding the torque transmission joint 16, one side in the axial direction is the right side in FIGS. 2 to 6, 8, 9, and 12 as examples, and the other side in the axial direction is the left side in FIGS. 2 to 6, 8, 9, and 12 as examples. Further, in the present example, regarding the torque transmission joint 16, one side in the radial direction is inside in the radial direction and the other side in the radial direction is outside in the radial direction.

The first transmission member 17 and the second transmission member 18 are arranged on both sides in the axial direction of the combined body 61, that is, they are located one by one on one side in the axial direction and the other side in the axial direction.

The first transmission member 17 which is one end transmission member of the couple of end transmission members is made of synthetic resins mixed with reinforcing fibers as needed or metals such as iron alloys, copper alloys and aluminum alloys and is formed entirely annular by methods such as injection molding, casting, forging, sintering, cutting, or the like as illustrated in FIG. 13. The first transmission member 17 is externally fitted and fixed onto the tip-end section of the output shaft 12a by interference fit, spline fitting, caulking, or the like in a state where relative rotation and relative displacement in the axial direction are prevented. However, in case of embodying the present invention, the first transmission member 17 can be formed integrally with the tip-end section of the output shaft 12a.

The first transmission member 17 comprises an inner circumferential surface which is a circumferential surface on one side in the radial direction and an outer circumferential surface which is a circumferential surface on the other side in the radial direction. Except for one end section in the axial direction of the outer circumferential surface of the first transmission member 17, in the other end section in the axial direction and the intermediate section of the outer circumferential surface of the first transmission member 17, the first uneven portion 22 which comprising concave portions 23 and convex portions 24 that are alternately arranged in the circumferential direction is provided, the first uneven portion 22 corresponding to an end uneven portion. Both side surfaces in the circumferential direction of the respective convex portions 24 of the first uneven portion 22 are planes that are parallel to each other. Further, a circular ring shaped first flange section 25 is provided over the whole circumference in one end section in the axial direction of the outer circumferential surface of the first transmission member 17. The opening on one side in the axial direction of the respective concave portions 23 of the first uneven portion 22 is sealed by a side surface 30a for positioning which is the other side in the axial direction of the first flange section 25. In case of embodying the present invention, it is possible to omit the first flange section 25. Further, although the concave portions 23 and the convex portions 24 are provided eight each in the circumferential direction in the present example, it is possible to provide them by two or more arbitrary numbers.

The second transmission member 18, which is the other end transmission member of the couple of end transmission members, is made of synthetic resins mixed with reinforcing fibers as needed or metals such as iron alloys, copper alloys, aluminum alloys and is formed entirely annular by methods such as injection molding, casting, forging, sintering, cutting, or the like as illustrated in FIG. 14. The second transmission member 18 is externally fitted and fixed onto the base-end section of the worm shaft 6a by interference fit, spline fitting, caulking, or the like in a state where relative rotation and relative displacement in the axial direction are prevented. However, in case of embodying the present invention, the second transmission member 18 can be formed integrally with the base-end section of the worm shaft 6a.

The second transmission member 18 comprises an inner circumferential surface which is a circumferential surface on one side in the radial direction and an outer circumferential surface which is a circumferential surface on the other side in the radial direction as well. Except for the other end section in the axial direction of the outer circumferential surface of the second transmission member 18, in one end section in the axial direction and the intermediate section, the second uneven portion 26 which comprises concave portion 27 and convex portion 28 that are alternately arranged in the circumferential direction is provided, the second uneven portion 26 corresponding to an end uneven portion. Both side surfaces in the circumferential direction of the respective convex portions 28 of the second uneven portion 26 are planes that are parallel to each other. Further, a circular ring shaped second flange section 29 is provided over the whole circumference in other end section in the axial direction of the outer circumferential surface of the second transmission member 18. The opening on the other side in the axial direction of the respective concave portion 27 of the second uneven portion 26 is sealed by a side surface 30b for positioning which is one side in the axial direction of the second flange section 29. In case of embodying the present invention, it is possible to omit the second flange section 29. Further, although the concave portions 27 and the convex portions 28 are provided eight each in the circumferential direction in the present example, it is possible to provide them by two or more arbitrary numbers.

In the present example, the first transmission member 17 and the second transmission member 18 are made to be the same shape and the same size. Therefore, in the present example, the first transmission member 17 and the second transmission member 18 can share common parts.

The intermediate transmission member 19 is, for example, as illustrated in FIG. 15, is made of material having higher rigidity than that of elastic material of the first elastic member 20 and the second elastic member 21, such as belt material with rubber reinforced with cloth, synthetic resins (PPS, PEEK, polyamide, or the like) mixed with reinforcing fibers as needed, and metals such as iron alloys, copper alloys and aluminum alloys, and is formed entirely annular by methods such as injection molding, casting, forging, sintering, cutting, or the like.

The intermediate transmission member 19 has a cylindrical body section 31. The body section 31 of the intermediate transmission member 19 comprises an inner circumferential surface which is a circumferential surface on one side in the radial direction and an outer circumferential surface which is a circumferential surface on the other side in the radial direction, and an intermediate uneven section 32 which comprises concave portions 33 and convex portions 33 alternately arranged in the circumferential direction is provided on the inner circumferential surface of the body section 31. The concave portions 33 of the body section 31 is able to engage with the convex portions 24 of the first transmission member 17 and the convex portions 28 of the second transmission member 18, and the convex portions 34 is able to engage with the concave portions 23 of the first transmission member 17 and the concave portions 27 of the second transmission member 18. The number of the concave portions 33 and the convex portions 34 is the same as the convex portions 24 and the convex portions 28 as well as the concave portions 23 and the concave portions 27.

In every portion that corresponds to the center section in the circumferential direction of the convex portions 34 of the intermediate uneven section 32 of one side surface in the axial direction (outside surface in the axial direction) of the body section 31, the first tooth section 35 is provided so as to protrudes in the axial direction. The shape of the first tooth sections 35 as seen from the axial direction is substantially rectangular extending in the radial direction of the body section 31. Further, the outer end portion in the radial direction and the intermediate section of one side surface in the axial direction which is a tip end surface of the respective first tooth sections 35 is constructed by a tilted side surface section 36. The tilted side surface section 36 is inclined in a direction toward the other side in the axial direction which is the center side (inside) of the intermediate transmission member 19 in the axial direction toward the outside in the radial direction. Further, the first engaging projection 37 that protrudes inward in the radial direction is provided on one half section in the axial direction of the inside surface in the radial direction of first tooth sections 35 that are located every other one in the circumferential direction of all the first tooth sections 35. The other side surface in the axial direction (inside surface in the axial direction) of the first engaging projection 37 is a planar surface that is orthogonal to the central axis of the intermediate transmission member 19. In case of embodying the present invention, the number of the first tooth sections 35 can be different from that of the present example. That is, the first tooth section 35 is provided in at least one place in the circumferential direction of one side surface in the axial direction of the body section 31.

The body section 31 has the first annular concave portion 38, which corresponds to a concave portion in the circumferential direction that opens in one side surface in the axial direction, in a portion outside in the radial direction than the first tooth sections 35 of one side portion in the axial direction. The first annular concave portion 38 extends in the circumferential direction of the intermediate transmission member 19 and is provided over the whole circumference of the intermediate transmission member 19. The inner diameter side circumferential surface 39 and the outer diameter side circumferential surface 40 of the inner surface of the first annular concave portion 38 are cylindrical surfaces centered on the center axis of the body section 31. Further, the body section 31 has the first cylindrical portion 41 that protrudes toward one side in the axial direction in a portion on one side in the axial direction (outside portion in the axial direction) of the outer end portion in the radial direction. The inner circumferential surface of the first cylindrical portion 41 forms a single cylindrical surface together with the outer diameter side circumferential surface 40 of the first annular concave portion 38.

In every portion that corresponds to the center section in the circumferential direction of the convex portions 34 of the intermediate uneven section 32 of the other side surface in the axial direction (outside surface in the axial direction) of the body section 31, the second tooth section 42 is provided so as to protrudes in the axial direction. The shape of the second tooth sections 42 as seen from the axial direction is substantially rectangular extending in the radial direction of the body section 31. Further, the outer end portion in the radial direction and the intermediate section of the other side surface in the axial direction which is a tip end surface of the respective second tooth sections 42 is constructed by a tilted side surface section 43. The tilted side surface section 43 is inclined in a direction toward one side in the axial direction which is the center side (inside) of the intermediate transmission member 19 in the axial direction toward the outside in the radial direction. Further, the second engaging projection 44 that protrudes inward in the radial direction is provided on the other half section in the axial direction of the inside surface in the radial direction of second tooth sections 42 that are located every other one in the circumferential direction of all the second tooth sections 42. The one side surface in the axial direction (inside surface in the axial direction) of the second engaging projection 44 is a planar surface that is orthogonal to the central axis of the intermediate transmission member 19. In case of embodying the present invention, the number of the second tooth sections 42 can be different from that of the present example. That is, the second tooth section 42 is provided in at least one place in the circumferential direction of the other side surface in the axial direction of the body section 31.

The body section 31 has the second annular concave portion 45, which corresponds to a concave portion in the circumferential direction that opens in the other side surface in the axial direction, in a portion outside in the radial direction than the second tooth sections 42 of the other side portion in the axial direction. The second annular concave portion 45 extends in the circumferential direction of the intermediate transmission member 19 and is provided over the whole circumference of the intermediate transmission member 19. The inner diameter side circumferential surface 46 and the outer diameter side circumferential surface 47 of the inner surface of the second annular concave portion 45 are cylindrical surfaces centered on the center axis of the body section 31. Further, the body section 31 has the second cylindrical portion 48 that protrudes toward the other side in the axial direction in a portion on the other side in the axial direction (outside portion in the axial direction) of the outer end portion in the radial direction. The inner circumferential surface of the second cylindrical portion 48 forms a single cylindrical surface together with the outer diameter side circumferential surface 47 of the second annular concave portion 45.

In the present example, the phases of the arrangement in the circumferential direction of the first engaging projections 37 and the second engaging projections 44 are offset by half a pitch from each other. Further, in the present example, except for the point where the phases of the arrangement in the circumferential direction of the first engaging projections 37 and the second engaging projections 44 are offset by half a pitch from each other, both half sections in the axial direction of the intermediate transmission member 19 have shapes that are mirror-symmetrical against each other.

In case of embodying the present invention, the number of the first engaging projections 37 (second engaging projections 44) can be smaller than the number of the present example, and can be larger than the number of the present example.

The first elastic member 20 is, for example, as illustrated in FIG. 16, made entirely circular ring shaped with elastic materials such as rubber (NBR, HNBR, or the like) and elastomer (polyurethane, silicone, or the like) that have lower rigidity than the intermediate transmission member 19. The first elastic member 20 is assembled to a portion on one side in the axial direction of the intermediate transmission member 19.

The first elastic slits 49 are provided in a plurality of places of the first elastic member 20 which are the same phase in the circumferential direction as the concave portions 33 of the intermediate uneven section 32. The first elastic slits 49 extend in the radiation direction of the first elastic member 20, and are opened to the inner perimeter edge of the first elastic member 20. In sections near the outer end in the radial direction of both side edges in the circumferential direction of the respective first elastic slits 49, a pair of elastic protrusions 50 is provided so as to protrude toward the center side of the first elastic slits 49 in the circumferential direction. The shape of the tip end surface of the respective elastic protrusions 50 as seen from the axial direction is convex arc. Further, sections that deviate from the elastic protrusion 50 of both side edges in the circumferential direction of the respective first elastic slits 49 are flat sections 76 that are parallel to each other. The space in the circumferential direction of the both end edges in the circumferential direction of the respective first elastic slits 49 (the space in the circumferential direction of the tip-end sections of the respective pair of elastic protrusions 50) $t_{49}$ is made smaller than the space in the circumferential direction $T_{33}$ of both side edges in the circumferential direction of the respective concave portions 33 of the intermediate uneven section 32 ($t_{49}<T_{33}$). Further, in the present example, the space in the circumferential direction of the flat sections 76 of the both side edges in the circumferential direction of the respective first elastic slits 49 is made smaller than the space in the circumferential direction $T_{33}$ of both side edges in the circumferential direction of the respective concave portions 33 as well. In case of embodying the present invention, the shape of the tip end surface of the respective elastic protrusions 50 as seen from the axial direction is not limited to convex arc, but it is also possible to be other shapes such as triangular, trapezoidal, and the like. Further, the location of the elastic protrusion 50 in the radial direction with respect to the both side edges in the circumferential direction of the first elastic slits 49 can be a location in the radial direction that is different from the present example. Furthermore, the number of the elastic protrusion that is provided on each of both side edges in the circumferential direction of the respective first elastic slits 49 is not limited to one, but can be more than one. It is also possible to omit the elastic protrusion 50 and make the overall both side edges in the circumferential direction of the respective first elastic slits to be flat sections that are parallel to each other. The flat sections provided on both side edges in the circumferential direction of the respective first elastic slits may be inclined to each other.

Further, the first through hole 51 that corresponds to a section with material removed is provided in every center section in the circumferential direction between the first elastic slits 49 that are adjacent in the circumferential direction of the first elastic member 20. The shape of the respective first through holes 51 as seen from the axial direction is substantially rectangular extending in the radial direction of the first elastic member 20. Further, the first engaging beam 52 is provided in every section of the first elastic member 20 that is sandwiched between the inner circumferential surface of the first elastic member 20 and the first through holes 51 in the radial direction. Every section of one side surface in the axial direction of the first elastic member 20 that corresponds to the first engaging beam 52 is recessed to the other side in the axial direction. Further, the intermediate section in the radial direction of the one side surface in the axial direction of the first elastic member 20 is constructed by a tilted side surface section 53. The tilted side surface section 53 is inclined in a direction toward the other side in the axial direction which is the center side in the axial direction of the intermediate transmission member 19 in the axial direction toward the outside in the radial direction.

Further, the first elastic member 20 has the first annular convex portion 54 that corresponds to a convex portion in the circumferential direction in the outer end portion in the radial direction which is outside in the radial direction than the respective first elastic slits 49 and the respective first through holes 51 so as to protrudes to the other side in the axial direction (inside in the axial direction). The first annular convex portion 54 extends in the circumferential direction of the first elastic member 20 and is provided over the whole circumference of the first elastic member 20.

Figure 1:
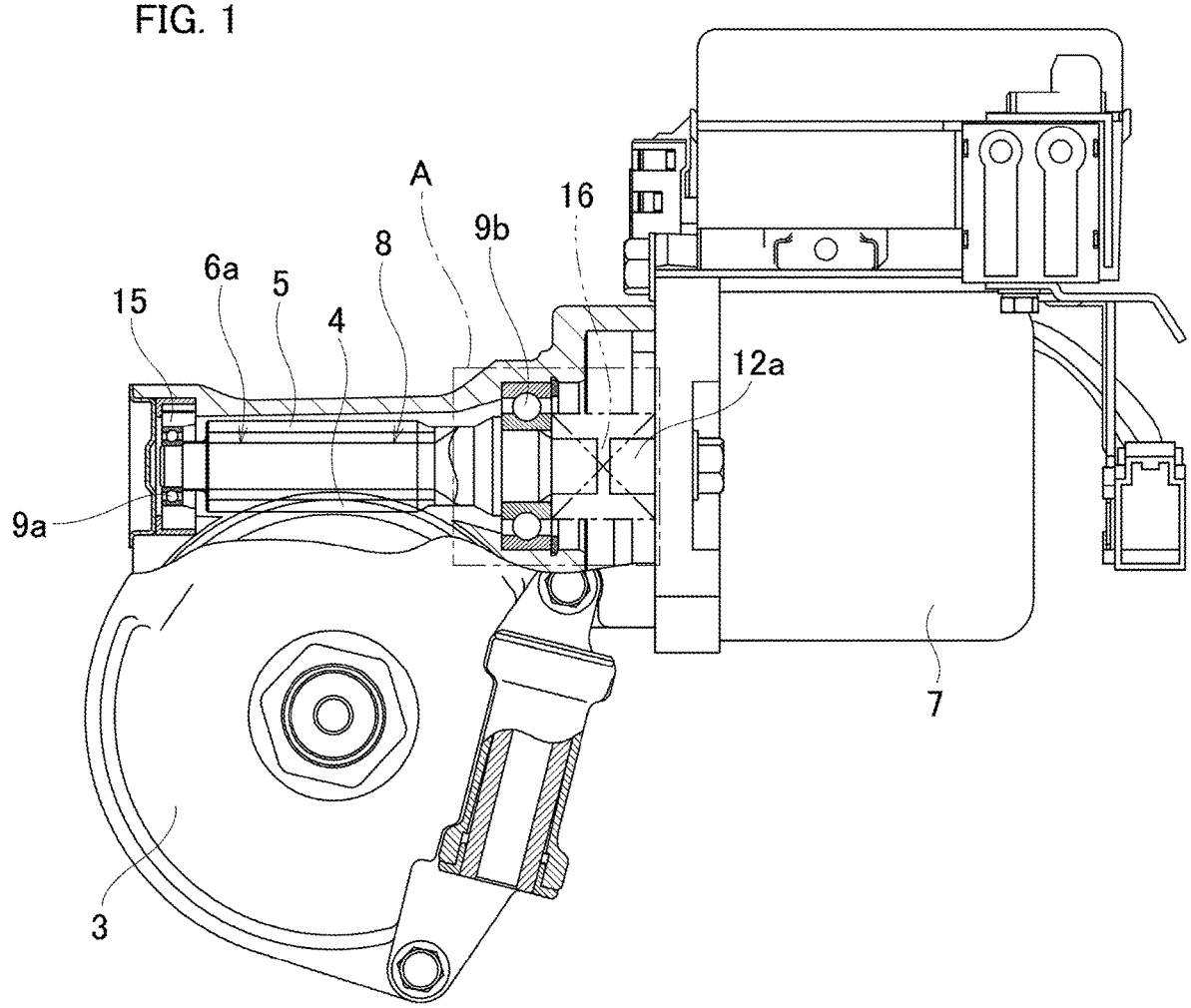
FIG. 1 is a sectional view similar to FIG. 53 of the first example of an embodiment of the present invention.
Figure 2:
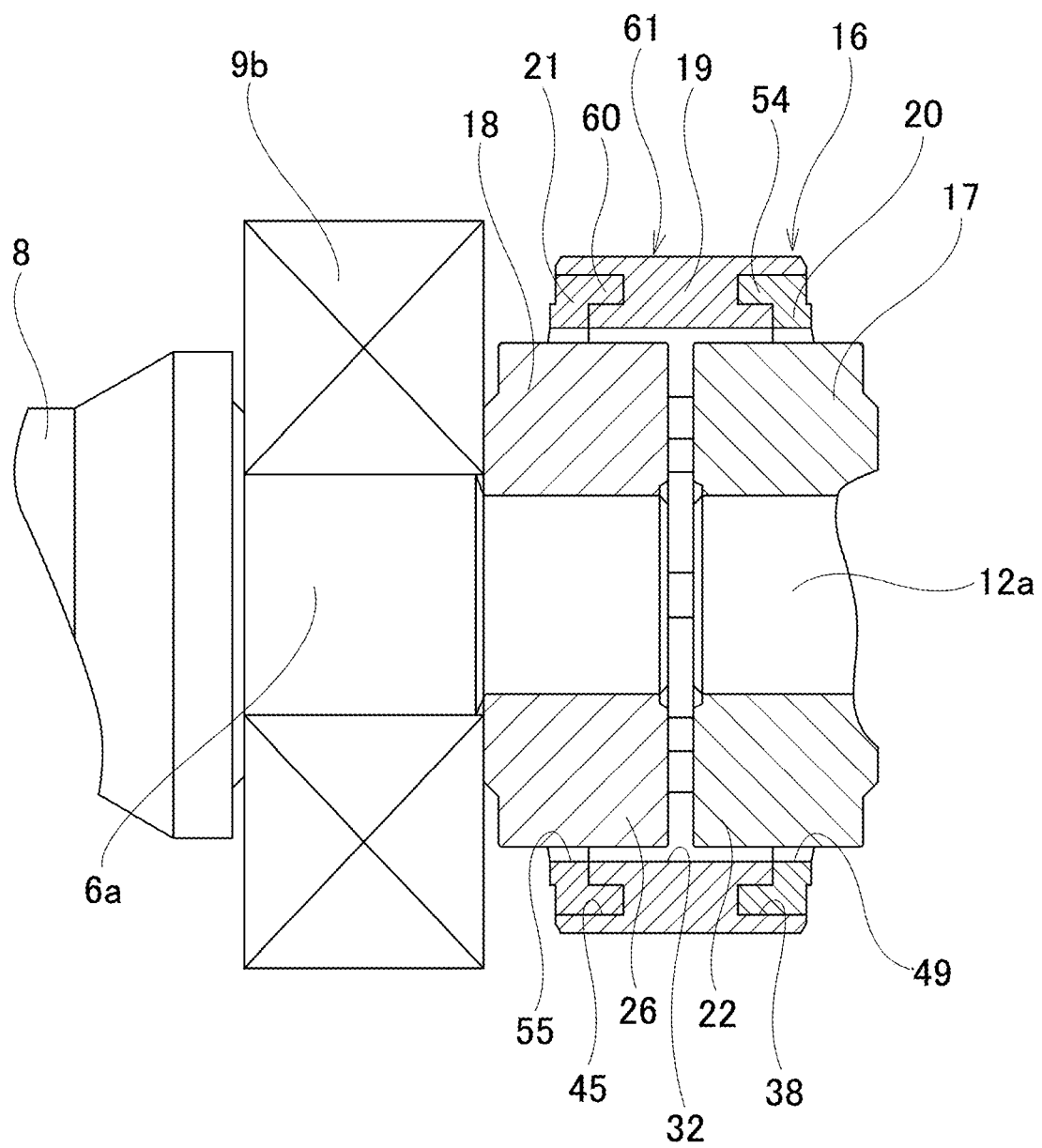
FIG. 2 is an enlarged figure of section A in FIG. 1, part of which is omitted.
Figure 3:
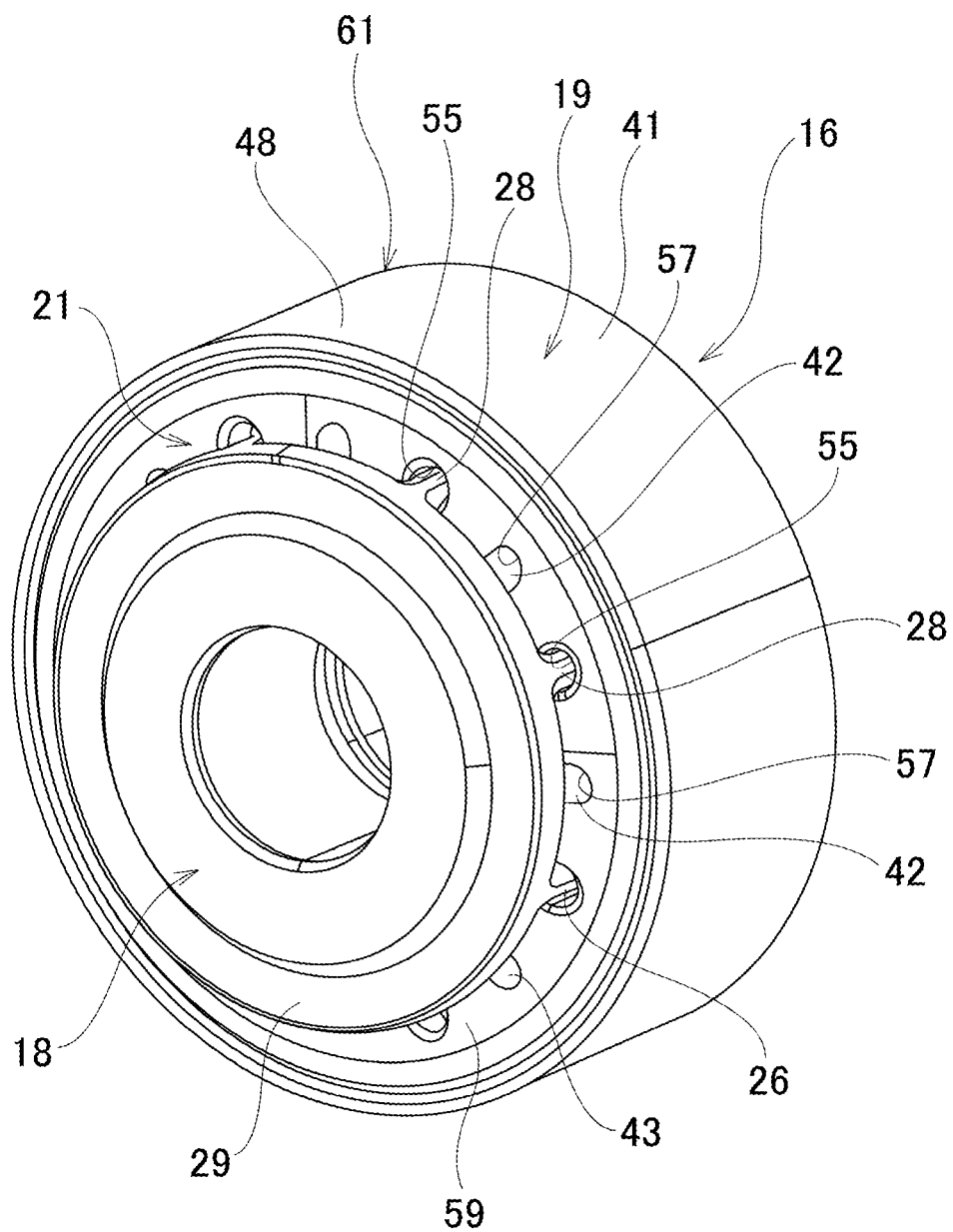
FIG. 3 is a perspective view of a torque transmission joint of the first example.
Figure 4:
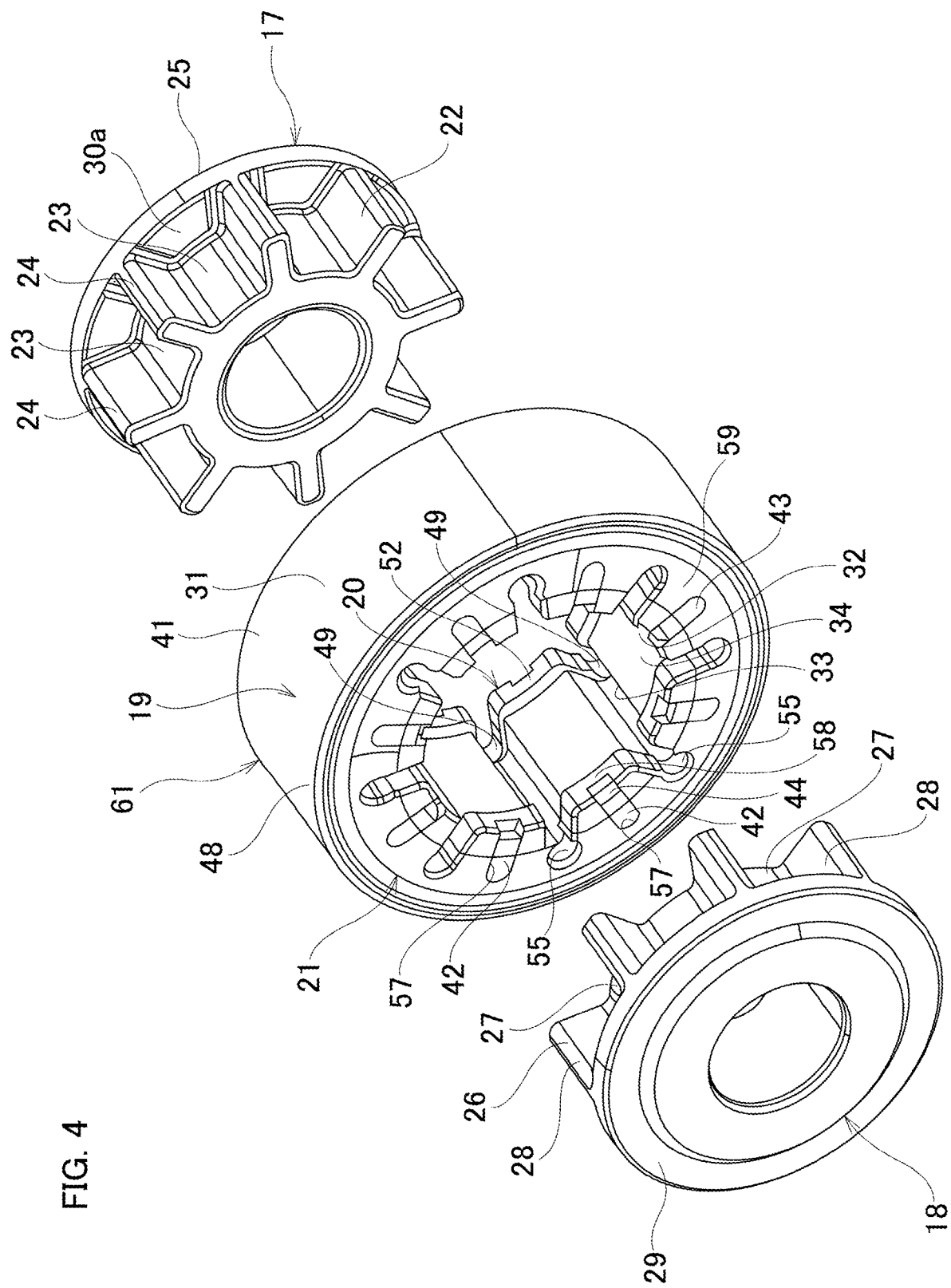
FIG. 4 is a perspective view illustrating the torque transmission joint of the first example in a partially disassembled state.
Figure 5:
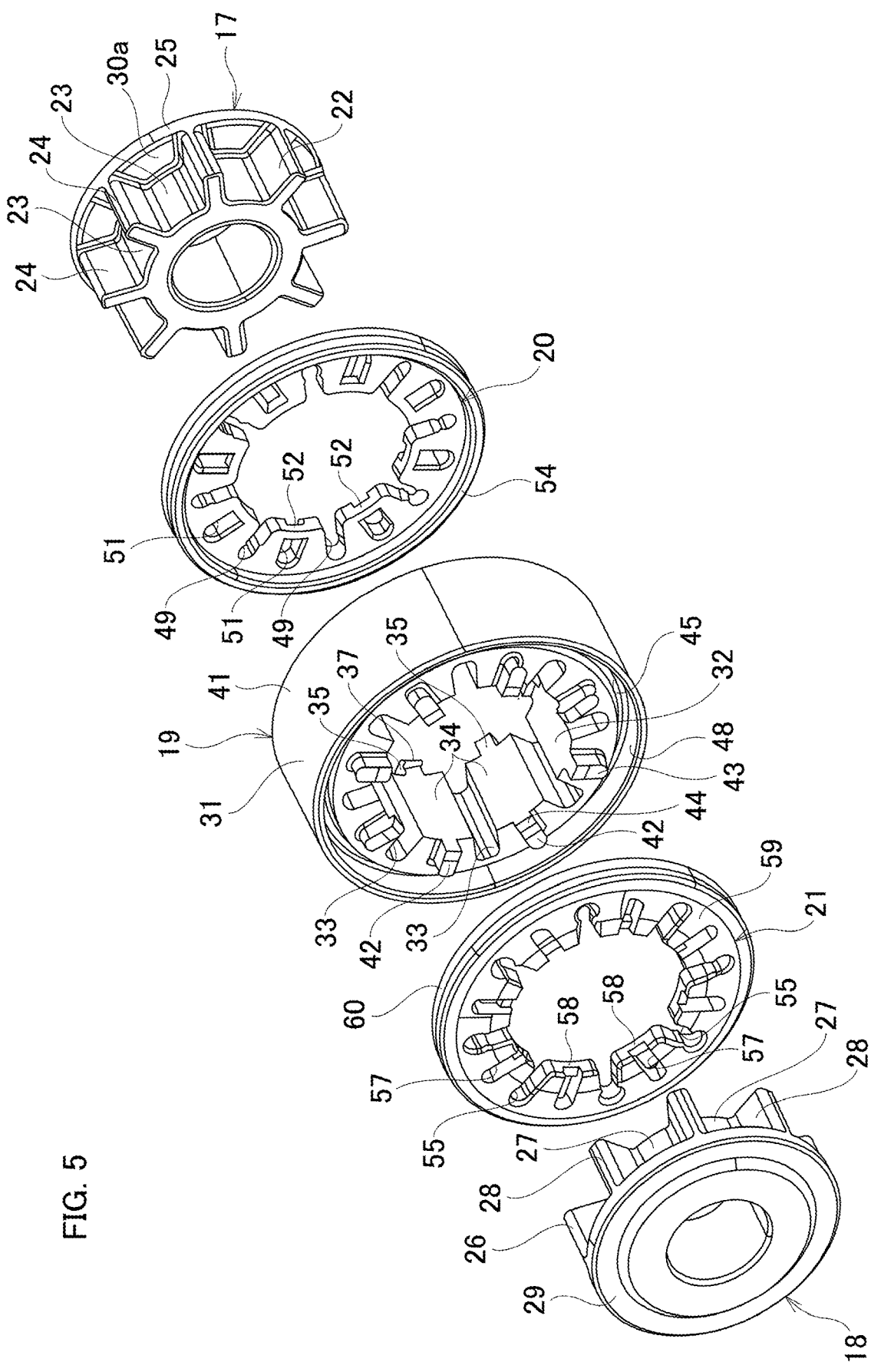
FIG. 5 is a perspective view of the torque transmission joint of the first example in a completely disassembled state.
Figure 6:
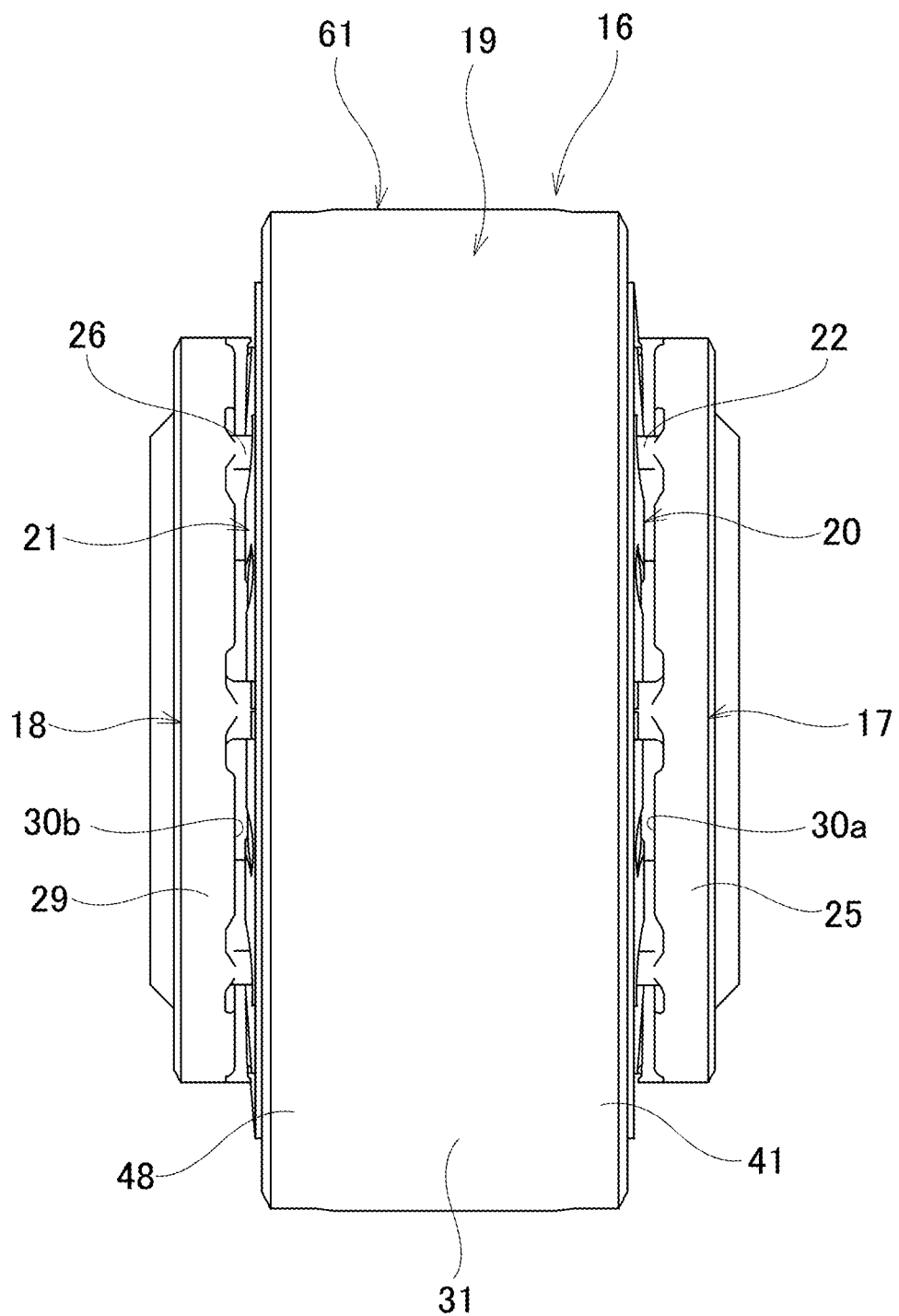
FIG. 6 shows a torque transmission joint of the first example which is viewed from outside in the radial direction.
Figure 7:
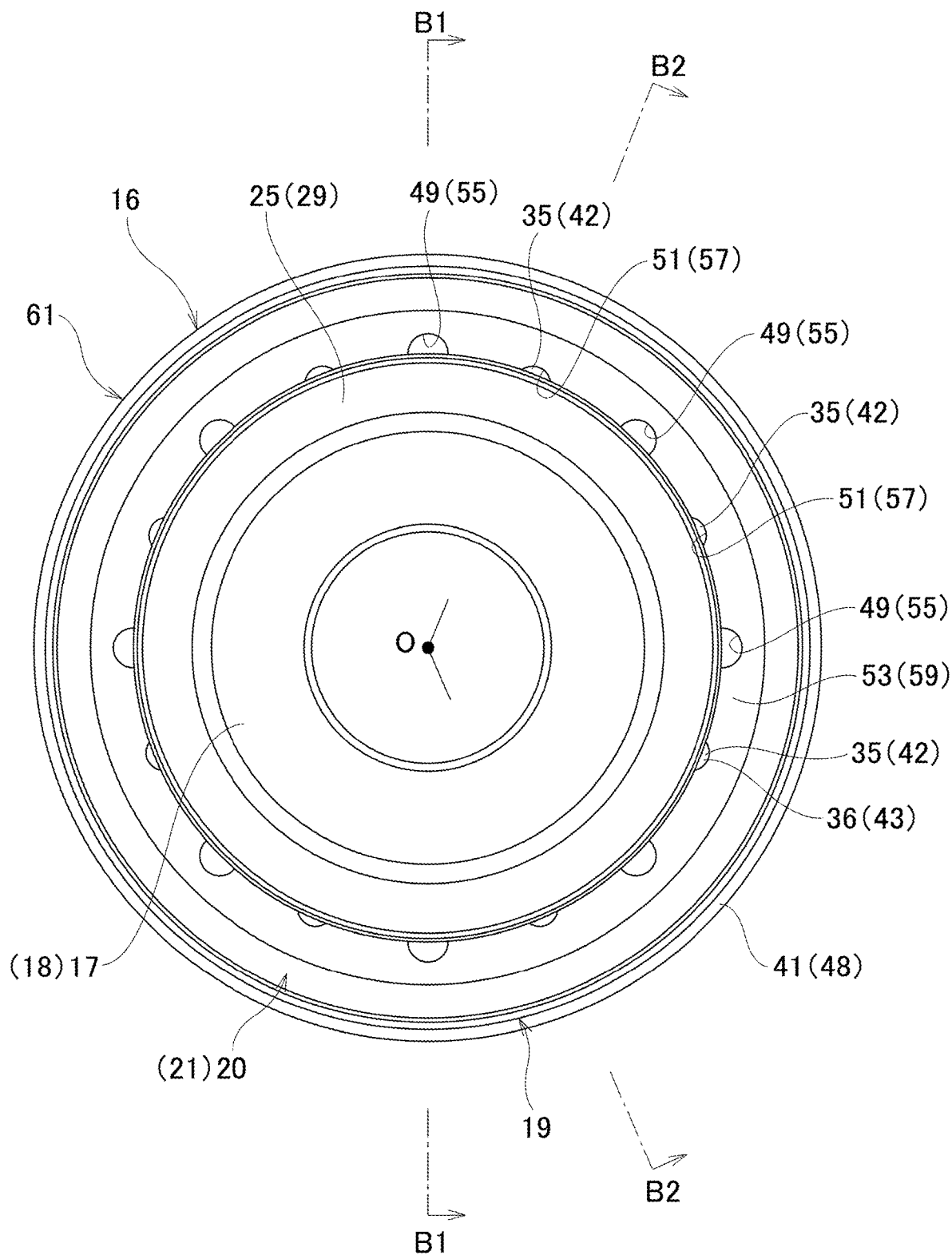
FIG. 7 is a figure which is viewed from right or left in FIG. 6.
Figure 8:
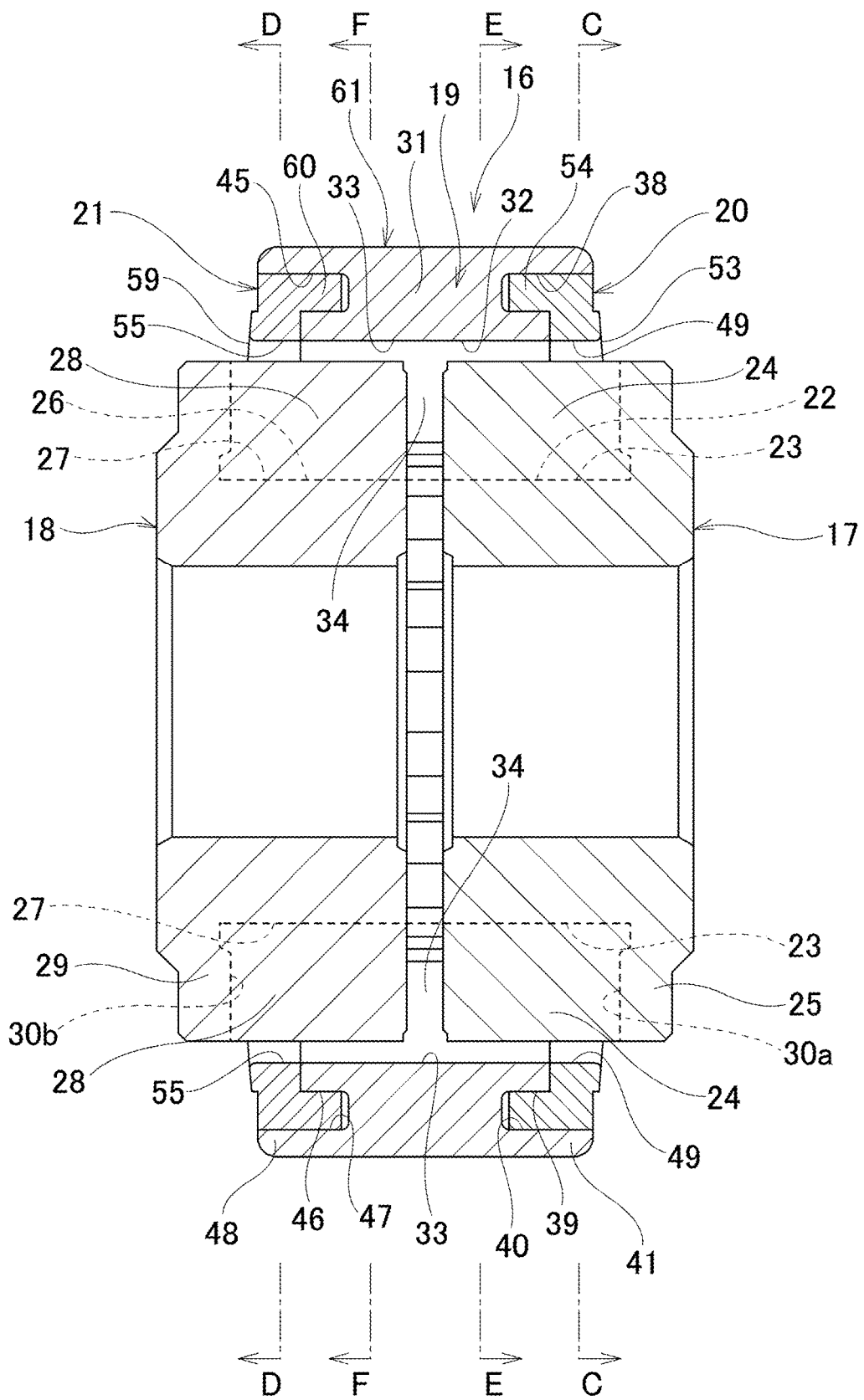
FIG. 8 is a cross sectional view taken along the line B1-B1 of FIG. 7.
Figure 9:
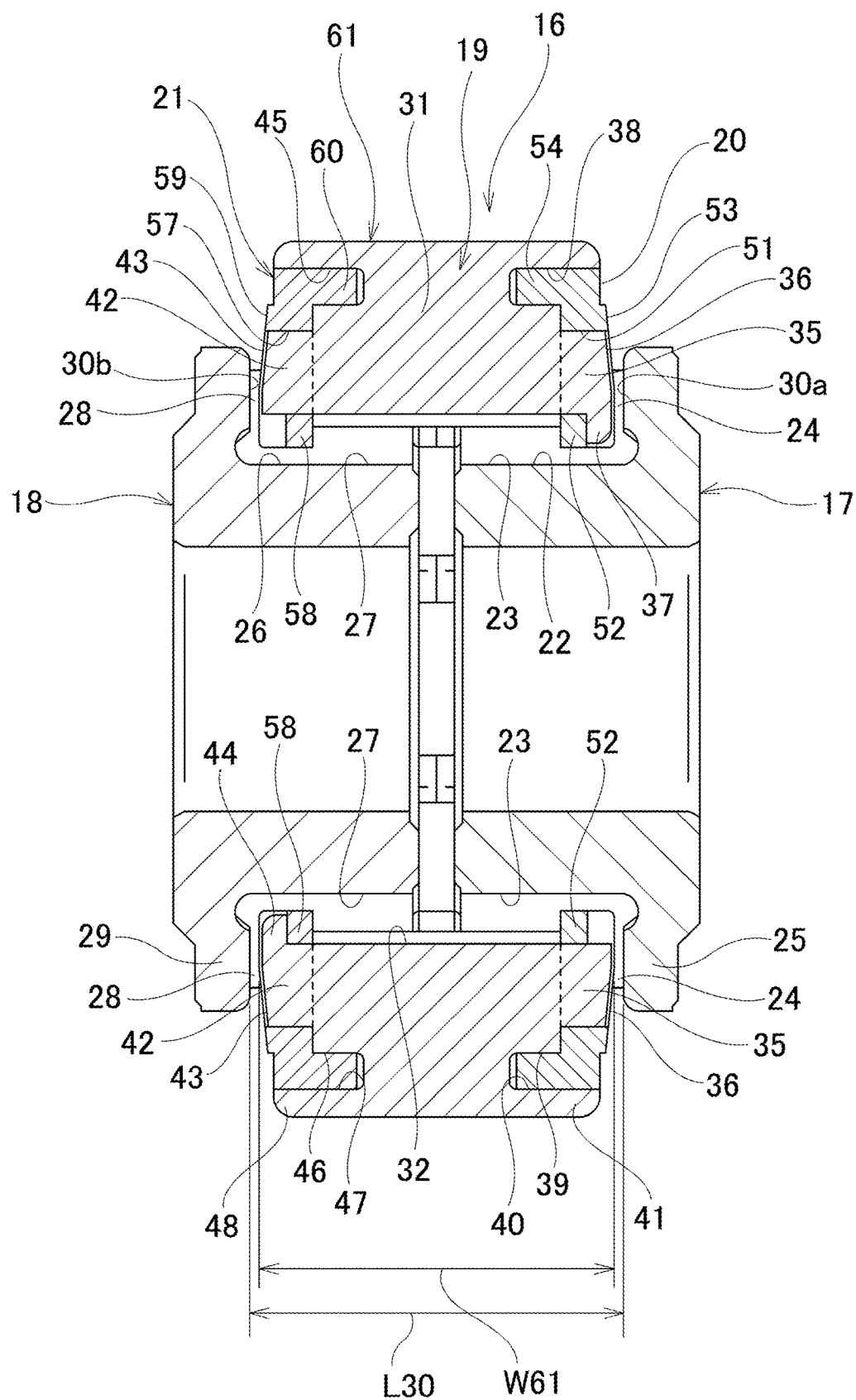
FIG. 9 is a cross sectional view taken along the line B2-O-B2 of FIG. 7.
Figure 12:
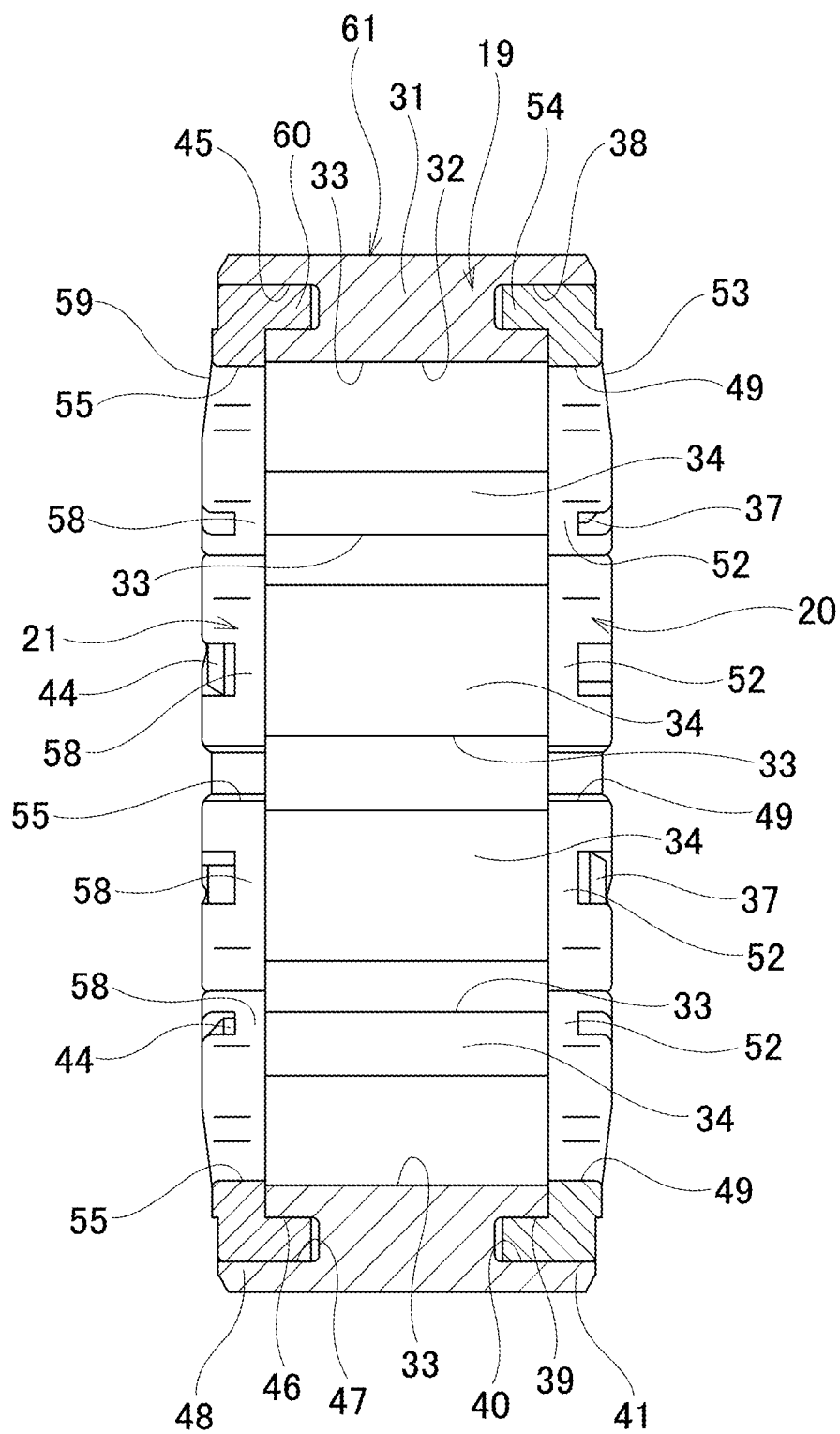
FIG. 12 is a cross sectional view taken along the line B1-B1 FIG. 7, taking out and illustrating only the intermediate transmission member and the first and second elastic members.
Figure 18:
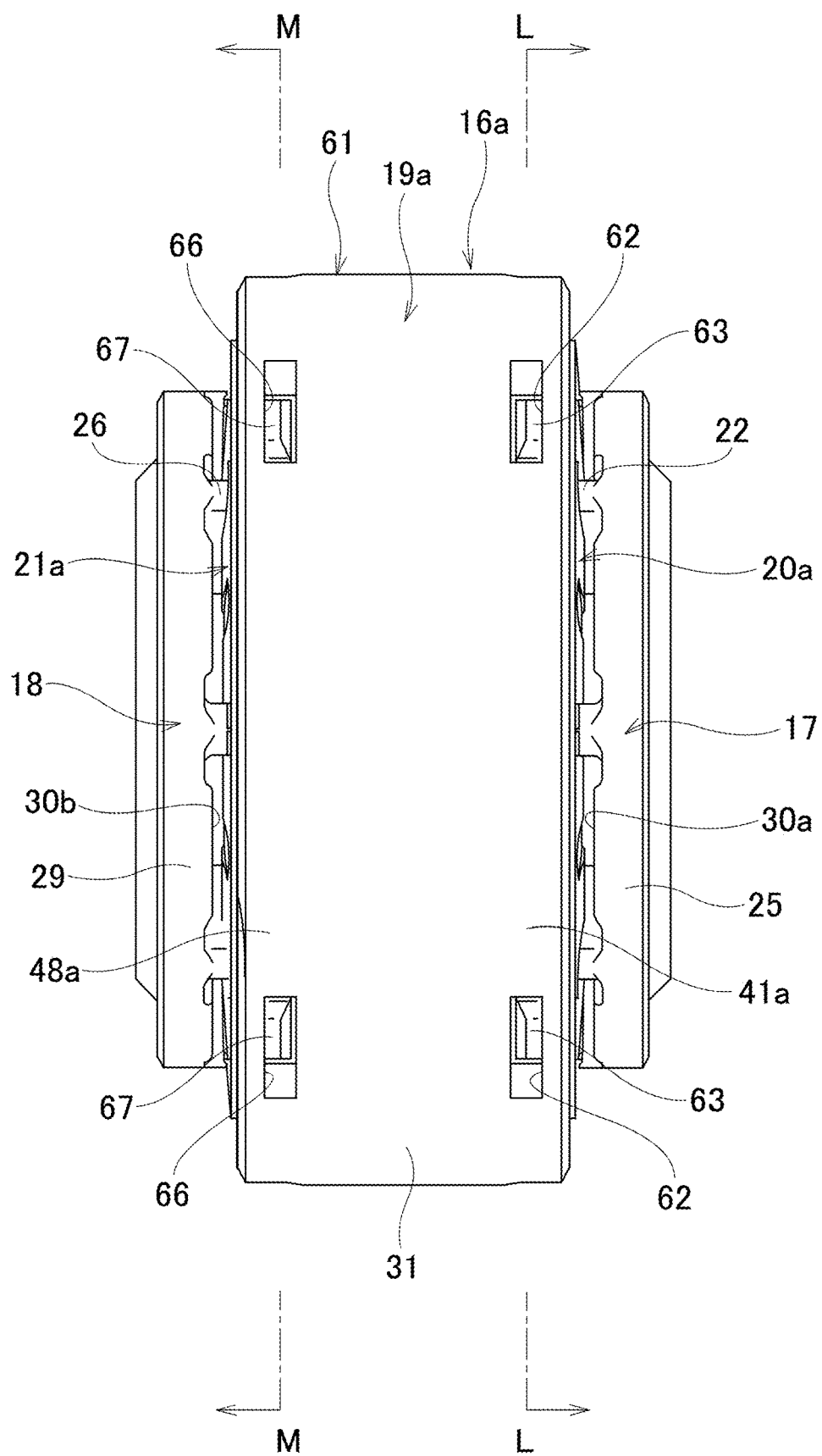
FIG. 18 shows a torque transmission joint of the second example of an embodiment of the present invention which is viewed from outside in the radial direction.
Figure 19:
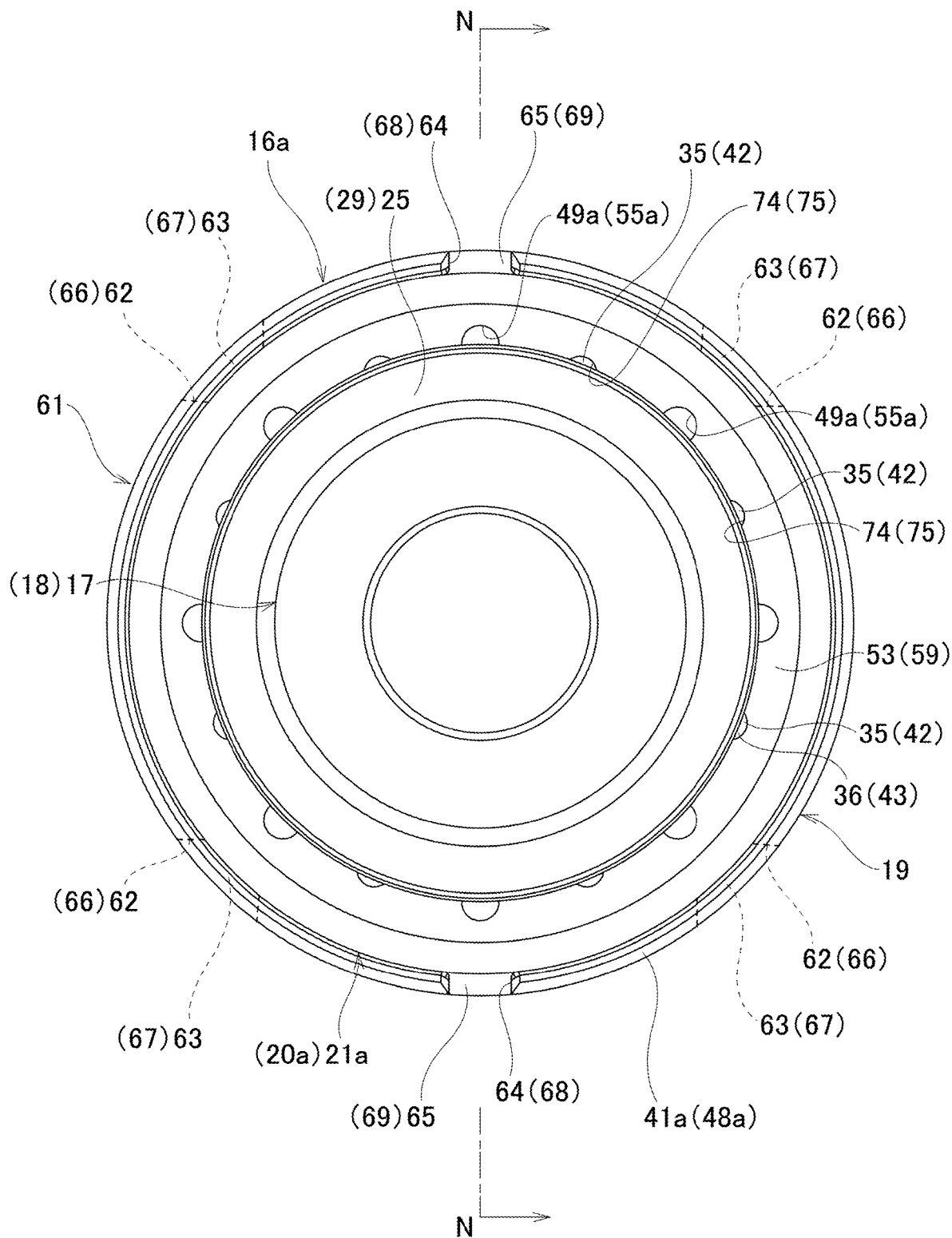
FIG. 19 is a figure which is viewed from right or left in FIG. 18.
Figure 20:
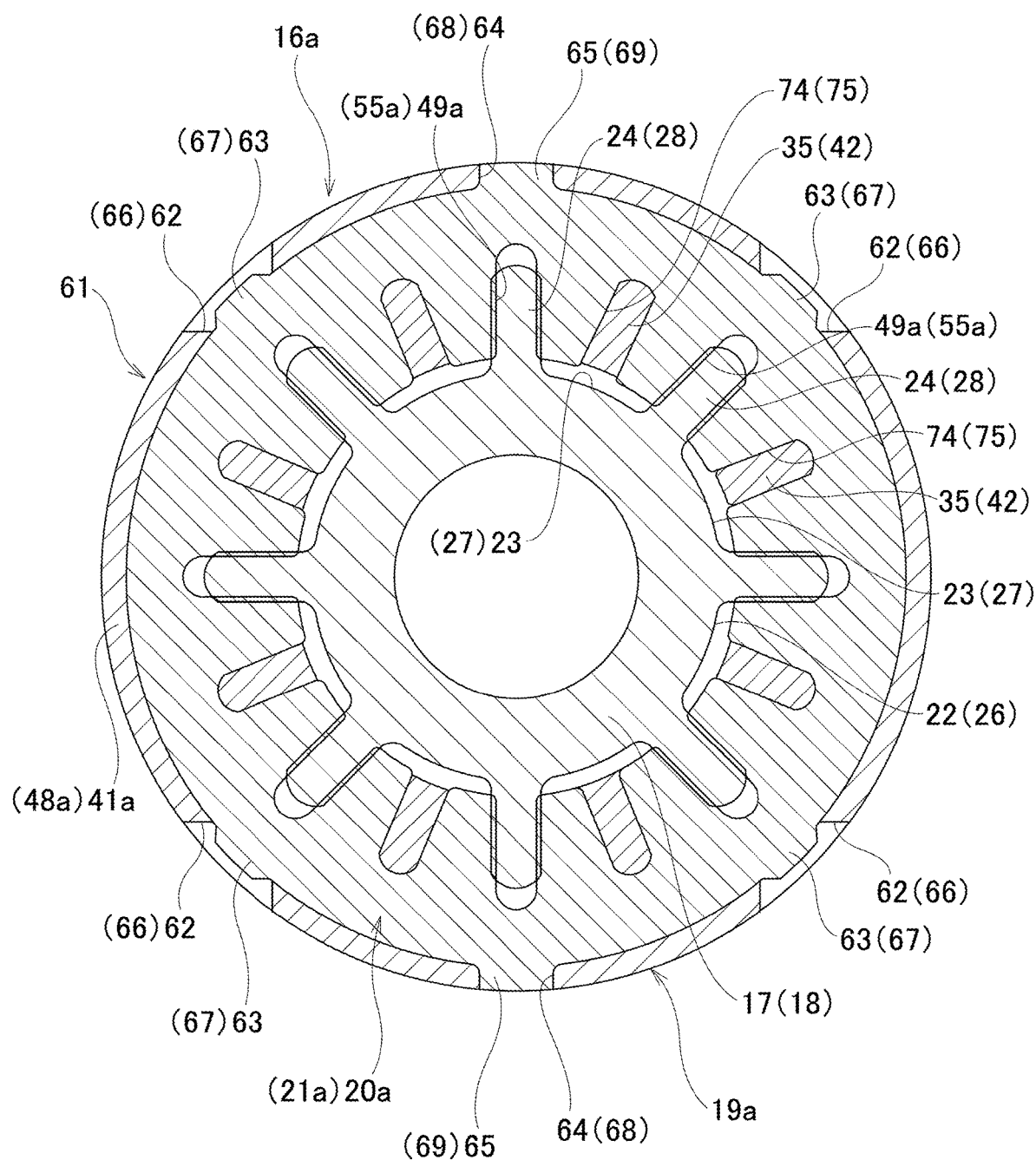
FIG. 20 is a cross sectional view taken along the line L-L or M-M of FIG. 18.
Figure 21:
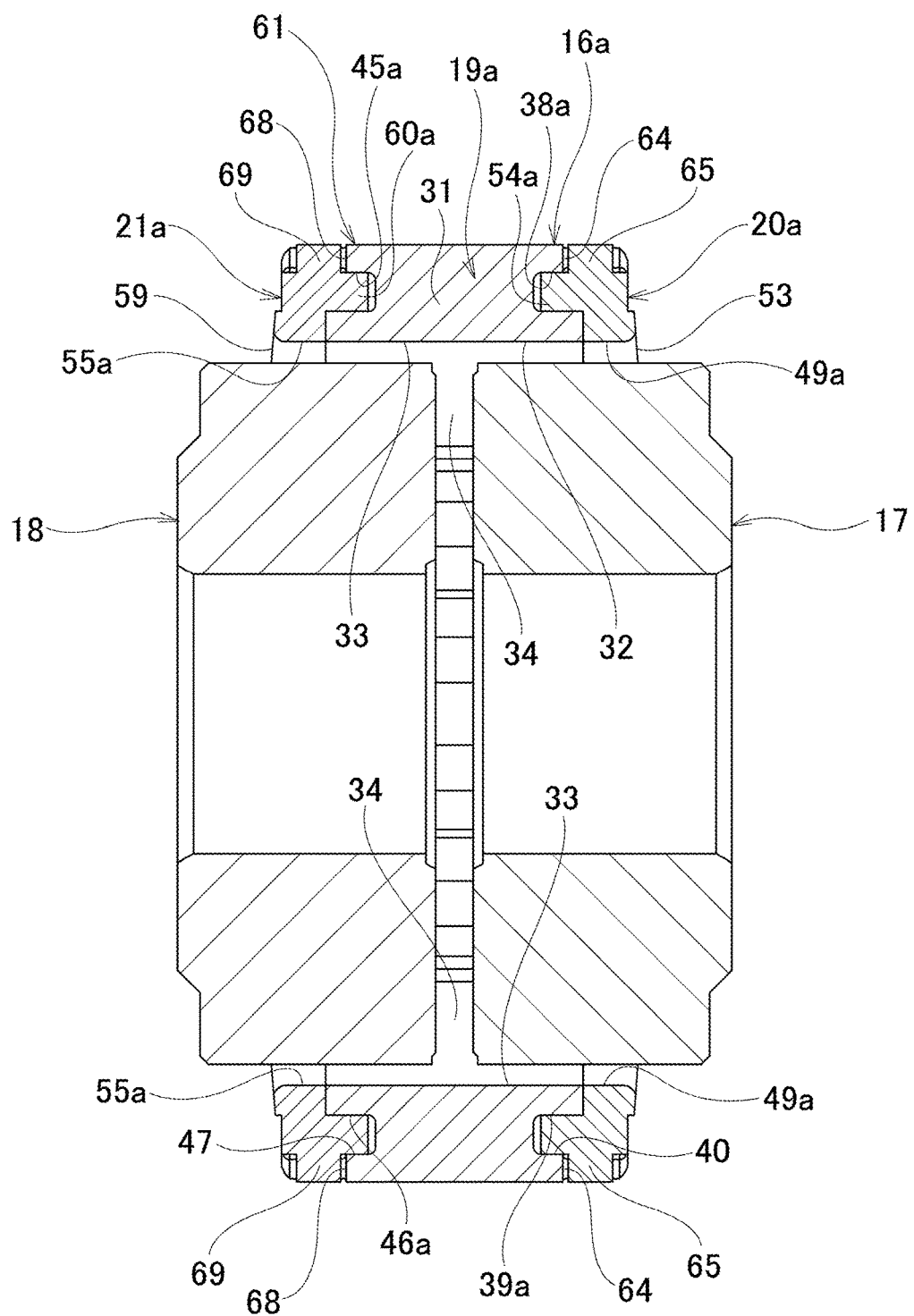
FIG. 21 is a cross sectional view taken along the line N-N of FIG. 19.
Figure 22:
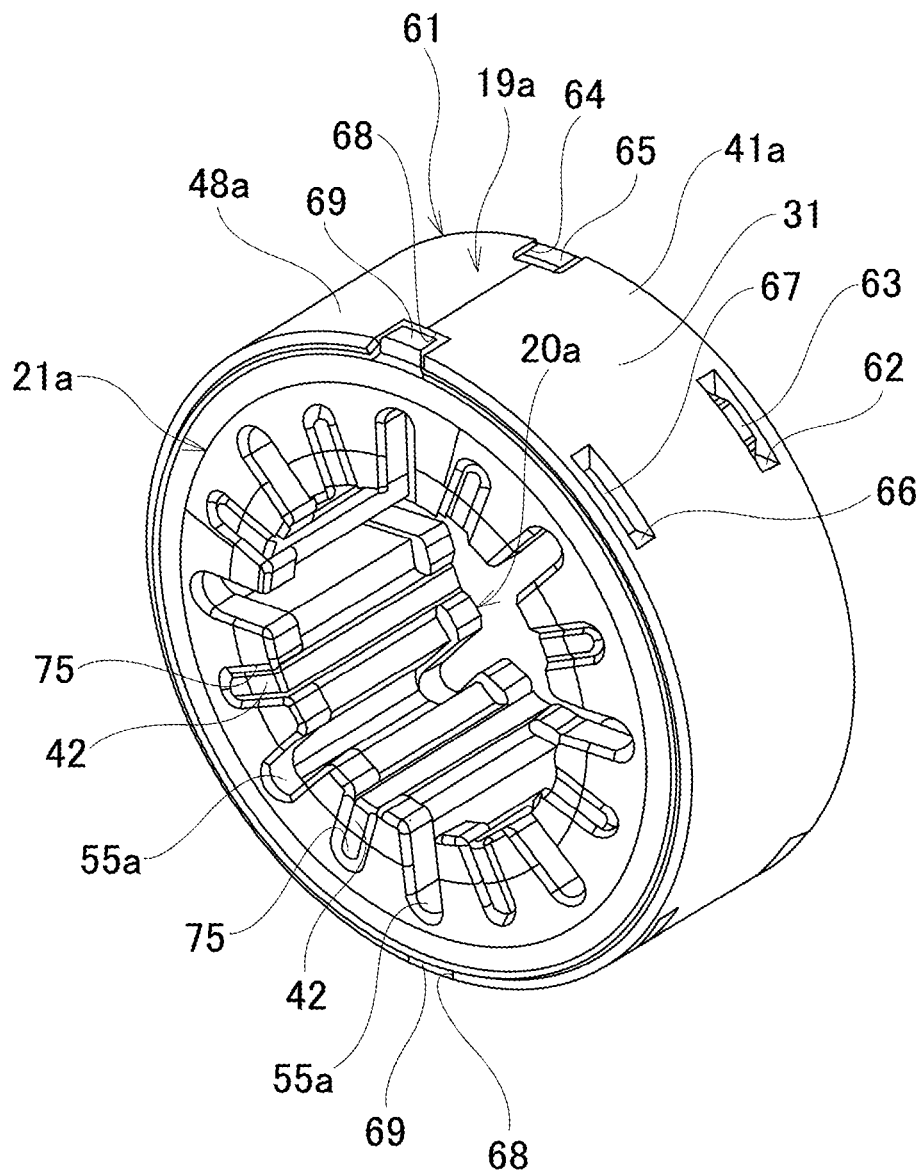
FIG. 22 is a perspective view of an intermediate transmission member and the first and second elastic members of the second example.
Figure 23:
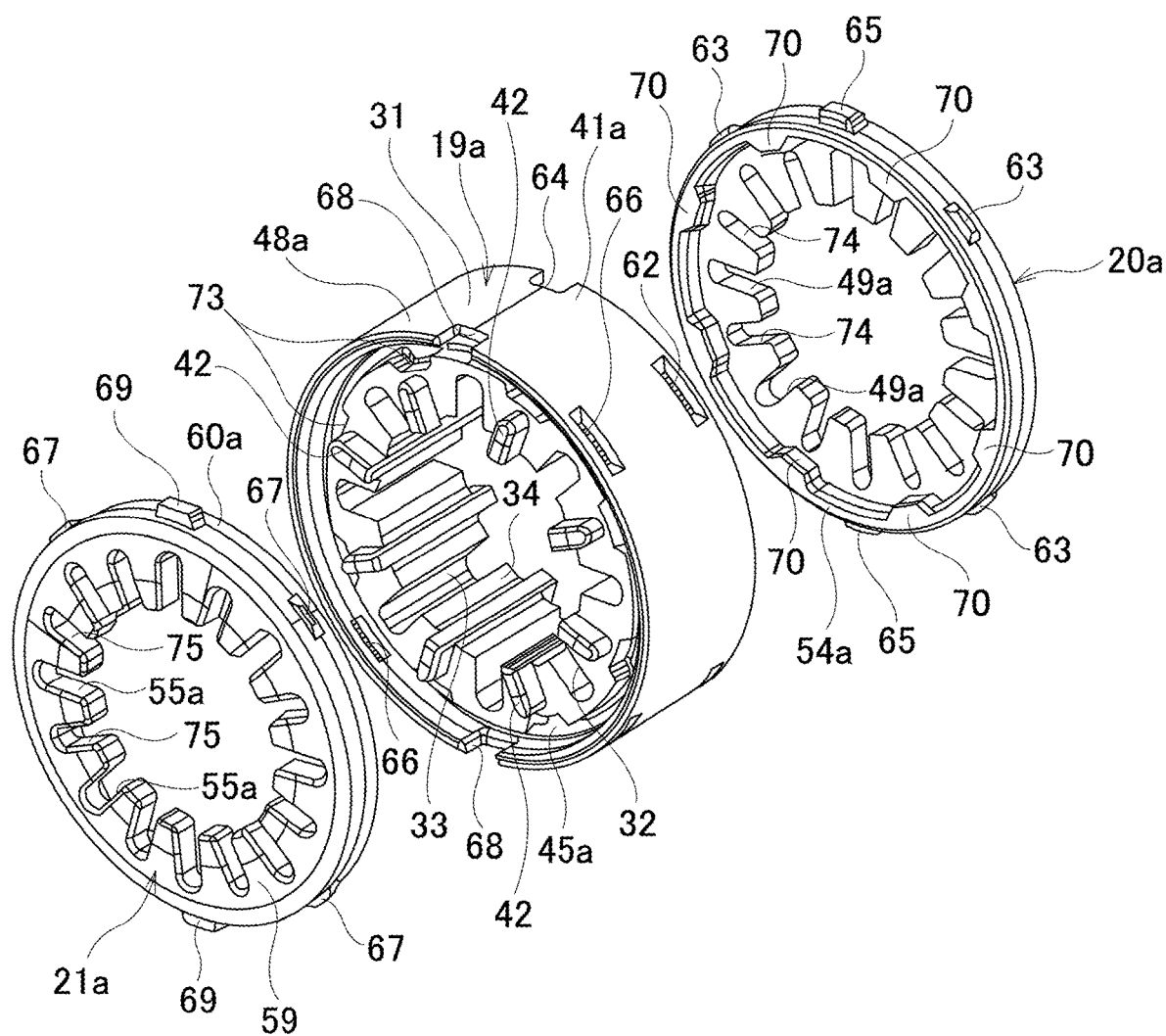
FIG. 23 is an exploded perspective view of the intermediate transmission member and the first and second elastic members of the second example.
Figure 24:
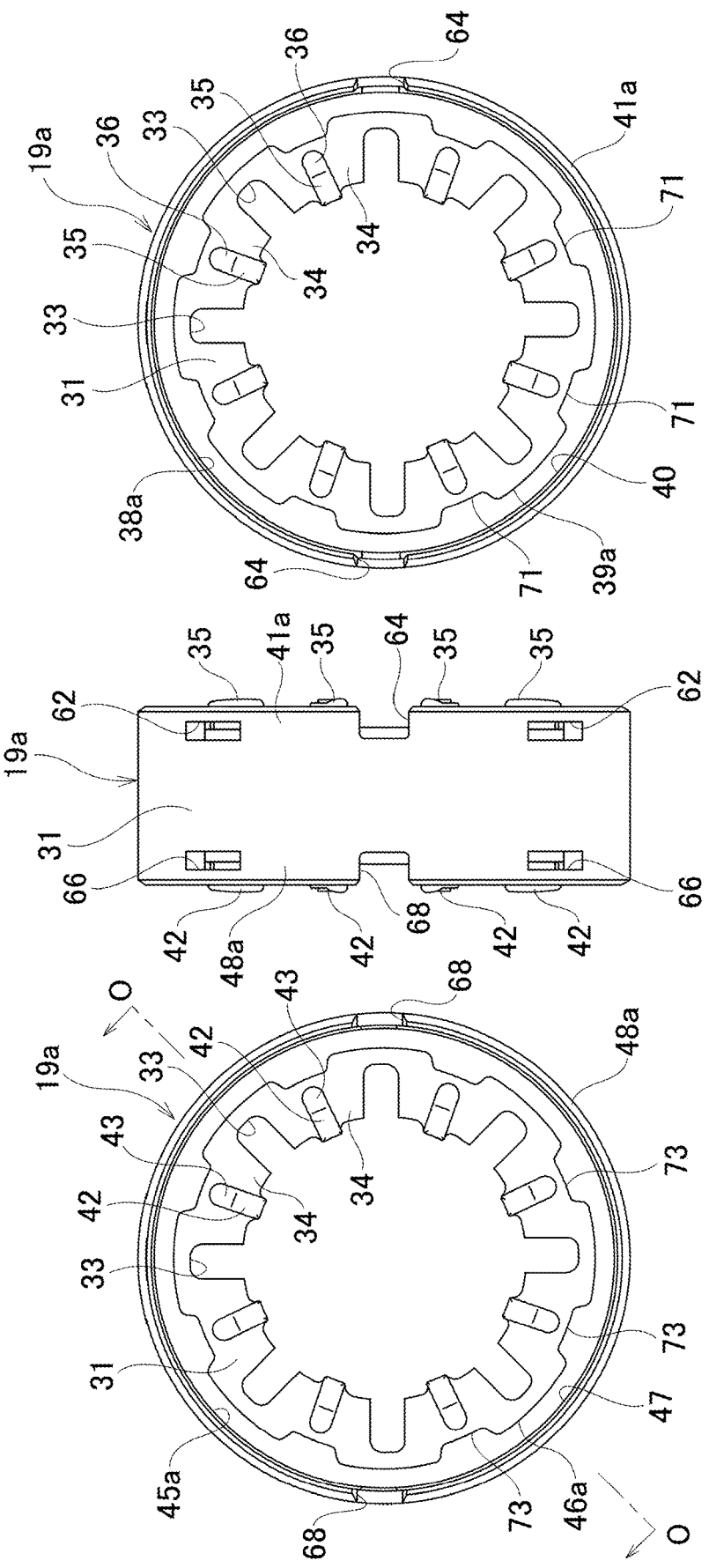
FIG. 24(a) through FIG. 24(c) show the intermediate transmission member of the second example.
Figure 25:
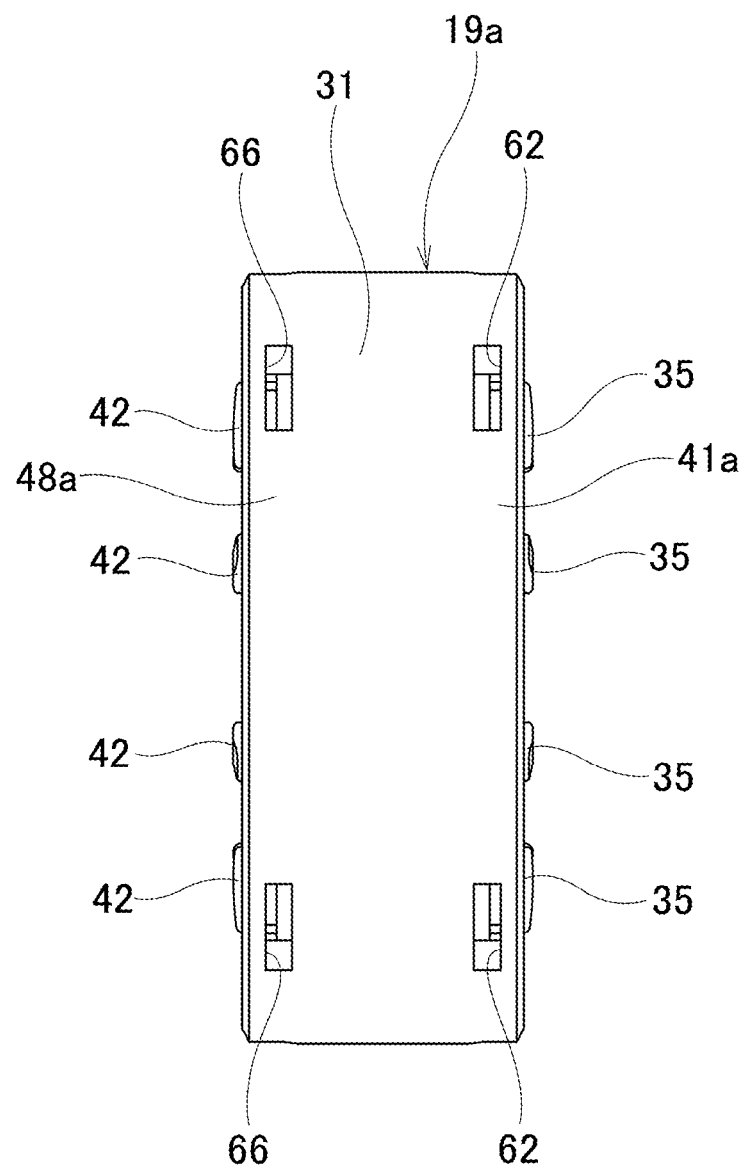
FIG. 25 is a figure which is viewed from above in FIG. 24(b).
Figure 26:
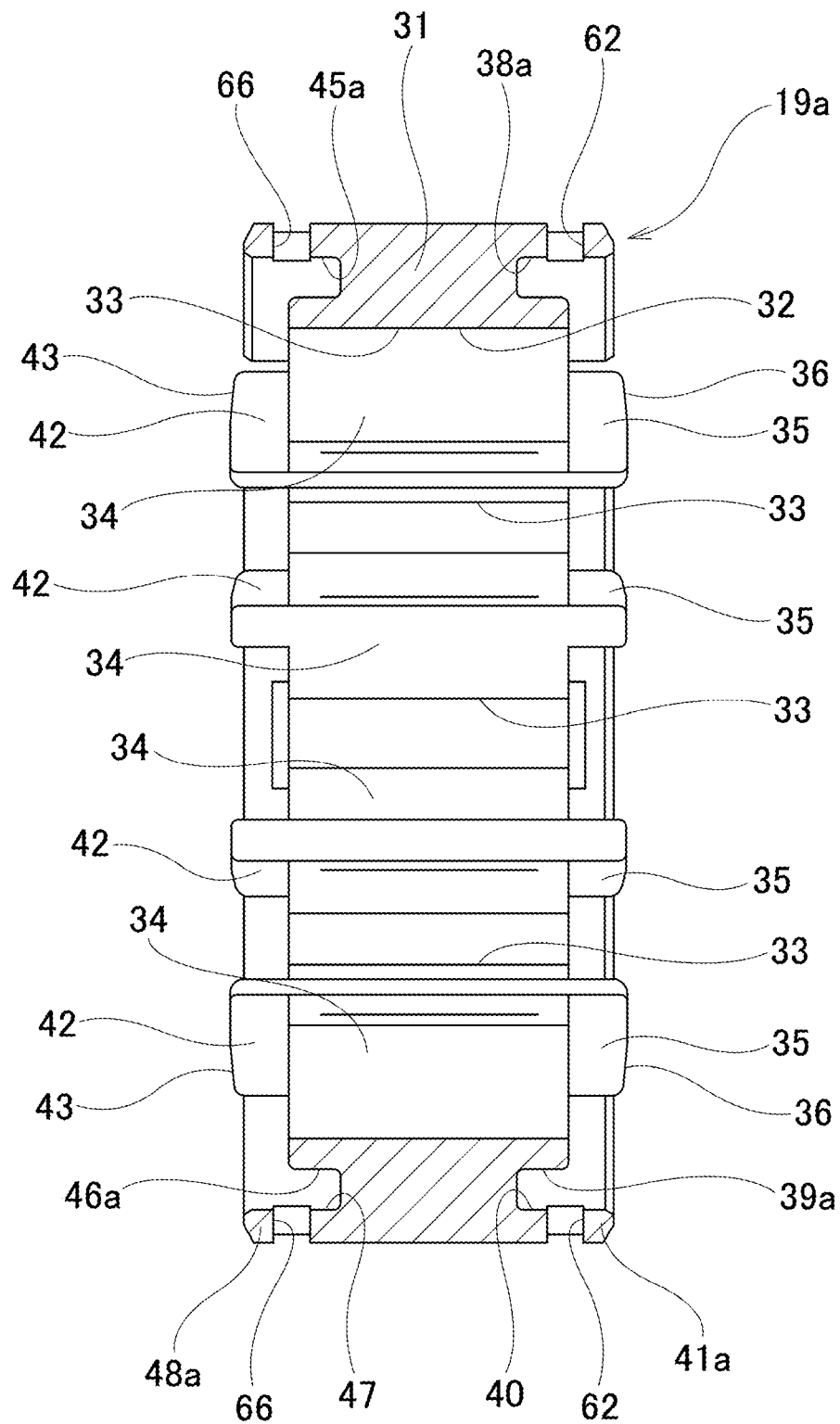
FIG. 26 is a cross sectional view taken along the line O-O of FIG. 24(a).
Figure 28C:
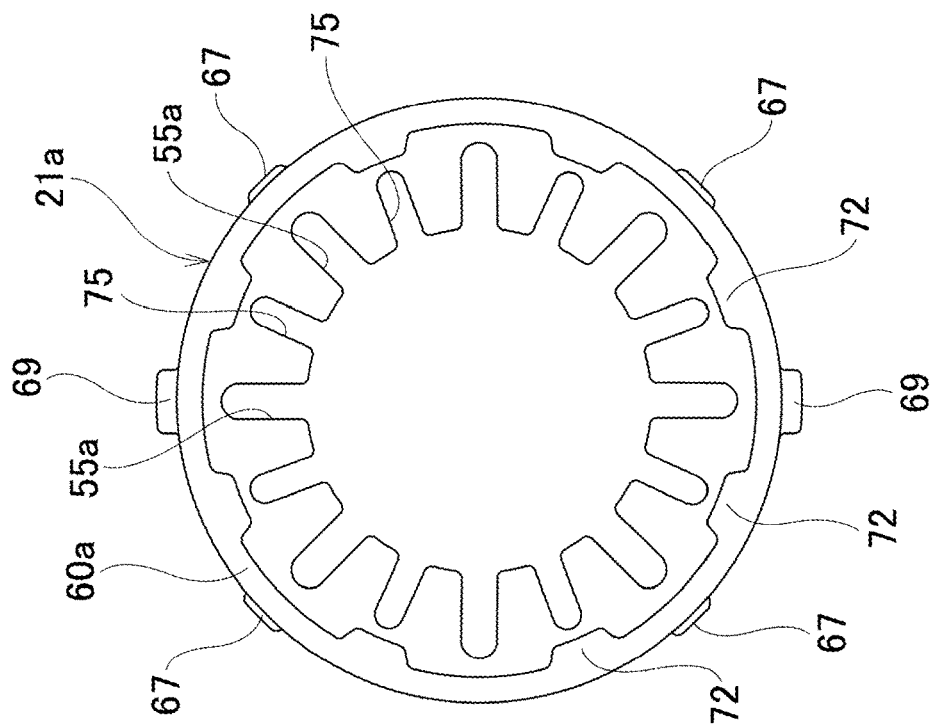
FIG. 28(a) through FIG. 28(c) show the second elastic member of the second example.
Figure 28B:
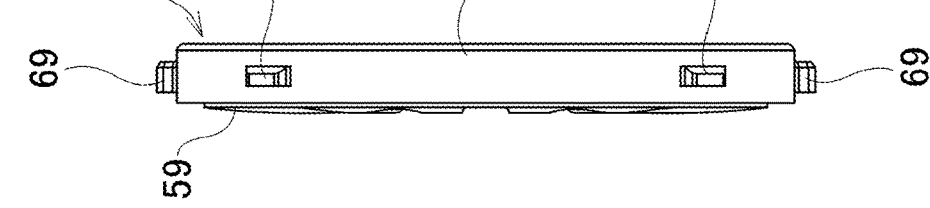
Figure 28A:
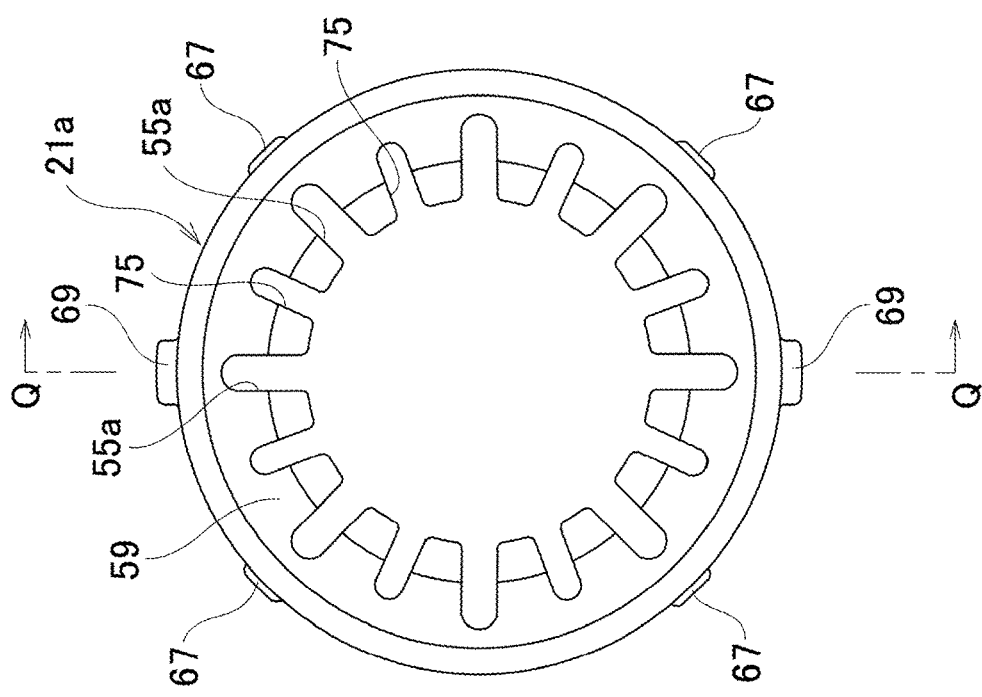
Figure 29:
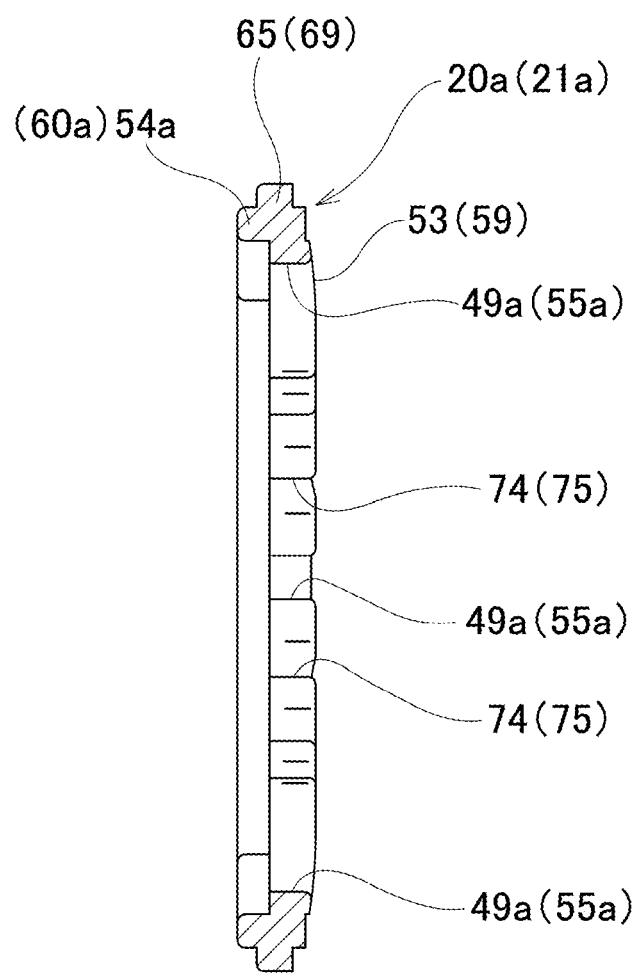
FIG. 29 is a cross sectional view taken along the line P-P of FIG. 27(a), or a cross sectional view taken along the line Q-Q of FIG. 28(a).

The first elastic member 20 is, for example, as illustrated in FIG. 8, FIG. 9, and FIG. 12, assembled to a portion on one side in the axial direction of the intermediate transmission member 19 and covers one side surface in the axial direction of the intermediate transmission member 19.

In this state, the first tooth sections 35 is engaged inside the first through holes 51 without causing rattle at least in the circumferential direction among the circumferential direction and the radial direction. In the present example, based on the engagement of the first through holes 51 and the first tooth sections 35, torque is able to be transmitted between the intermediate transmission member 19 and the first elastic member 20. There may be rattle in the radial direction and the circumferential direction in the area of engagement between the first through holes 51 and the first tooth sections 35.

Furthermore, the first engaging beams 52 are engaged in the other side surface in the axial direction (inside surface in the axial direction) of the first engaging projections 37. Due to this, displacement of the first elastic member 20 to the one side in the axial direction with respect to the intermediate transmission member 19 is prevented, and separation between the intermediate transmission member 19 and the first elastic member 20 is prevented. Further, as the first annular convex portion 54 is pressure fitted inside the first annular concave portion 38, the first annular convex portion 54 is elastically compressed by the inner diameter side circumferential surface 39 and the outer diameter side circumferential surface 40 of the inner surface of the first annular concave portion 38. That is, in this state, the inner diameter side circumferential surface 39 and the outer diameter side circumferential surface 40 and both of circumferential surfaces of the first annular convex portion 54 are in elastic contact and in strong frictional engagement respectively. Further, the outer circumferential surface of the first elastic member 20 is fitted with a tight fit inside the inner circumferential surface of the first cylindrical portion 41, and the outer circumferential surface of the first elastic member 20 and the inner circumferential surface of the first cylindrical portion 41 are in elastic contact and in strong frictional engagement. In the present example, due to the frictional engagement between each of these circumferential surfaces as well, displacement of the first elastic member 20 to the one side in the axial direction with respect to the intermediate transmission member 19 is prevented, and separation between the intermediate transmission member 19 and the first elastic member 20 is prevented. Further, in the present example, the outer circumferential surface of the first elastic member 20 is covered by the first cylindrical portion 41. Due to this, during transportation, it is prevented that other objects hit or stuck to the outer circumferential surface of the first elastic member 20, and separation between the intermediate transmission member 19 and the first elastic member 20 is prevented. In case of embodying the present invention, it is possible that one of the circumferential surfaces of the first annular convex portion 54 is elastically contacted to either one of the inner diameter side circumferential surface 39 and the outer diameter side circumferential surface 40 of the first annular concave portion 38, and the other of the circumferential surfaces of the first annular convex portion 54 is simply contacted (without interference) or faced through a gap without contact to the other of the inner diameter side circumferential surface 39 and the outer diameter side circumferential surface 40. Further, it is also possible to make the outer circumferential surface of the first elastic member 20 simply contact or face through a gap without contact to the inner circumferential surface of the first cylindrical portion 41.

Further, the one side surface in the axial direction of the first elastic member 20 is located on the one side in the axial direction than the tip end surface of the respective first tooth sections 35. Moreover, the inner circumferential surface of the first elastic member 20 is located on the inside in the radial direction than the inside surface in the radial direction of the respective convex portions 34 of the intermediate uneven section 32 and the inner end edge in the radial direction of the respective first engaging projections 37.

The second elastic member 21 is, for example, as illustrated in FIG. 17, made entirely circular ring shaped with elastic materials such as rubber (NBR, HNBR, or the like) and elastomer (polyurethane, silicone, or the like) that have lower rigidity than the intermediate transmission member 19. The second elastic member 21 is assembled to the other side in the axial direction of the intermediate transmission member 19.

The second elastic slits 55 are provided in a plurality of places of the second elastic member 21 which are arranged in the same phase in the circumferential direction as the concave portions 33 of the intermediate uneven section 32. The second elastic slits 55 extend in the radiation direction of the second elastic member 21, and are opened to the inner perimeter edge of the second elastic member 21. In sections near the outer end in the radial direction of both side edges in the circumferential direction of the respective second elastic slits 55, a pair of elastic protrusions 56 is provided so as to protrude toward the center side of the second elastic slits 55 in the circumferential direction. The shape of the tip end surface of the respective elastic protrusions 56 as seen from the axial direction is a convex arc. Further, sections that deviate from the elastic protrusions 56 of both side edges in the circumferential direction of the respective second elastic slits 55 are flat sections 77 that are parallel to each other. The space in the circumferential direction of the both end edges in the circumferential direction of the respective second elastic slits 55 (the space in the circumferential direction of the tip-end sections of the respective pair of elastic protrusions 56) $t_{55}$ is made smaller than the space in the circumferential direction $T_{33}$ of both side edges in the circumferential direction of the respective concave portions 33 of the intermediate uneven section 32 ($t_{55} < T_{33}$). Further, in the present example, the space in the circumferential direction of the flat sections 77 of the both side edges in the circumferential direction of the second elastic slits 55 is made smaller than the space in the circumferential direction $T_{33}$ of both side edges in the circumferential direction of the respective concave portions 33 as well. In case of embodying the present invention, the shape of the tip end surface of the respective elastic protrusion 56 as seen from the axial direction is not limited to convex arc, but it is also possible to be other shapes such as triangular, trapezoidal, and the like. Further, the location of the elastic protrusion 56 in the radial direction with respect to the both side edges in the circumferential direction of the second elastic slits 55 can be a location in the radial direction that is different from the present example. Furthermore, the number of the elastic protrusion that is provided on each of both side edges in the circumferential direction of the respective second elastic slits 21 is not limited to one, but can be more than one. It is also possible to omit the respective elastic protrusion 56 and make the overall both side edges in the circumferential direction of the second elastic slits to be flat sections that are parallel to each other. The flat sections provided on both side edges in the circumferential direction of the respective second elastic slits may be inclined to each other.

Further, the second through hole 57 that corresponds to a section with material removed is provided in every center section in the circumferential direction between the second elastic slits 55 adjacent in the circumferential direction of the second elastic member 21. The shape of the respective second through holes 57 as seen from the axial direction is substantially rectangular extending in the radial direction of the second elastic member 21. Further, the second engaging beam 58 is provided in every section of the second elastic member 21 that is sandwiched between the inner circumferential surface of the second elastic member 21 and the second through hole 57 in the radial direction. Every section of the other side surface in the axial direction of the second elastic member 21 that corresponds to the second engaging beam 58 is recessed to the one side in the axial direction. Further, the intermediate section in the radial direction of the other side surface in the axial direction of the second elastic member 21 is constructed by a tilted side surface section 59.

The tilted side surface section 59 is inclined in a direction toward the one side in the axial direction which is the center side in the axial direction of the intermediate transmission member 19 in the axial direction toward the outside in the radial direction.

Further, the second elastic member 21 has the second annular concave portion 60 that corresponds to a convex portion in the circumferential direction in the outer end portion in the radial direction which is outside in the radial direction than the respective second elastic slits 55 and the respective second through holes 57 so as to protrudes to the one side in the axial direction (inside in the axial direction). The second annular concave portion 60 extends in the circumferential direction of the second elastic member 21 and is provided over the whole circumference of the second elastic member 21.

The second elastic member 21 is, for example, as illustrated in FIG. 8, FIG. 9, and FIG. 12, assembled to a portion on the other side in the axial direction of the intermediate transmission member 19 and covers the other side surface in the axial direction of the intermediate transmission member 19.

In this state, the second tooth sections 42 is engaged inside the second through holes 57 without causing rattle at least in the circumferential direction among the circumferential direction and the radial direction. In the present example, based on the engagement of the second through holes 57 and the second tooth sections 42, torque is able to be transmitted between the intermediate transmission member 19 and the second elastic member 21. There may be rattle in the radial direction and the circumferential direction in the area of engagement between the second through holes 57 and the second tooth sections 42.

Furthermore, the second engaging beams 58 are engaged in the one side surface in the axial direction (inside surface in the axial direction) of the second engaging projections 44. Due to this, displacement of the second elastic member 21 to the other side in the axial direction with respect to the intermediate transmission member 19 is prevented, and separation between the intermediate transmission member 19 and the second elastic member 21 is prevented. Further, as the second annular concave portion 45 is pressure fitted inside the second annular concave portion 60, the second annular concave portion 45 is elastically compressed by the inner diameter side circumferential surface 46 and the outer diameter side circumferential surface 47 of the inner surface of the second annular concave portion 45. That is, in this state, the inner diameter side circumferential surface 46 and the outer diameter side circumferential surface 47 and both of circumferential surfaces of the second annular concave portion 60 are in elastic contact and in strong frictional engagement respectively. Further, the outer circumferential surface of the second elastic member 21 is fitted with a tight fit inside the inner circumferential surface of the second cylindrical portion 48, and the outer circumferential surface of the second elastic member 21 and the inner circumferential surface of the second cylindrical portion 48 are in elastic contact and in strong frictional engagement. In the present example, due to the frictional engagement between each of these circumferential surfaces as well, displacement of the second elastic member 21 to the other side in the axial direction with respect to the intermediate transmission member 19 is prevented, and separation between the intermediate transmission member 19 and the second elastic member 21 is prevented. Further, in the present example, the outer circumferential surface of the second elastic member 21 is covered by the second cylindrical portion 48. Due to this, during transportation, it is prevented that other objects hit or stuck to the outer circumferential surface of the second elastic member 21, and separation between the intermediate transmission member 19 and the second elastic member 21 is prevented. In case of embodying the present invention, it is possible that one of the circumferential surfaces of the second annular concave portion 60 is elastically contacted (or fitted in a state of having a margin) only to either one of the inner diameter side circumferential surface 46 and the outer diameter side circumferential surface 47 of the second annular concave portion 45, and the other of the circumferential surfaces of the second annular convex portion 60 is simply contacted or faced through a gap without contact to the other of the inner diameter side circumferential surface 46 and the outer diameter side circumferential surface 47. Further, it is also possible to make the outer circumferential surface of the second elastic member 21 simply contact or face through a gap without contact to the inner circumferential surface of the second cylindrical portion 48.

Further, the other side surface in the axial direction of the second elastic member 21 is located on the other side in the axial direction than the tip end surface of the respective second tooth sections 42. Moreover, the inner circumferential surface of the second elastic member 21 is located on the inside in the radial direction than the inside surface in the radial direction of the respective convex portions 34 of the intermediate uneven section 32 and the inner end edge in the radial direction of the second engaging projections 44.

In the present example, the first elastic member 20 and the second elastic member 18 are made to be the same shape and the same size. Therefore, in the present example, the first elastic member 20 and the second elastic member 21 can share common parts.

Further, in the present example, in a state where a combined body 61 comprising the intermediate transmission member 19, the first elastic member 20, and the second elastic member 21 is assembled, in the intermediate section in the radial direction of both side surfaces in the axial direction of the combined body 61, tilted side surface sections (36, 53) (43, 59) which are tilted to the direction toward the center side in the axial direction of the intermediate transmission member 19 are provided.

Figure 11:
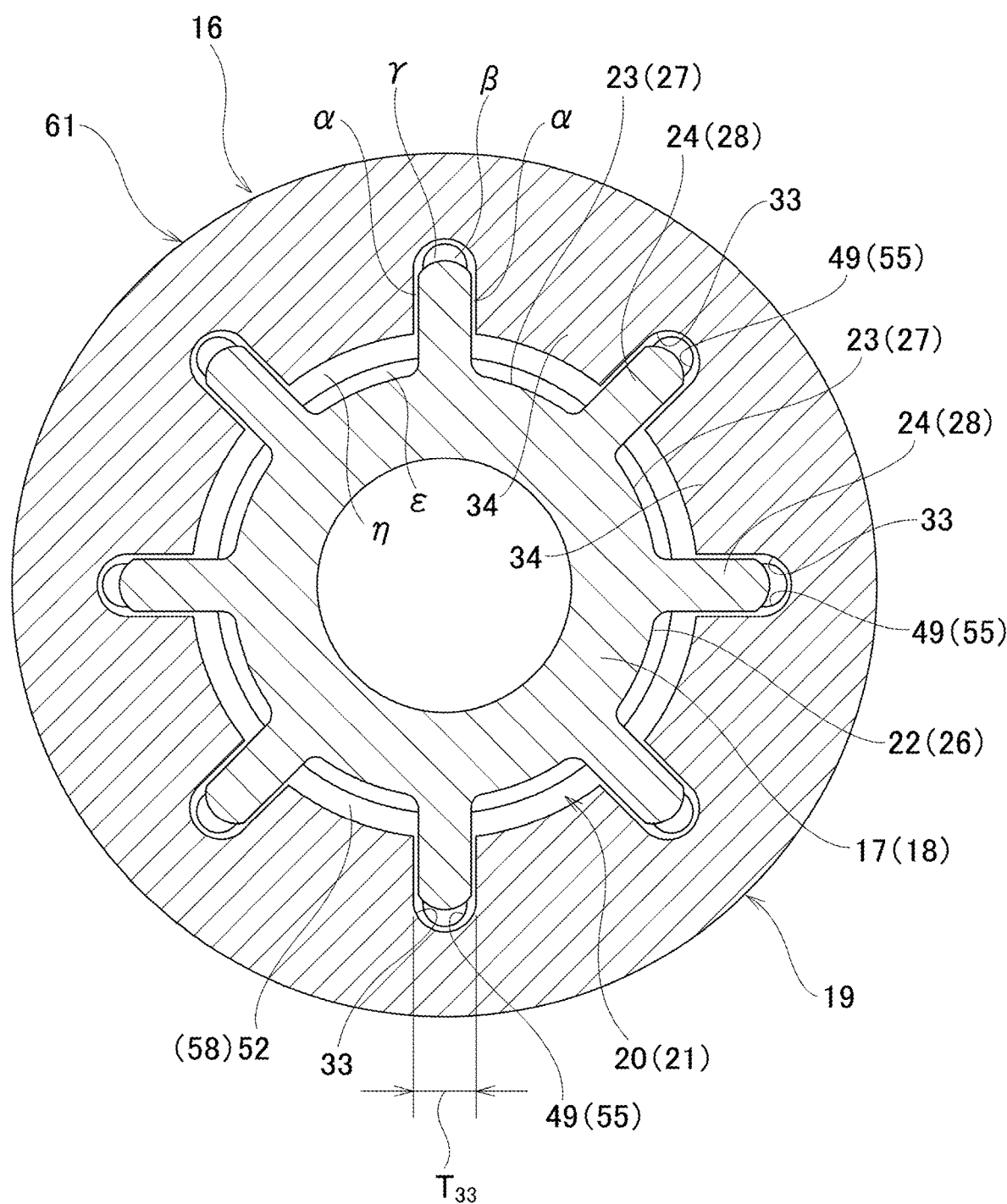
FIG. 11 is a cross sectional view taken along the line E-E or F-F of FIG. 8

Further, in the present example, in a state where the combined body 61 is assembled, the other side end section in the axial direction and the intermediate section of the first transmission member 17 are inserted into the inside in the radial direction of the one side section in the axial direction of the combined body 61 from the one side in the axial direction. Due to this, the convex portions 24 of the first uneven portion 22 are engaged with the first elastic slits 49 of the first elastic member 20 with the first clearance in the circumferential direction which is a predetermined clearance in the circumferential direction interposed, and the convex portions 24 of the first uneven portion 22 are engaged with the one side section in the axial direction of the concave portions 33 of the intermediate uneven section 32 of the intermediate transmission member 19 with a clearance in the circumferential direction which is larger than the first clearance in the circumferential direction interposed. In particular, in the present example, the first clearance in the circumferential direction is made as a negative clearance. That is, in the present example, by pressure fitting the convex portions 24 to the inside of the first elastic slits 49, the flat sections 76 and the elastic protrusions 50 of both side edges in the circumferential direction of the respective first elastic slits 49 are elastically contacted (in a state of having an interference) to both side surfaces in the circumferential direction of the respective convex portions 24 of the first uneven portion 22. Due to this, the convex portions 24 of the first uneven portion 22 are engaged with the first elastic slits 49 without rattle in the circumferential direction. Especially, in the present example, in this state, the elastic protrusions 50 of both side edges in the circumferential direction of the respective first elastic slits 49 are elastically in stronger contact with both side surfaces of the respective convex portion 24 compared to the flat sections 76. On the other hand, in the present example, the clearance in the circumferential direction interposed in the engagement section between the respective convex portions 24 of the first uneven portion 22 and the respective concave portions 33 of the intermediate uneven section 32 is made as a positive clearance. That is, a positive clearance $\alpha$ in the circumferential direction such as illustrated in FIG. 11 is interposed between each of the side surfaces in the circumferential direction of the respective convex portions 24 of the first uneven portion and the convex portions 34 of the intermediate uneven section 32 without contact. Further, by making the side surface 30*a* for positioning which is the other side surface in the axial direction of the first flange section 25 come closer to or come into contact with the one side surface in the axial direction of the combined body 61, positioning in the axial direction of the first transmission member 17 with respect to the combined body 61 is achieved. In case of embodying the present invention, the first clearance in the circumferential direction can also be made as zero. That is, it is possible to make both side edges in the circumferential direction of the respective first elastic slits 49 come into contact with both side surfaces in the circumferential direction of the respective convex portions 24 in a state of having no interference. Further, the first clearance in the circumferential direction can be a positive gap as well.

Figure 10:
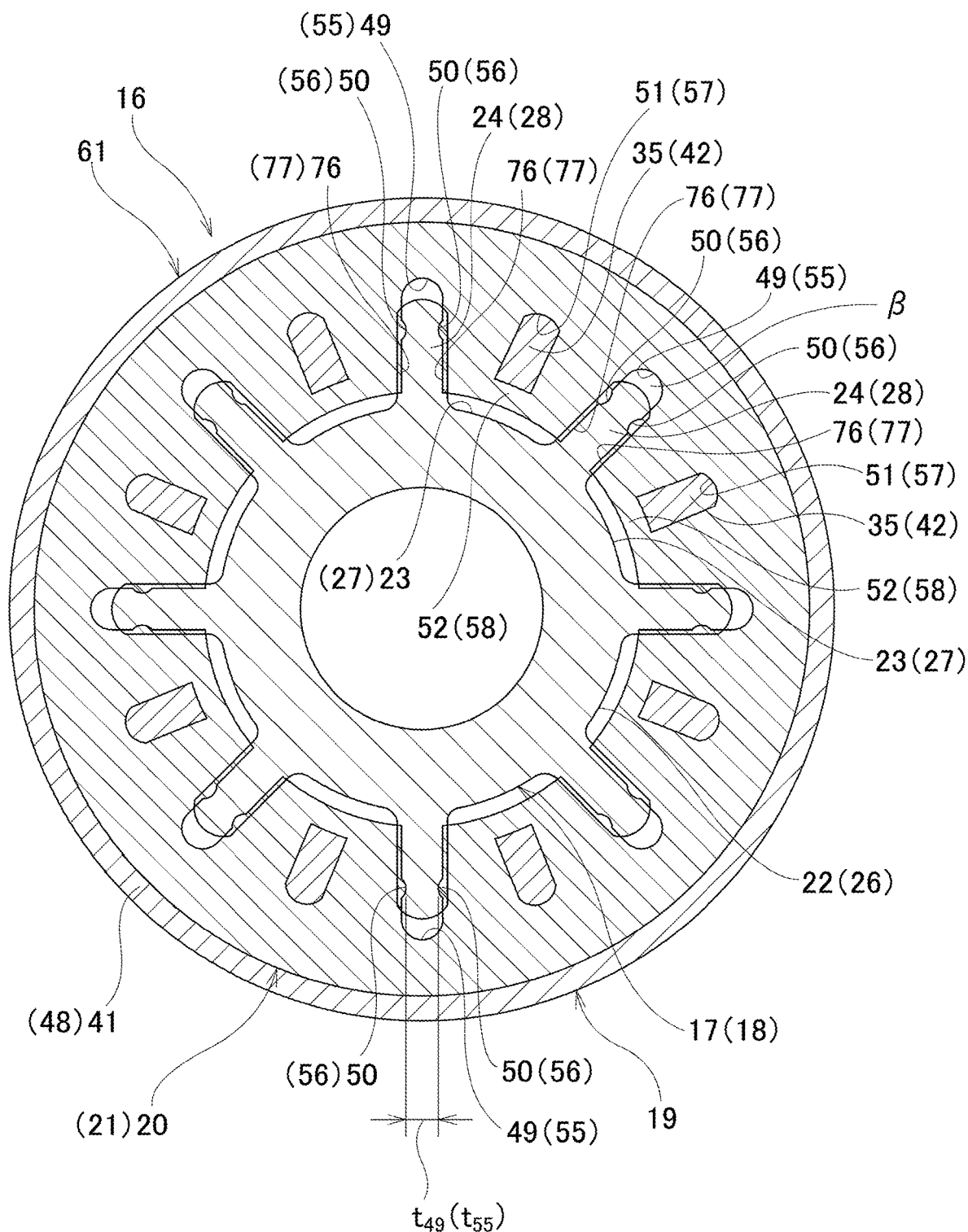
FIG. 10 is a cross sectional view taken along the line C-C or D-D of FIG. 8.

Further, in the present example, in this state, a positive clearance $\beta$ in the radial direction is interposed between the outer end surface in the radial direction of the respective convex portions 24 of the first uneven portion 22 and the bottom surface of the respective first elastic slits 49, and a positive clearance $\gamma$ in the radial direction is interposed between the outer end surface in the radial direction of the respective convex portions 24 of the first uneven portion 22 and the bottom surface of the respective concave portions 33 of the intermediate uneven section 32 (see FIG. 10 and FIG. 11). Further, the clearance $\beta$ in the radial direction is made smaller than the clearance $\gamma$ in the radial direction ($\beta < \gamma$). Furthermore, a clearance $\varepsilon$ in the radial direction is interposed between the bottom surface of the respective concave portions 23 of the first uneven portion 22 and the inner circumferential surface of the first elastic member 20, and a clearance $\eta$ in the radial direction is interposed between the bottom surface of the respective concave portions 23 of the first uneven portion 22 and the inside surface in the radial direction which is the tip end surface of the respective convex portions 34 of the intermediate uneven section 32 (see FIG. 11). Further, the clearance $\varepsilon$ in the radial direction is made smaller than the clearance $\eta$ in the radial direction ($\varepsilon < \eta$).

Further, in the present example, in a state where the combined body 61 is assembled, the one end section in the axial direction and the intermediate section of the second transmission member 18 are inserted into the inside in the radial direction of the other side section in the axial direction of the combined body 61 from the other side in the axial direction. Due to this, the convex portions 28 of the second uneven portion 26 are engaged with the second elastic slits 55 of the second elastic member 21 with the second clearance in the second circumferential direction which is a predetermined clearance in the circumferential direction interposed, and the convex portions 28 of the second uneven portion 26 are engaged with the other side section in the axial direction of the concave portions 33 of the intermediate uneven section 32 of the intermediate transmission member 19 with a clearance in the circumferential direction which is larger than the second clearance in the circumferential direction interposed. In particular, in the present example, the second clearance in the circumferential direction is made as a negative gap. That is, in the present example, by pressure fitting the convex portions 28 to the inside of the second elastic slits 55, the flat sections 77 and the elastic protrusions 56 of both side edges in the circumferential direction of the respective second elastic slits 55 are elastically contacted (in a state of having an interference) to both side surfaces in the circumferential direction of the respective convex portions 28 of the second uneven portion 26. Due to this, the convex portions 28 of the second uneven portion 26 are engaged with the second elastic slits 55 without rattle in the circumferential direction. Especially, in the present example, in this state, the elastic protrusions 56 of both side edges in the circumferential direction of the second elastic slits 55 are elastically in stronger contact with both side surfaces of the respective convex portions 28 compared to the flat sections 77. On the other hand, in the present example, the clearance in the circumferential direction interposed in the engagement section between the respective convex portions 28 of the second uneven portion 26 and the concave portions 33 of the intermediate uneven section 32 is made as a positive clearance. That is, a positive clearance α in the circumferential direction such as illustrated in FIG. 11 is interposed between each of the side surfaces in the circumferential direction of the respective convex portions 28 of the second uneven portion 26 and the respective convex portions of the intermediate uneven section 32 without contact. Further, by making the side surface 30b for positioning which is the one side surface in the axial direction of the second flange section 29 come closer to or come into contact with the other side surface in the axial direction of the combined body 61, positioning in the axial direction of the second transmission member 18 with respect to the combined body 61 is achieved. In case of embodying the present invention, the second clearance in the circumferential direction can also be made as zero. That is, it is possible to make both side edges in the circumferential direction of the second elastic slits 55 come into contact with both side surfaces in the circumferential direction of the respective convex portions 28 in a state of having no interference. Further, the second clearance in the second circumferential direction can be a positive clearance as well.

Further, in the present example, in this state, a positive clearance β in the radial direction is interposed between the outer end surface in the radial direction of the respective convex portions 24 of the second uneven portion 26 and the bottom surface of the respective second elastic slits 55, and a positive clearance γ in the radial direction is interposed between the outer end surface in the radial direction of the respective convex portions 28 of the second uneven portion 26 and the bottom surface of the respective concave portions 33 of the intermediate uneven section 32 (see FIG. 10 and FIG. 11). Further, the clearance β in the radial direction is made smaller than the clearance γ in the radial direction (β<γ). Furthermore, a clearance ε in the radial direction is interposed between the bottom surface of the respective concave portions 27 of the second uneven portion 26 and the inner circumferential surface of the second elastic member 21, and a clearance η in the radial direction is interposed between the bottom surface of the respective concave portions 27 of the second uneven portion 26 and the inside surface in the radial direction which is the tip end surface of the respective convex portions 34 of the intermediate uneven section 32 (see FIG. 11). Further, the clearance ε in the radial direction is made smaller than the clearance η in the radial direction (ε<η)

Further, in a state where the torque transmission joint 16 of the present example is assembled to the electric-powered power steering apparatus, the distance $L_{30}$ in the axial direction between the side surface 30a for positioning of the first transmission member 17 and the side surface 30b for positioning of the second transmission member 18 is made larger than the width dimension $W_{61}$ in the axial direction of the combined body 61 ($L_{30}$>$W_{61}$).

In the electric-powered power steering apparatus of the present example, when the torque which is transmitted between the output shaft 12 of the electric motor 7a and the worm 8 is relatively small, the rotational torque of the output shaft 12a is transmitted in the following order of: the first transmission member 17; the first elastic member 20; the intermediate transmission member 19; the second elastic member 21; the second transmission member 18; and the worm 8. That is, the rotational torque of the output shaft 12a is transmitted from the first transmission member 17 to the first elastic member 20 via the engagement section between the convex portions 24 of the first uneven portion 22 and the first elastic slits 49. Further, the torque which is transmitted to the first elastic member 20 is transmitted to the intermediate transmission member 19 via the engagement section between the first elastic member 20 and the first tooth sections 35 of the intermediate transmission member 19. Further, the torque which is transmitted to the intermediate transmission member 19 is transmitted to the second elastic member 21 via the engagement section between the second tooth section 42 of the intermediate transmission member 19 and the second elastic member 21. Further, the torque which is transmitted to the second elastic member 21 is transmitted to the second transmission member 18 and the worm 8 via the engagement section between the second elastic slits 55 and the convex portions 28 of the second uneven portion 26.

On the contrary, when the torque which is transmitted between the output shaft 12a and the worm 8 becomes large, part of the first elastic member 20 is elastically crushed in the circumferential direction by the convex portions 24 of the first uneven portion 22, and part of the second elastic member 21 is elastically crushed in the circumferential direction by the convex portions 28 of the second uneven portion 26. Then, the side surface in the circumferential direction of the respective convex portions 24 of the first uneven portion 22 and the side surface in the circumferential direction of the respective convex portions 34 of the intermediate uneven section 32 come into contact, and the side surface in the circumferential direction of the respective convex portions 28 of the second uneven portion 26 and the side surface in the circumferential direction of the respective convex portions 34 of the intermediate uneven section 32 come into contact. As the contact force of these is weakened by the partial elastic deformation of the first elastic member 20 and the second elastic member 21, occurrence of noise due to contact can be suppressed. In this state, the large portion of the rotational torque of the output shaft 12a is transmitted via the engagement section between the first uneven portion 22 and the intermediate uneven section 32 to the intermediate transmission member 19, and the large portion of the torque which is transmitted to the intermediate transmission member 19 is transmitted via the engagement section between the intermediate uneven section 32 and the second uneven portion 26 to the worm 8. Further, the rest of the torque is transmitted from the output shaft 12a to the worm 8 as in the above case where the torque is small.

Further, in the present example, when reversing the direction of rotation of the output shaft 12 of the electric motor 7a as well, the contact force between the side surface in the circumferential direction of the respective convex portions 24 of the first uneven portion 22 and the side surface in the circumferential direction of the respective convex portions 34 of the intermediate uneven section 32, and between the side surface in the circumferential direction of the respective convex portions 28 of the second uneven portion 26 and the side surface in the circumferential direction of the respective convex portions 34 of the intermediate uneven section 32 is weakened by the deformation of the first elastic member 20 and the second elastic member 21, so it is possible to suppress occurrence of noise due to contact.

In the illustrated example, the side surfaces in the circumferential direction that face each other of the convex portions 34 that are adjacent in the circumferential direction of the intermediate uneven section 32 are constructed by planes that are parallel to each other, and, both side surfaces in the circumferential direction of the respective convex portions 24 of the first uneven portion 22 (the respective convex portions 28 of the second uneven portion 26) are constructed by planes that are parallel to each other as well. However, in case of embodying the present invention, in order for the side surfaces in the circumferential direction to easily come into surface contact between the respective convex portions 34 of the intermediate uneven section 32 and the respective convex portions 24 of the first uneven portion 22 (the respective convex portions 28 of the second uneven portion 26) when transmitting torque, it is also possible to employ at least either one of a configuration where the side surfaces in the circumferential direction that face each other of the convex portions 34 that are adjacent in the circumferential direction of the intermediate uneven section 32 are tilted toward each other, and a configuration where the both sides in the circumferential direction of the respective convex portions 24 of the first uneven portion 22 (the respective convex portions 28 of the second uneven portion 26) are tilted toward each other.

As described above, the electric-powered power steering apparatus of the present example has a two-step characteristic, in which the torsional rigidity of the torque transmission joint 16 becomes small when the transmitted torque is small, and becomes large when the transmitted torque is large. However, in case of embodying the present invention, for example, by differencing the clearance in the circumferential direction of the engagement section between the respective convex portions 24 of the first uneven portion 22 and the respective concave portions 33 of the intermediate uneven section 32 and the clearance in the circumferential direction of the engagement section between the respective convex portions 28 of the second uneven portion 26 and the respective concave portions 33 of the intermediate uneven section 32, or differencing the elasticity of the first elastic member 20 and the elasticity of the second elastic member 21, or by providing a positive clearance in the circumferential direction in each of the engagement sections between the convex portions 24 of the first uneven portion 22 and the first elastic slits 49 of the first elastic member 20 as well as in the engagement sections between the convex portions 28 of the second uneven portion 26 and the second elastic slits 55 of the second elastic member 21, or by differencing these clearances in the circumferential direction from each other, it is possible to make the torsional rigidity of the torque transmission joint 16 more than two steps.

Further, in the present example, clearances $\beta, \gamma, \varepsilon, \eta$ in the radial direction are interposed respectively in the engagement section between the first uneven portion 22 and the first elastic member 20, and the engagement section between the first uneven portion 22 and the intermediate uneven section 32. Together with this, the intermediate section in the radial direction of the one side surface in the axial direction of the combined body 61 comprises tilted side surface sections 36, 53 that are tilted in the direction toward the center side of the intermediate transmission member 19 in the axial direction toward outside in the radial direction. Due to this, it is possible to allow inclination of center axis of the first transmission member 17 and the combined body 61 without difficulty.

Further, in the present example, clearances $\beta, \gamma, \varepsilon, \eta$ in the radial direction are interposed respectively in the engagement section between the second uneven portion 26 and the second elastic member 21, and the engagement section between the second uneven portion 26 and the intermediate uneven section 32. Together with this, the intermediate section in the radial direction of the other side surface in the axial direction of the combined body 61 comprises tilted side surface sections 43, 59 that are tilted in the direction toward the center side of the intermediate transmission member 19 in the axial direction toward outside in the radial direction. Due to this, it is possible to allow inclination of center axis of the second transmission member 18 and the combined body 61 without difficulty.

Therefore, in the present example, even if misalignment such as imperfect alignment and eccentricity of the output shaft 12a of the electric motor 7 and imperfect alignment and inclination and eccentricity of the worm shaft 6a occurs, it is possible to smoothly transmit torque as the center axis of the combined body 61 inclines without difficulty with respect to the center axis of the first transmission member 17 and the second transmission member 18.

Further, as described above, in the present example, the one side surface in the axial direction of the body section 31 of the intermediate transmission member 19 is covered with the first elastic member 20, and the one side surface in the axial direction of the first elastic member 20 is located on the one side in the axial direction than the tip end surface of the first tooth sections 35. Furthermore, the other side surface in the axial direction of the body section 31 of the intermediate transmission member 19 is covered with the second elastic member 21, and the other side surface in the axial direction of the second elastic member 21 is located on the other side in the axial direction than the tip end surface of the second tooth sections 42.

Therefore, in the present example, even if large eccentricity, inclination, or the like occurs between the first transmission member 17 and the second transmission member 18, based on the existence of the first elastic member 20, it is possible to prevent that the side surface 30a for positioning which is the other side surface in the axial direction of the first flange section 25 comes into contact with the one side surface in the axial direction of the body section 31 and the tip end surface of the first tooth sections 35. Further, based on the existence of the second elastic member 21, it is possible to prevent that the side surface 30b for positioning which is the one side surface in the axial direction of the second flange section 29 comes into contact with the other side surface in the axial direction of the body section 31 and the tip end surface of the second tooth section 42.

In this case, even if the first elastic member 20 (the second elastic member 21) is elastically crushed and the side surface 30a (30b) for positioning comes into contact with the tip end surface of the respective first tooth sections 35 (second tooth section 42), the contact force between them is weakened by elastic deformation of the first elastic member 20 (the second elastic member 21) so that it is possible to suppress occurrence of noise due to contact.

Further, as described above, in the present example, the inner circumferential surface of the first elastic member 20 is located inside in the radial direction than the inside surface in the radial direction of the respective convex portions 34 of the intermediate uneven section 32 and the inner end edge in the radial direction of the respective first engaging projections 37. Further, the inner circumferential surface of the second elastic member 21 is located inside in the radial direction than the inside surface in the radial direction of the respective convex portions 34 of the intermediate uneven section 32 and the inner end edge in the radial direction of the respective second engaging projections 44. Furthermore, regarding the clearances $\beta$, $\gamma$, $\varepsilon$, $\eta$ in the radial direction, the relation is $\beta<\gamma$ and $\varepsilon<\eta$.

Therefore, in case if large eccentricity, inclination, or the like occurs between the first transmission member 17 and the second transmission member 18, it is possible to make the bottom surface of the respective concave portions 23 of the first uneven portion 22 comes into contact with the inner circumferential surface of the first elastic member 20, and make the outer end surface in the radial direction of the respective convex portions 24 of the first uneven portion 22 comes into contact with the bottom surface of the respective first elastic slits 49. Further, it is possible to make the bottom surface of the respective concave portions 27 of the second uneven portion 26 comes into contact with the inner circumferential surface of the second elastic member 21, and make the outer end surface in the radial direction of the respective convex portions 28 of the second uneven portion 26 comes into contact with the bottom surface of the respective second elastic slits 55. Due to this, it is possible to prevent that the bottom surface of the respective concave portions 23 of the first uneven portion 22 comes into contact with the inside surface in the radial direction of the respective convex portions 34 of the intermediate uneven section 32 and the inner end section in the radial direction of the respective first engaging projections 37, and the outer end surface of the respective convex portions 24 of the first uneven portion 22 comes into contact with the bottom surface of the respective concave portions 33 of the intermediate uneven section 32. Further, it is possible to prevent that the bottom surface of the respective concave portions 27 of the second uneven portion 26 comes into contact with the inside surface in the radial direction of the respective convex portions 34 of the intermediate uneven section 32 and the inner end section in the radial direction of the respective second engaging projections 44, and the outer end surface of the respective convex portions 28 of the second uneven portion 26 comes into contact with the bottom surface of the respective concave portions 33 of the intermediate uneven section 32.

In this case, even if the inner end section in the radial direction of the first elastic member 20 (the second elastic member 21) or the first elastic slits 49 (second elastic slits 55) is elastically crushed and the bottom surface of the respective concave portions 23 (27) of the first uneven portion 22 (the second uneven portion 26) comes into contact with the inside surface in the radial direction of the respective convex portions 34 of the intermediate uneven section 32 or the inner end section in the radial direction of the respective first engaging projections 37 (second engaging projections 44), or even if the outer end surface of the respective convex portions 24 (28) of the first uneven portion 22 (the second uneven portion 26) comes into contact with the bottom surface of the respective concave portions 33 of the intermediate uneven section 32, the contact force between them is weakened by elastic deformation of the first elastic member 20 (the second elastic member 21) so that it is possible to suppress occurrence of noise due to contact.

In the first example of the embodiment explained above, the inner diameter side circumferential surface 39 (46) and the outer diameter side circumferential surface 40 (47) of the inner surface of the first annular concave portion 38 (the second annular concave portion 45) are formed as cylindrical surfaces so as to be coaxial with each other, however, in case of embodying the present invention, at least one of the inner diameter side circumferential surface and the outer diameter side circumferential surface of the inner surface of the first annular concave portion (the second annular concave portion) can be a partially conical surface that is inclined in the direction where the width dimension in the radial direction of the first annular concave portion (the second annular concave portion) becomes larger toward the opening side. In this case, the opening angle between the inner diameter side circumferential surface and the outer diameter side circumferential surface can be an acute angle as well as an obtuse angle. Further, in this case, the inner circumferential surface or the outer circumferential surface of the first annular convex portion (the second annular convex portion) that is pressure fitted to the first annular concave portion (the second annular concave portion) and becomes the mating face of the frictional engagement is also made as a partially conical surface that is inclined by the same angle in the same direction as the inner diameter side circumferential surface or the outer diameter side circumferential surface of the inner surface of the first annular concave portion (the second annular concave portion).

Second Example

The second example of an embodiment will be explained with reference to FIG. 18 to FIG. 29.

In the torque transmission joint 16 of the present example, the first cylindrical portion 41a of the intermediate transmission member 19a has the first through-holes 62, which are provided at a plurality of places in the circumferential direction, in a state of penetrating the first cylindrical portion 41a in the radial direction. On the other hand, the first elastic member 20a has the first main convex portions 63 at a plurality of places of the outer circumferential surface that are arranged in the same phase as the first through-holes 62 in the circumferential direction. In a state where the first elastic member 20a is assembled to one side section in the axial direction of the intermediate transmission member 19a, that is, in a state where the first elastic member 20a is fitted inside the first cylindrical portion 41a, the first main convex portions 63 of the first elastic member 20a are engaged with the first through-holes 62 of the first cylindrical portion 41a. Due to this, displacement of the first elastic member 20a to the one side in the axial direction with respect to the intermediate transmission member 19a is prevented, and separation between the intermediate transmission member 19*a* and the first elastic member 20*a* is prevented. In case of embodying the present invention, the combination of the first through-holes 62 and the first main convex portions 63 can be provided by any number of one or more, and it is possible to locate them in any phase in the circumferential direction.

Further, the first cylindrical portion 41*a* has the first notches 64 that are provided in a state of opening to one side edge in the axial direction of the first cylindrical portion 41*a* at two locations that deviates from the first through-holes 62 where the phase of placement in the circumferential direction is opposite side in the diameter direction. On the other hand, the first elastic member 20*a* has the first sub convex portions 65 that are able to engage with the first notches 64 at two locations of the outer circumferential surface where the phase is the same as the first notches 64 in the circumferential direction. By employing such a configuration, when assembling the first elastic member 20*a* to the one side section in the axial direction of the intermediate transmission member 19*a*, it is made easy to perform phase alignment between the first through-holes 62 and the first main convex portions 63 in the circumferential direction by inserting the first sub convex portions 65 to the inside of the first notches 64 from the one side in the axial direction. In case of embodying the present invention, the combination of the first notches 64 and the first sub convex portions 65 can be provided by any number of one or more, and as long as there is no interference with the first through-holes 62, it is possible to locate them in any phase in the circumferential direction.

In the present example, the second cylindrical portion 48*a* of the intermediate transmission member 19*a* has the second through-holes 66, which are provided at a plurality of places in the circumferential direction, in a state of penetrating the second cylindrical portion 48*a* in the radial direction. On the other hand, the second elastic member 21*a* has the second main convex portions 67 at a plurality of places of the outer circumferential surface that are arranged in the same phase as the second through-holes 66 in the circumferential direction. In a state where the second elastic member 21*a* is assembled to the other side section in the axial direction of the intermediate transmission member 19*a*, that is, in a state where the second elastic member 21*a* is fitted inside the second cylindrical portion 48*a*, the second main convex portions 67 of the second elastic member 21*a* are engaged with the second through-holes 66 of the second cylindrical portion 48*a*. Due to this, displacement of the second elastic member 21*a* to the other side in the axial direction with respect to the intermediate transmission member 19*a* is prevented, and separation between the intermediate transmission member 19*a* and the second elastic member 21*a* is prevented. In case of embodying the present invention, the combination of the second through-holes 66 and the second main convex portions 67 can be provided by any number of one or more, and it is possible to locate them in any phase in the circumferential direction.

Further, the second cylindrical portion 48*a* has the second notches 68 that are provided in a state of opening to the other side edge in the axial direction of the second cylindrical portion 48*a* at two locations that deviates from the second through-holes 66 where the phase of placement in the circumferential direction is opposite side in the diameter direction. On the other hand, the second elastic member 21*a* has the second sub convex portions 69 that are able to engage with the second notches 68 at two locations of the outer circumferential surface where the phase is the same as the second notches 68 in the circumferential direction. By employing such a configuration, when assembling the second elastic member 21*a* to the other side section in the axial direction of the intermediate transmission member 19*a*, it is made easy to perform phase alignment between the second through-holes 66 and the second main convex portions 67 in the circumferential direction by inserting the second sub convex portions 69 to inside of the second notches 68 from the other side in the axial direction. In case of embodying the present invention, the combination of the second notches 68 and the second sub convex portions 69 can be provided by any number of one or more, and as long as there is no interference with the second through-holes 66, it is possible to locate them in any phase in the circumferential direction.

Further, in the present example, the first annular convex portion 54*a* of the first elastic member 20*a* has the first protruding sections 70 that protrude inside in the radial direction at a plurality of places in the circumferential direction. On the other hand, the first annular concave portion 38*a* of the intermediate transmission member 19*a* has the first engaging concave portions 71 at a plurality of places that are arranged in the same phase as the first protruding sections 70 in the circumferential direction of the inner diameter side circumferential surface 39*a* of the inner surface. The first engaging concave portions 71 are provided in a state of opening to the inner diameter side circumferential surface 39*a* and the one side surface in the axial direction (outside surface in the axial direction) of the intermediate transmission member 19*a*. In a state where the first elastic member 20*a* is assembled to the one side section in the axial direction of the intermediate transmission member 19*a*, that is, in a state where the first annular convex portion 54*a* is pressure fitted to the first annular concave portion 38*a*, the first protruding sections 70 of the first annular convex portion 54*a* are engaged with the first engaging concave portions 71 of the first annular concave portion 38*a*. In the present example, the thickness in the radial direction of portions of the first annular convex portion 54*a* that coincide with the first protruding sections 70 in the circumferential directions is especially made large. Due to this, between the inner diameter side circumferential surface 39*a* of the first annular concave portion 38*a* and the outer diameter side circumferential surface 40, elastic amount of compression is made large in the radial direction of the portions where the thickness is made large so as to improve the effect of preventing displacement to the one side in the axial direction of the first elastic member 20*a* with respect to the intermediate transmission member 19*a*. In case of embodying the present invention, the combination of the first protruding sections and the first engaging concave portions can be provided on the outer diameter side of the first annular convex portion, as well as to be provided on both the inner diameter side and the outer diameter side of the first annular convex portion. Further, the number of combination between the first protruding section and the first engaging concave portion can be one or more arbitrary number that is different from the present example.

Further, in the present example, the second annular convex portion 60*a* of the second elastic member 21*a* has the second protruding sections 72 that protrude inside in the radial direction at a plurality of places in the circumferential direction. On the other hand, the second annular concave portion 45*a* of the intermediate transmission member 19*a* has the second engaging concave portions 73 at a plurality of places that are arranged in the same phase as the second protruding sections 72 in the circumferential direction of the inner diameter side circumferential surface 46*a* of the inner surface. The second engaging concave portion 73 are provided in a state of opening to the inner diameter side circumferential surface 46a and the other side surface in the axial direction (outside surface in the axial direction) of the intermediate transmission member 19a. In a state where the second elastic member 21a is assembled to the other side section in the axial direction of the intermediate transmission member 19a, that is, in a state where the second annular convex portion 60a is pressure fitted to the second annular concave portion 45a, the second protruding sections 72 of the second annular convex portion 60a are engaged with the second engaging concave portion 73 of the second annular concave portion 45a. In the present example, the thickness in the radial direction of portions of the second annular convex portion 60a that coincides with the second protruding sections 72 in the circumferential direction is especially made large. Due to this, between the inner diameter side circumferential surface 46a of the second annular concave portion 45a and the outer diameter side circumferential surface 47, elastic amount of compression is made large in the radial direction of the portions where the thickness is made large so as to improve the effect of preventing displacement to the other side in the axial direction of the second elastic member 21a with respect to the intermediate transmission member 19a. In case of embodying the present invention, the combination of the second protruding section and the second engaging concave portion can be provided on the outer diameter side of the second annular convex portion, as well as to be provided on both the inner diameter side and the outer diameter side of the second annular convex portion. Further, the number of combination between the second protruding section and the second engaging concave portion can be one or more arbitrary number that is different from the present example.

In the present example as well, as an engagement configuration between the first annular concave portion (the second annular concave portion) and the first annular convex portion (the second annular convex portion), it is possible to employ an engagement configuration that is similar to the first example of the embodiment where the first protruding section (second protruding section) and the first engaging concave portion (second engaging concave portion) are not provided.

Further, in the present example, different from the first example, an engagement configuration with the first engaging projections and the first engaging beams is not provided between the intermediate transmission member 19a and the first elastic member 20a. Further, an engagement configuration with the second engaging projections and the second engaging beams is not provided between the intermediate transmission member 19a and the second elastic member 21a. Instead, in the present example, the first section with material removed of the first elastic member 20a which the first tooth sections 35 are engaged with is constructed by the first engaging slits 74 that are opened to the inner perimeter edge of the first elastic member 20a. Further, the second section with material removed of the second elastic member 21a which the second tooth sections 42 are engaged with is constructed by the second engaging slits 75 that are opened to the inner perimeter edge of the second elastic member 21a. However, in the present example as well, it is possible to provide an engagement configuration with the first engaging projections and the first engaging beams and an engagement configuration with the second engaging projections and the second engaging beams.

Further, in the present example, different from the first example, elastic protrusions are not provided on both side edges in the circumferential direction of the respective first elastic slits 49a of the first elastic member 20a and on both side edges in the circumferential direction of the respective second elastic slits 55a of the second elastic member 21a. However, in the present example as well, it is also possible to provide these elastic protrusions.

In the present example, in order to perform phasing in the circumferential direction when assembling the first elastic member 20a (the second elastic member 21a) to the intermediate transmission member 19a, an engagement configuration with the first notches 64 and the first sub convex portions 65 (an engagement configuration with the second notch 68 and the second sub convex portion 69) is employed. However, in case of embodying the present invention, these engagement configurations can also be omitted. In this case, the phasing can be performed by utilizing the engagement configuration with the first protruding sections 70 and the first engaging concave portion 71 (the engagement configuration with the second protruding section 72 and the second engaging concave portion 73). Other configurations and functions are the same as in the case of the first example.

Third Example

The third example of an embodiment will be explained with reference to FIG. 30.

In the present example, in the concave portions 33a and the convex portions 34a of the intermediate uneven section 32a of the intermediate transmission member 19b, the inner surface of the respective concave portions 33a is inclined to a direction where the cross sectional area of the respective concave portions 33a becomes larger from the inside in the axial direction of the intermediate transmission member 19b to the outside in the axial direction, that is, from the center section in the axial direction to both sides in the axial direction. Due to this, when misalignment occurs, it is possible to tilt the intermediate transmission member 19b easily with respect to the first transmission member 17 and the second transmission member 18 (see FIG. 3 to FIG. 5). Other configurations and functions are the same as in the case of the first example.

Fourth Example

Figure 31:
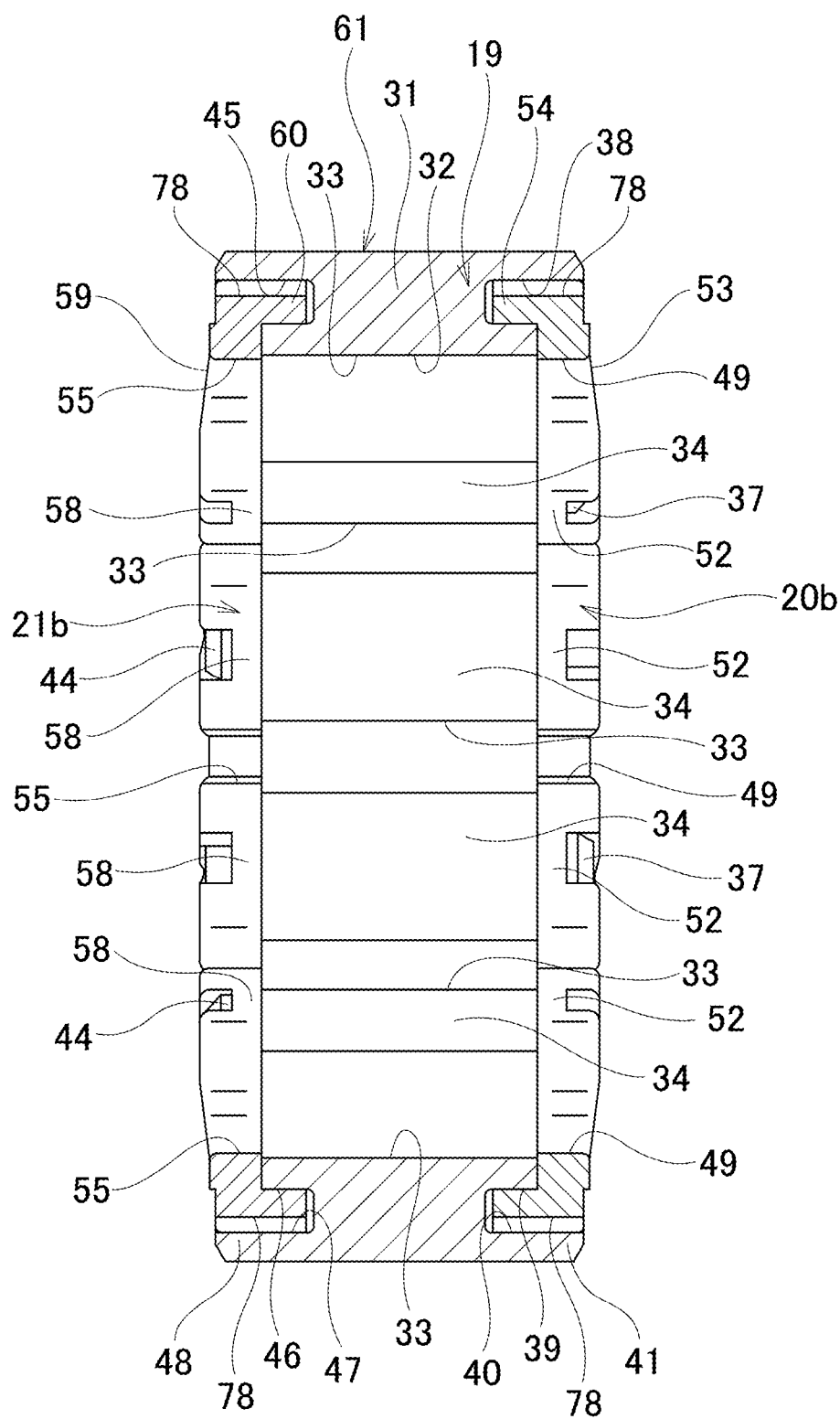
FIG. 31 is a cross sectional view taken along the line S-S of FIG. 32 of the fourth example of an embodiment of the present invention.
Figure 32:
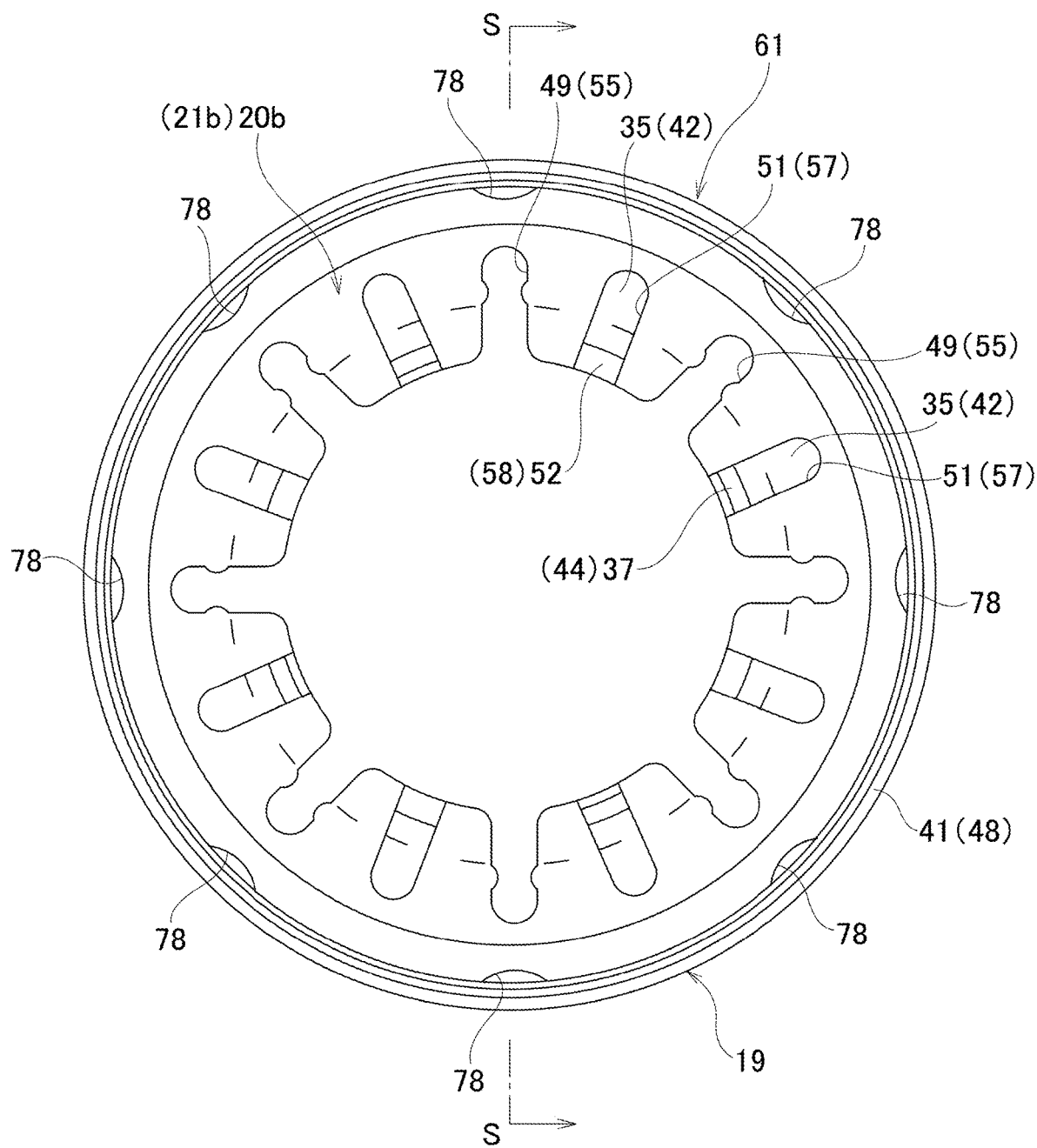
FIG. 32 is a figure which is viewed from right or left in FIG. 31.
Figure 33:
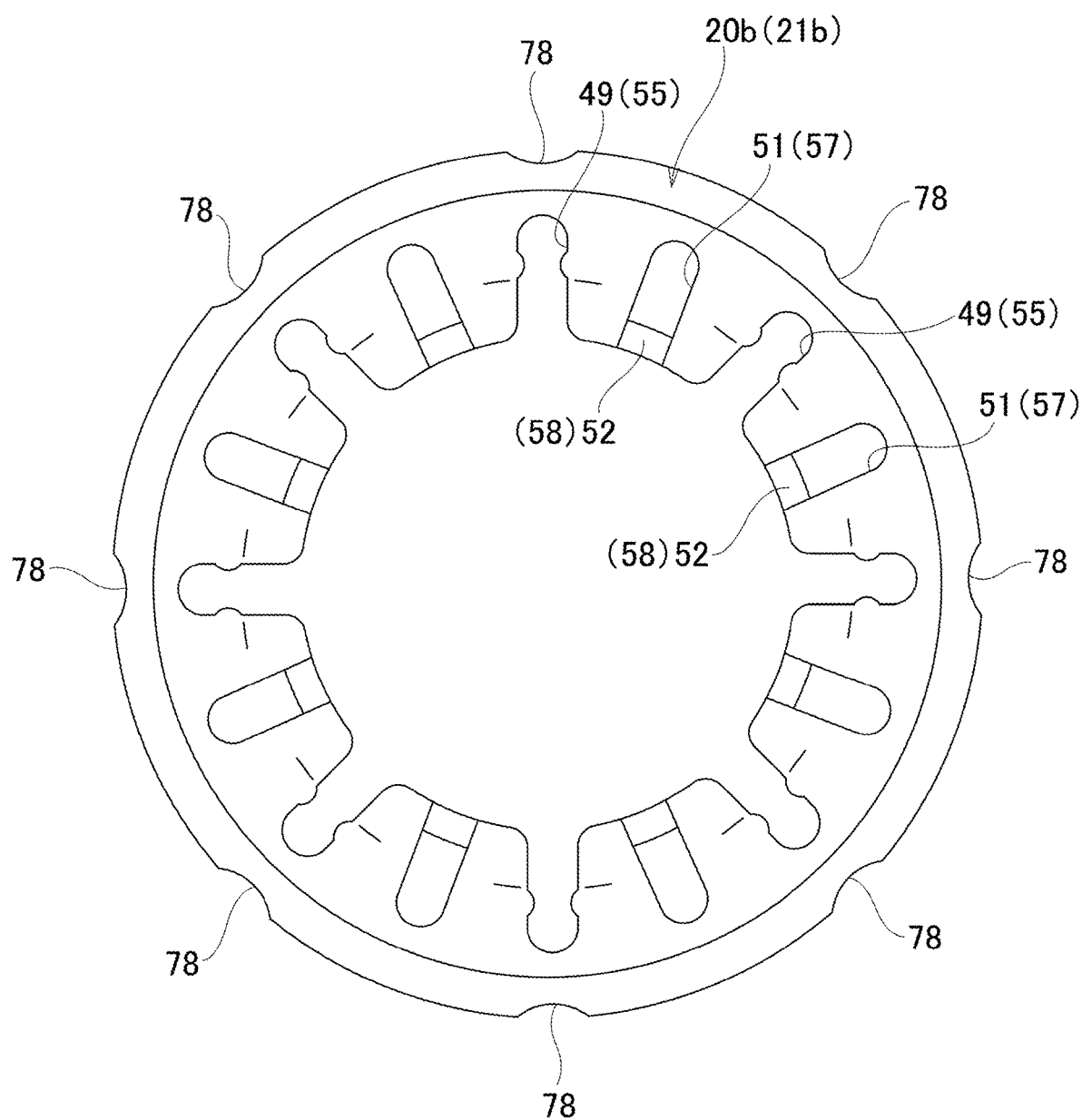
FIG. 33 shows the first elastic member (the second elastic member) taken out from FIG. 32.

The fourth example of an embodiment will be explained with reference to FIG. 31 to FIG. 33.

In the present example, similar to the first example of the embodiment, both halve sections in the axial direction of the torque transmission joint are formed so as to be substantially symmetrical. Therefore, in the following, one half section in the axial direction of the torque transmission joint will be explained mainly, and the explanation of the other half section in the axial direction of the torque transmission joint will be done simultaneously with parentheses (it is the same for the subsequent examples of an embodiment of the present invention).

In the present example, communication concave portions 78 in the axial direction are provided on the outer circumferential surface of the outer circumferential surface of the first elastic member 20b (the second elastic member 21b) including the outer circumferential surface of the first annular convex portion 54 (the second annular convex portion 60) of the first elastic member 20b (the second elastic member 21b). The communication concave portions 78 are provided at a plurality of places (eight locations in the illustrated example) at equal intervals in the circumferential direction of the outer circumferential surface of the first elastic member 20b (the second elastic member 21b). Further, in a state where the first elastic member 20b (the second elastic member 21b) is assembled to the intermediate transmission member 19, gaps which communicate the inner end section in the axial direction of the first annular concave portion 38 (the second annular concave portion 45) and the space outside in the axial direction exist between the outer diameter side circumferential surface 40 (47) of the first annular concave portion 38 (the second annular concave portion 45) of the intermediate transmission member 19 and the inner circumferential surface of the first cylindrical portion 41 (second cylindrical portion 48), and the inner surface of the respective communication concave portions 78. That is, the communication concave portions 78 do not come into contact with the outer diameter side circumferential surface 40 (47) and the inner circumferential surface of the first cylindrical portion 41 (second cylindrical portion 48) which is an opponent circumferential surface to which the communication concave portions 78 face in the radial direction.

In the present example having such a configuration, when pressure fitting the first annular convex portion 54 (the second annular convex portion 60) to inside the first annular concave portion 38 (the second annular concave portion 45), it is possible to discharge the air inside the first annular concave portion 38 (the second annular concave portion 45) to outside via the gaps. Due to this, it is possible to prevent occurrence of inconvenience such as the air pressure inside the first annular concave portion 38 (the second annular concave portion 45) increases and the first annular convex portion 54 (the second annular convex portion 60) is pushed back outside in the axial direction of the first annular concave portion 38 (the second annular concave portion 45).

Figure 34:
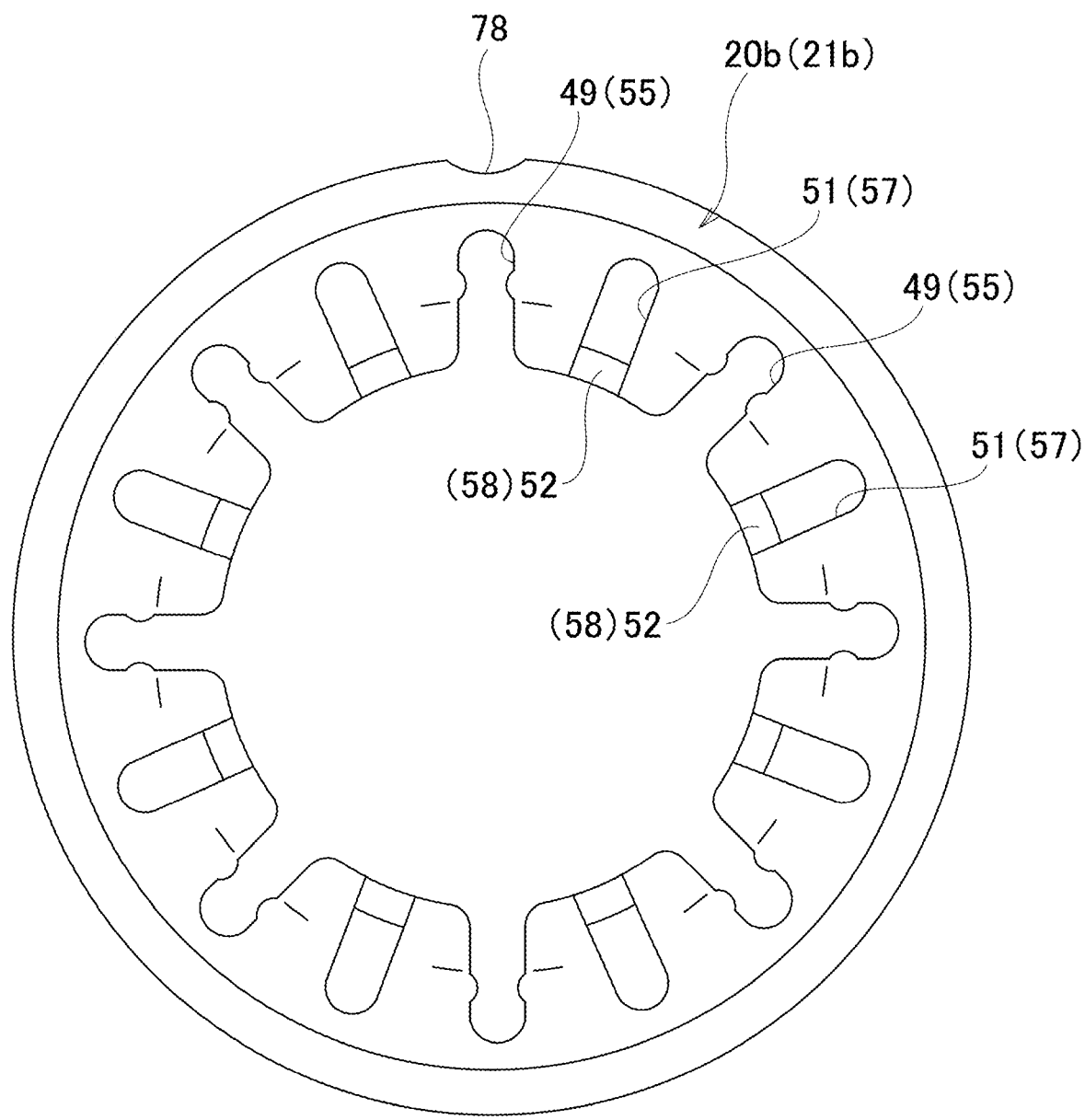
FIG. 34 is a figure similar to FIG. 33, which illustrates the first alternative example of the fourth example.

In the present example, the number of the communication concave portions 78 is eight, and these communication concave portions 78 are located at equal intervals in the circumferential direction. However, in case of embodying the present invention, the number of the communication concave portions 78 and the placement phase in the circumferential direction are not particularly specified. For example, as illustrated in FIG. 34, it is possible to make the number of the communication concave portions 78 to be one.

Figure 35:
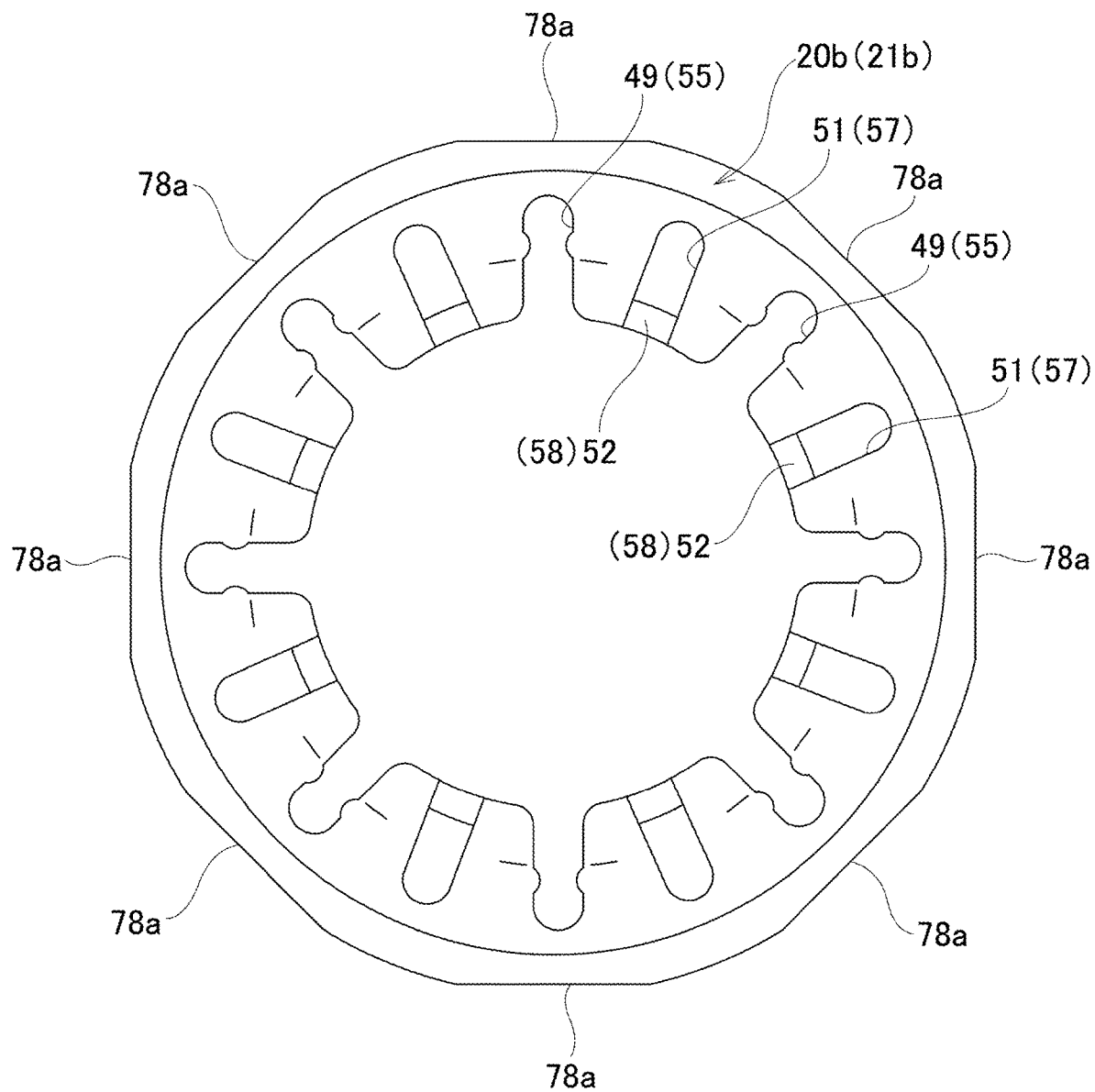
FIG. 35 is a figure similar to FIG. 33, which illustrates the second alternative example of the fourth example.

Further, in the present example (the illustrated example), the inner surface of the respective communication concave portions 78 is a partially cylindrical concave surface. However, in case of embodying the present invention, the shape of the inner surface of the respective communication concave portion is not particularly specified. For example, as illustrated in FIG. 35, it is possible to make the inner surface of the respective communication concave portions 78a as a flat surface.

Further, in the present example, on the outer circumferential surface of the first elastic member 20b (the second elastic member 21b), the width dimension in the circumferential direction of every portion located between the communication concave portions 78 that are adjacent in the circumferential direction 78 is made larger than the width dimension in the circumferential direction of the communication concave portions 78. However, in case of embodying the present invention, it is possible to make the width dimension in the circumferential direction of every portion located between the communication concave portions 78 that are adjacent in the circumferential direction to be or less the width dimension in the circumferential direction of the communication concave portions 78.

Other configurations and functions are the same as in the case of the first example.

Fifth Example

Figure 36:
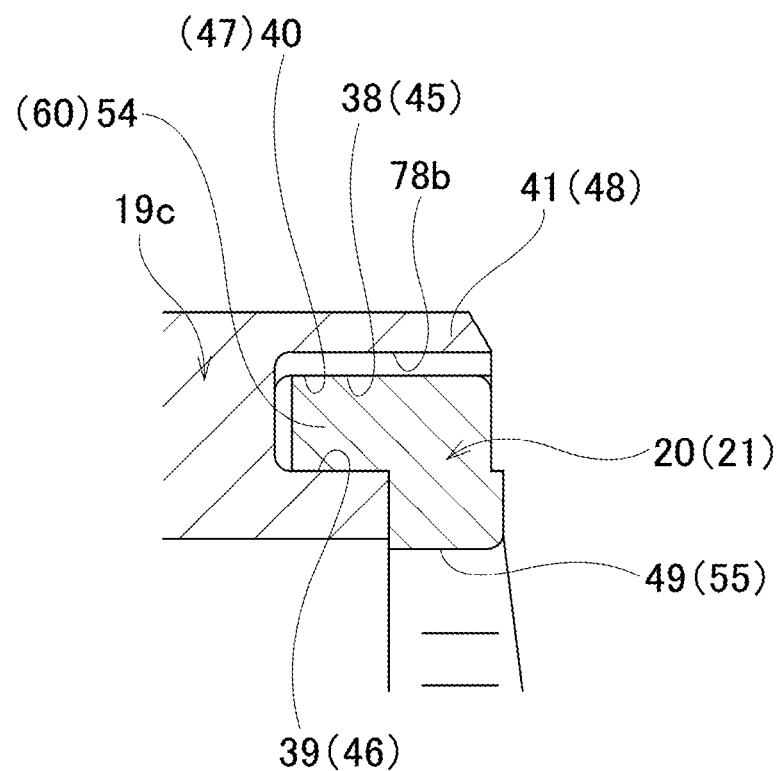
FIG. 36 is a partial cross sectional view of an intermediate transmission member and the first transmission member (the second transmission member) of the fifth example of an embodiment of the present invention.
Figure 37:
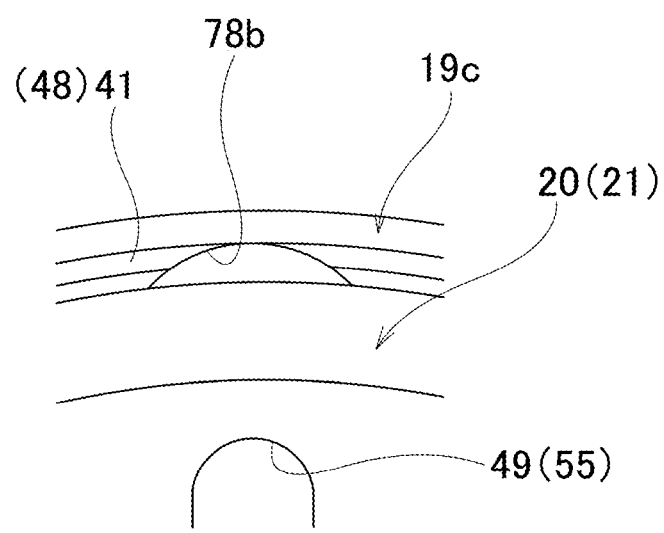
FIG. 37 is a figure which is viewed from right in FIG. 36.

The fifth example of an embodiment will be explained with reference to FIG. 36 and FIG. 37.

In the present example, any communication concave portions are not provided on the outer circumferential surface of the first elastic member 20 (the second elastic member 21). Instead, at least in one location in the circumferential direction of the outer diameter side circumferential surface 40 (47) of the first annular concave portion 38 (the second annular concave portion 45) of the intermediate transmission member 19c and the inner circumferential surface of the first cylindrical portion 41 (second cylindrical portion 48), a communication concave portion 78b is respectively provided over the entire length in the axial direction.

Other configurations and functions are the same as in the case of the fourth example.

Sixth Example

Figure 38:
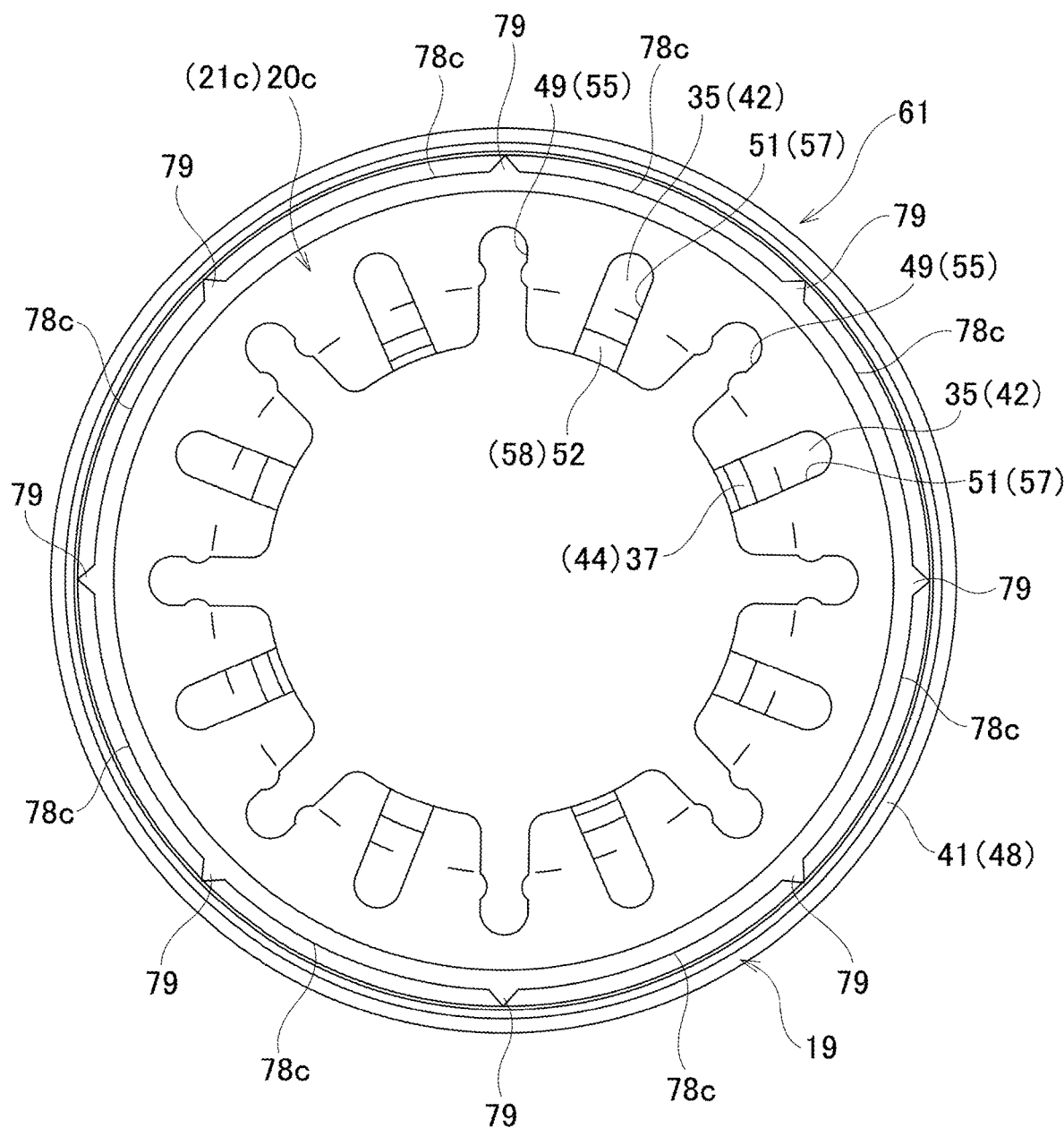
FIG. 38 is a figure similar to FIG. 32 of the sixth example of an embodiment of the present invention.
Figure 39:
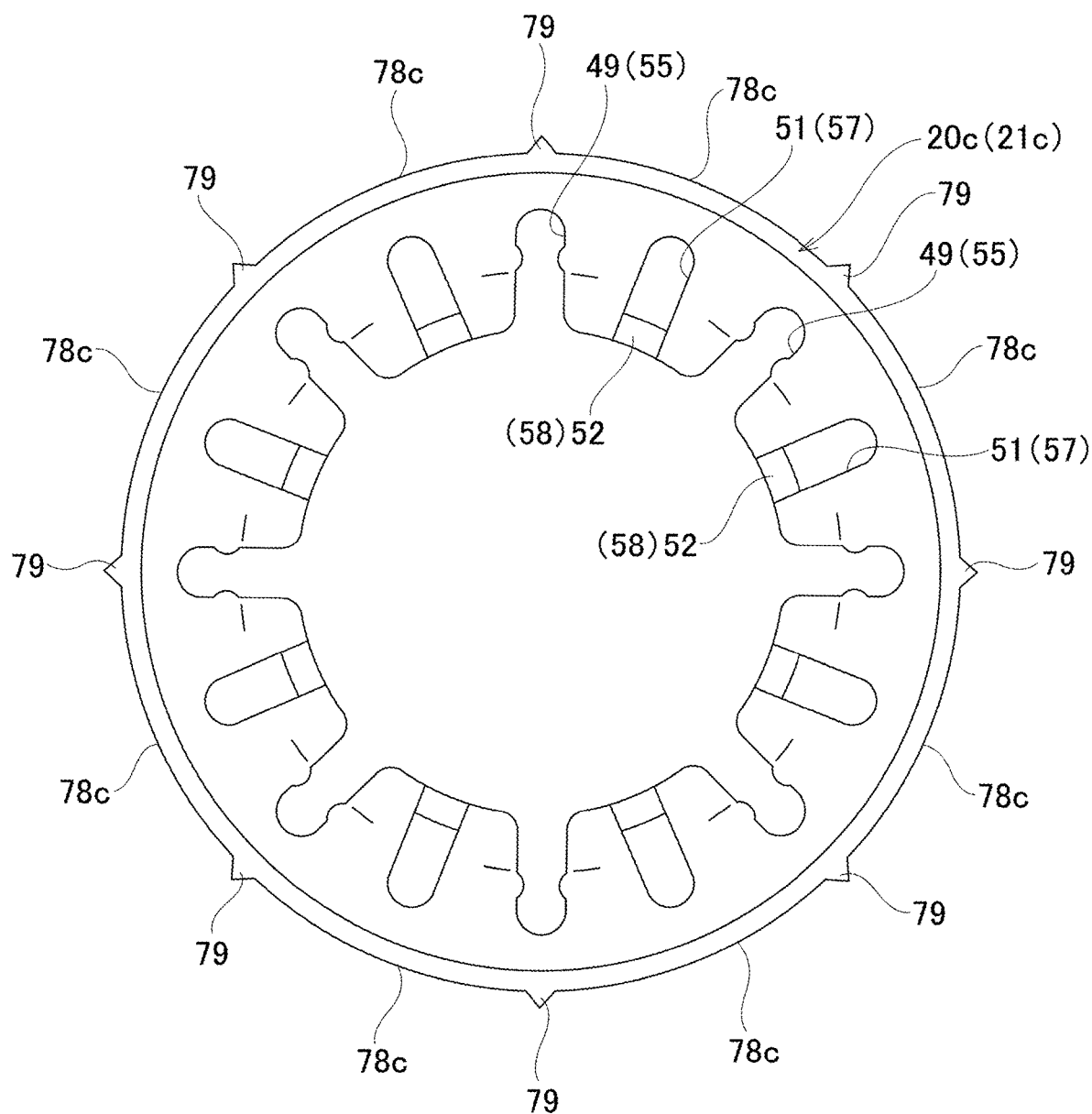
FIG. 39 shows the first elastic member (the second elastic member) taken out from FIG. 38.
Figure 40:
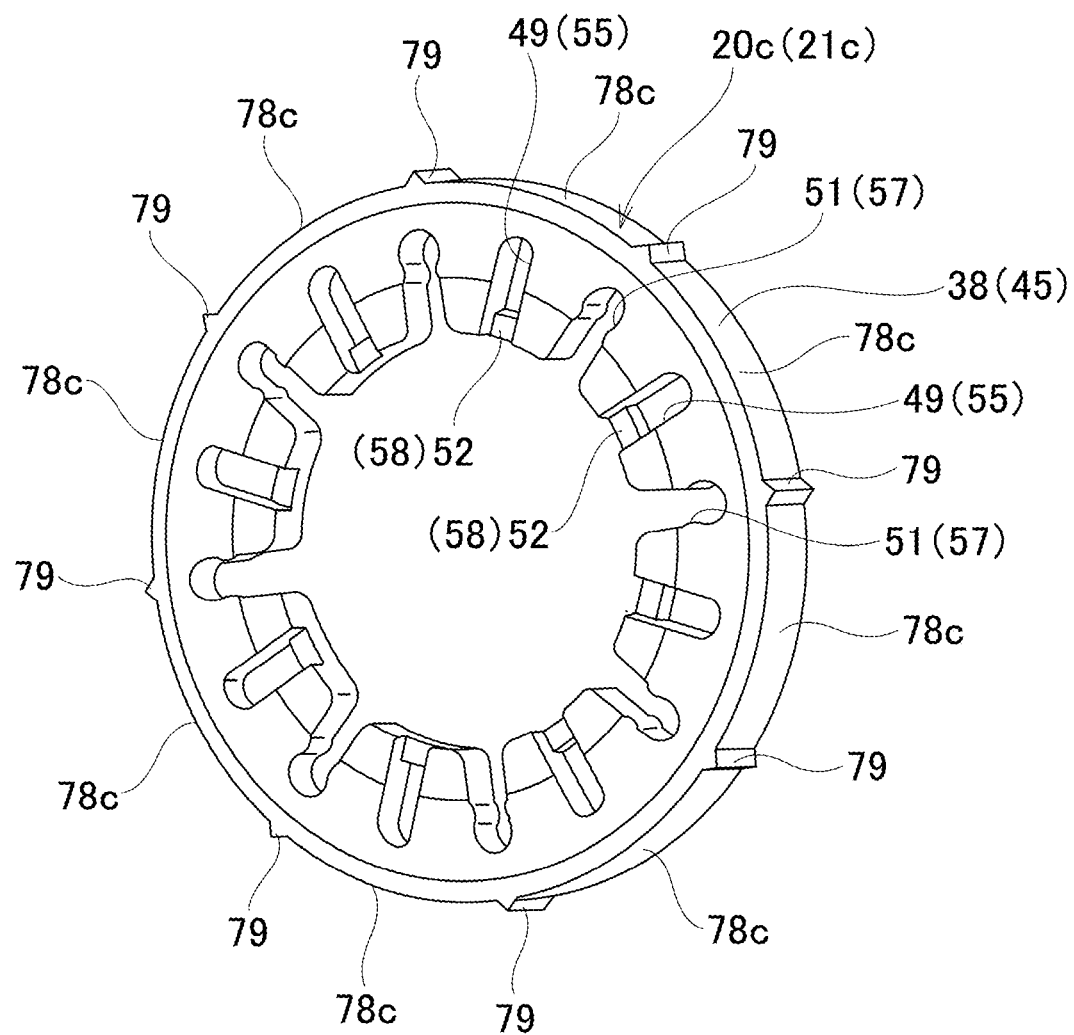
FIG. 40 is a perspective view of the first elastic member (the second elastic member) illustrated in FIG. 39.

The sixth example of an embodiment will be explained with reference to FIG. 38 to FIG. 40.

In the present example, on the outer circumferential surface of the first elastic member 20c (the second elastic member 21c), the width dimension in the circumferential direction of every portion located between the communication concave portions 78c that are adjacent in the circumferential direction is made sufficiently smaller than the width dimension in the circumferential direction of the respective communication concave portions 78c. That is, in the present example, the portions located between the communication concave portions 78c that are adjacent in the circumferential direction is constructed by ridges 79 respectively having a sufficiently small width dimension in the circumferential direction. Further, in a state where the first elastic member 20c (the second elastic member 21c) is assembled to the intermediate transmission member 19, the tip-end section (outer end portion in the radial direction) of the respective ridges 79 is elastically pressed against the inner circumferential surface of the outer diameter side circumferential surface 40(47) of the first annular concave portion 38 (the second annular concave portion 45) and the inner circumferential surface of the first cylindrical portion 41 (second cylindrical portion 48) of the intermediate transmission member 19.

In the present example having such a configuration, as the width dimension in the circumferential direction of the respective ridges 79 is sufficiently small, when pressure fitting the first annular convex portion 54 (the second annular convex portion 60) to inside the first annular concave portion 38 (the second annular concave portion 45), the ridges 79 which are elastically crushed in the radial direction and easily get away to both sides in the circumferential direction. Due to this, it is possible to ensure easiness of pressure fitting as stated above regardless of dimensional variation in the first elastic member 20c (the second elastic member 21c).

Figure 41:
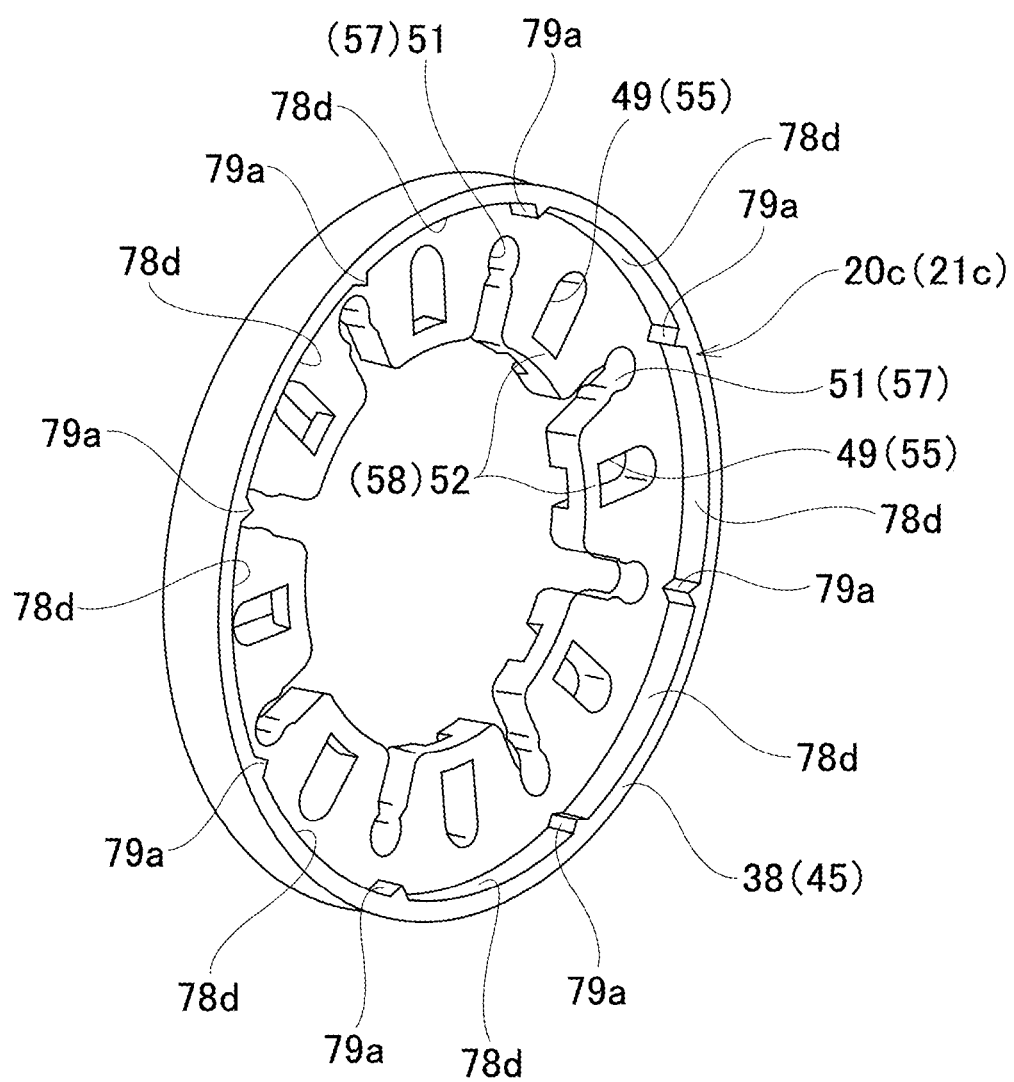
FIG. 41 is a perspective view of the first elastic member (the second elastic member) illustrating an alternative example of the sixth example.

In the present example (the illustrated example), the shape of the respective ridges 79 as seen from the axial direction is triangular. However, in case of embodying the present invention, the shape is not particularly specified, and it is also possible to make the shape semicircular or trapezoidal. Further, in case of embodying the present invention, as illustrated in FIG. 41, it is also possible to provide communication concave portions 78d and ridges 79a on the inner circumferential surface of the first annular convex portion 54 (the second annular convex portion 60), and, although not illustrated, communication concave portions and ridges can be provided on the circumferential surface of the inner surface of the first annular concave portion (the second annular concave portion).

Other configurations and functions are the same as in the case of the first example.

Seventh Example

Figure 42:
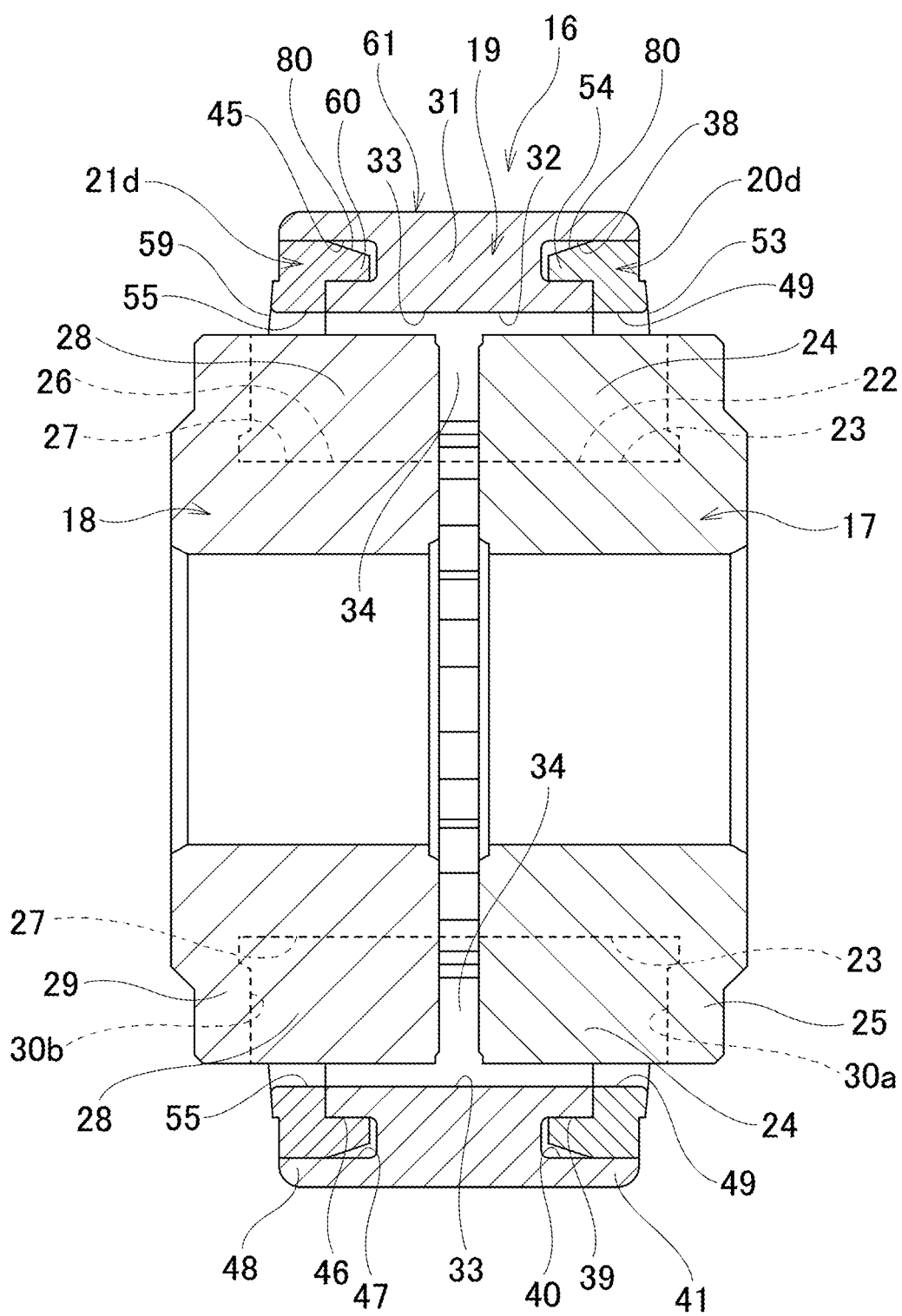
FIG. 42 is a figure similar to FIG. 8 of the seventh example of an embodiment of the present invention.

The seventh example of an embodiment will be explained with reference to FIG. 42.

In the present example, the first elastic member 20d (the second elastic member 21d) has a conical inclined surface 80, which is inclined in a direction where the outer diameter dimension becomes smaller toward the tip end side in the axial direction, over the entire outer circumferential surface of the first annular convex portion 54 (the second annular convex portion 60). In the present example having such a configuration, based on the existence of the inclined surface 80, it is possible to make the first annular convex portion 54 (the second annular convex portion 60) to be pressure fitted to the first annular concave portion 38 (the second annular concave portion 45) easily.

Other configurations and functions are the same as in the case of the first example.

Figure 43:
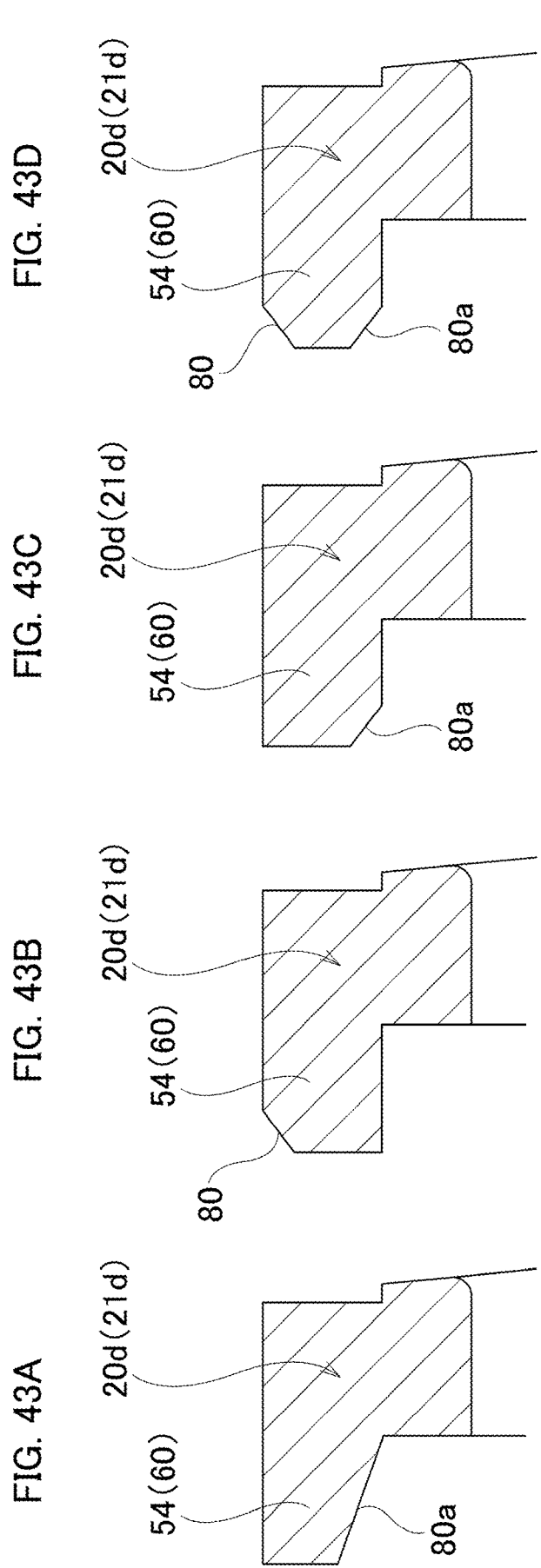
FIG. 43(a) through FIG. 43(d) are partially enlarged cross sectional view of the first elastic member (the second elastic member) of an alternative example of the seventh example.

In case of embodying the present invention, as an alternative example of the seventh example, instead of providing the inclined surface 80 on the outer circumferential surface of the first annular convex portion 54 (the second annular convex portion 60), as illustrated in FIG. 43(a), it is also possible to provide a conical inclined surface 80a, which is inclined in a direction where the inner diameter dimension becomes larger toward the tip end side in the axial direction, over the entire inner circumferential surface of the first annular convex portion 54 (the second annular convex portion 60). Further, in case of embodying the present invention, as an alternative example of the seventh example, as illustrated in FIG. 43(b), it is also possible to provide the inclined surface 80 only on the outer circumferential surface of the tip-end section of the first annular convex portion 54 (the second annular convex portion 60), and as illustrated in FIG. 43(c), the inclined surface 80a is provided only on the inner circumferential surface of the tip-end section of the first annular convex portion 54 (the second annular convex portion 60), and as illustrated in FIG. 43(d), inclined surfaces 80, 80a are provided on both the outer circumferential surface and the inner circumferential surface of the tip-end section of the first annular convex portion 54 (the second annular convex portion 60) respectively. In these alternative examples as well, similar to the case of the seventh example, based on the existence of the inclined surfaces 80, 80a, it is possible to make the first annular concave portion 38 (the second annular concave portion 45) to be pressure fitted to the first annular convex portion 54 (the second annular convex portion 60) easily.

Eighth Example

Figure 44:
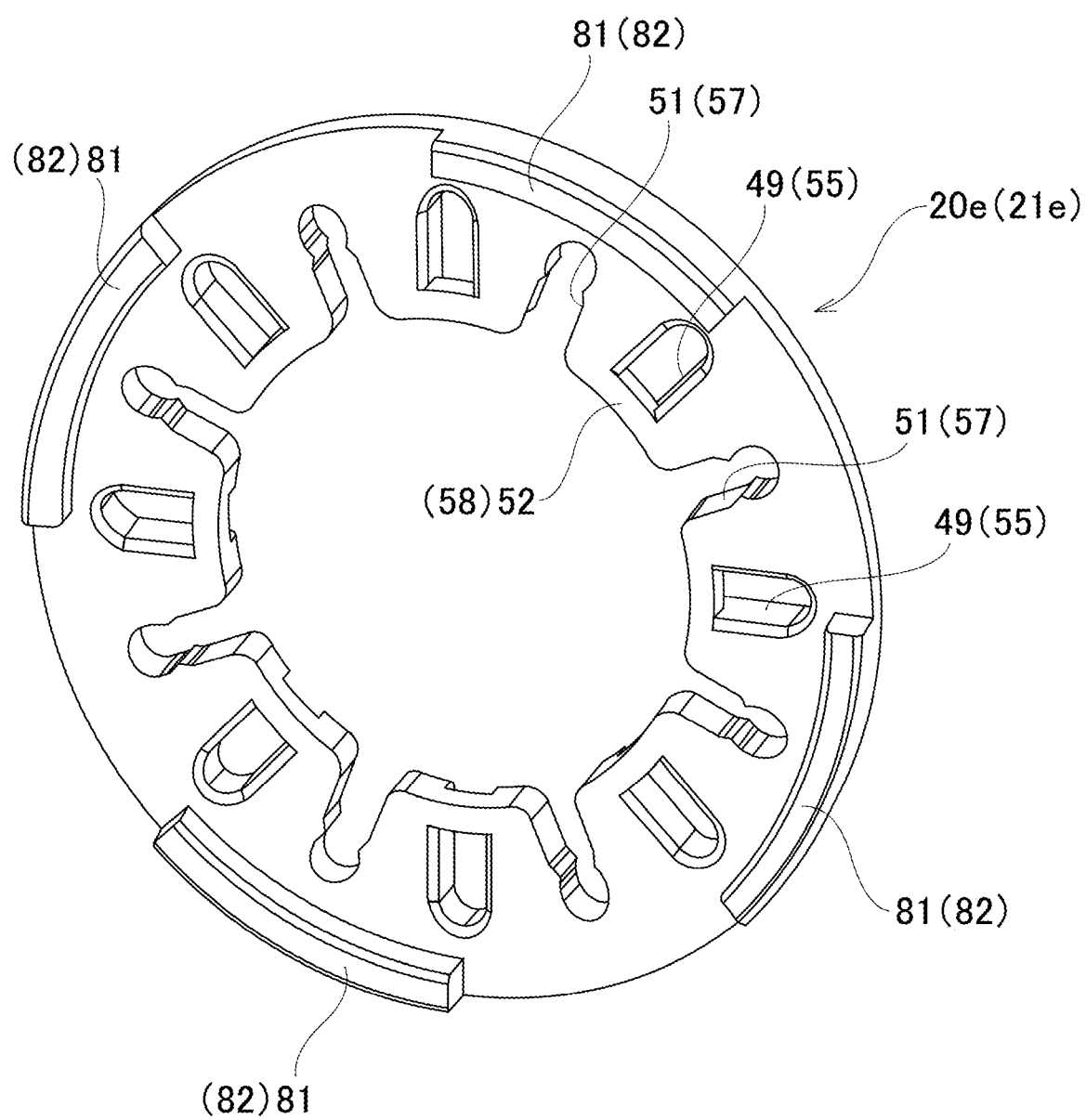
FIG. 44 is a perspective view of the first elastic member (the second elastic member) of the eighth example of an embodiment of the present invention.

The eighth example of an embodiment will be explained with reference to FIG. 44.

In the present example, the first elastic member 20e (the second elastic member 21e) does not have the first annular convex portion 54 (the second annular convex portion 60) (see FIG. 16 and FIG. 17). Instead, the first elastic member 20e (second elastic member 21e) has the first arc convex portions 81 (second arc convex portions 82), each of which corresponds to a convex portion in the circumferential direction, at a plurality of places separated in the circumferential direction of the outer end portion in the radial direction (four locations in the illustrated example) so as to protrude inside in the axial direction. Further, when assembling the torque transmission joint, each of the first arc convex portions 81 (second arc convex portions 82) is pressure fitted to the first annular concave portion 38 (the second annular concave portion 45) of the intermediate transmission member 19 (see FIG. 15). In case of embodying the present invention, it is possible to make the number of the first arc convex portions 81 (second arc convex portions 82), the length in the circumferential direction, the phase of location in the circumferential direction, and the like different from that of the illustrated example. For example, the first arc convex portions 81 (second arc convex portions 82) may be located only on the outer diameter side of the first elastic slits 49 (second elastic slits 55), alternately, may be located only in locations in the circumferential direction which is different from the first elastic slits 49 (second elastic slits 55).

In the present example having such a configuration, when pressure fitting each of the first arc convex portions 81 (second arc convex portions 82) to the first annular concave portion 38 (the second annular concave portion 45), it is possible to let go the material of the first arc convex portions 81 (second arc convex portions 82) that flows along with the pressure fitting to the space on both sides in the circumferential direction. Due to this, it is possible to prevent that the resistance of the pressure fitting due to the variation of dimensions in the intermediate transmission member 19 and the first elastic member 20e (second elastic member 21e) becomes excessive. Therefore, it is possible for the first elastic member 20e (second elastic member 21e) to bring out the desired function without being affected by the variation in the dimension so as to stabilize the posture of the first elastic member 20e (the second elastic member 21e) after assembly. Other configurations and functions are the same as in the case of the first example.

Ninth Example

Figure 45:
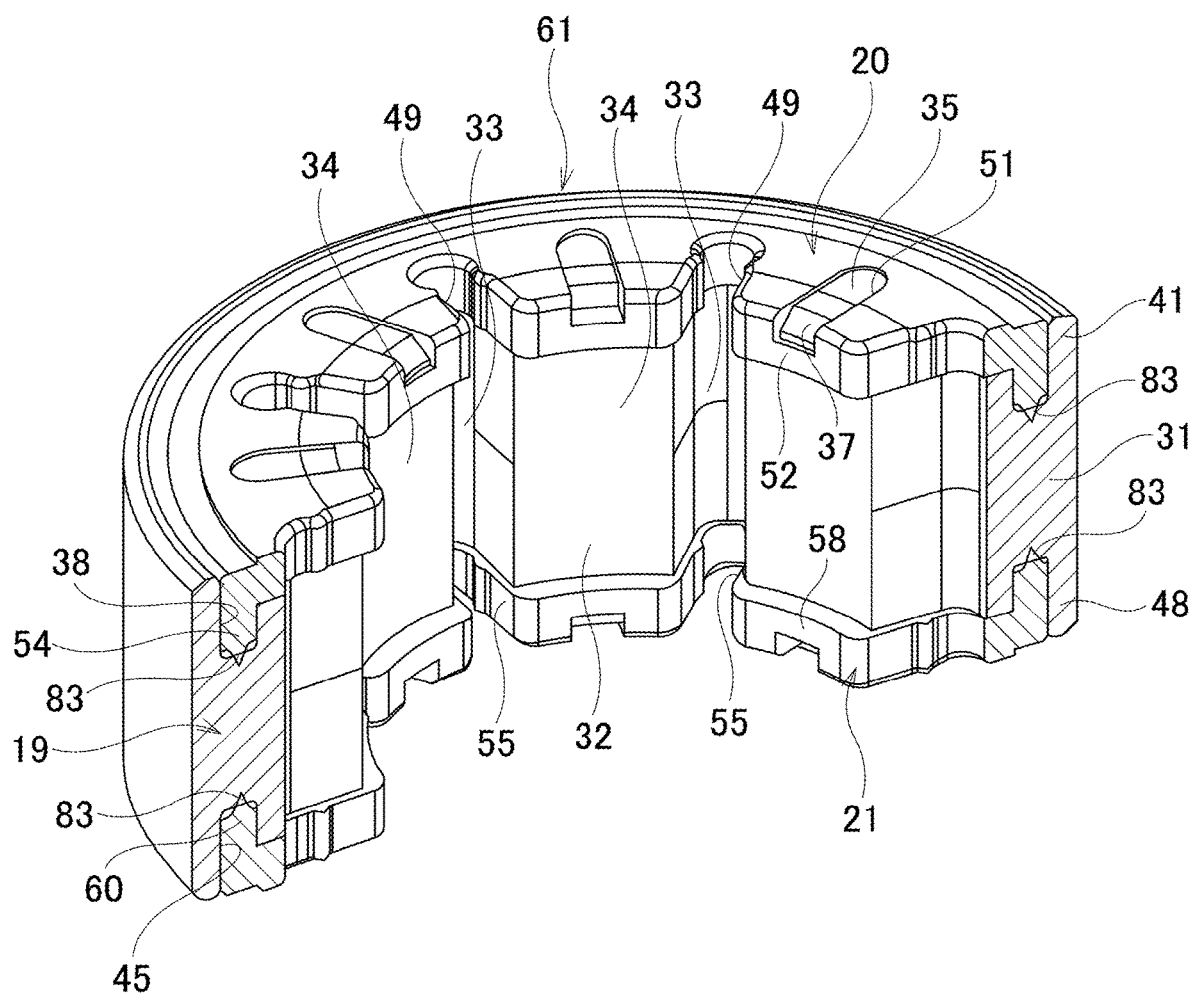
FIG. 45 is a half cut perspective view of a combined body of an intermediate transmission member and the first transmission member (the second transmission member) of the ninth example of an embodiment of the present invention.

The ninth example of an embodiment will be explained with reference to FIG. 45 and FIG. 46.

Figure 46A:
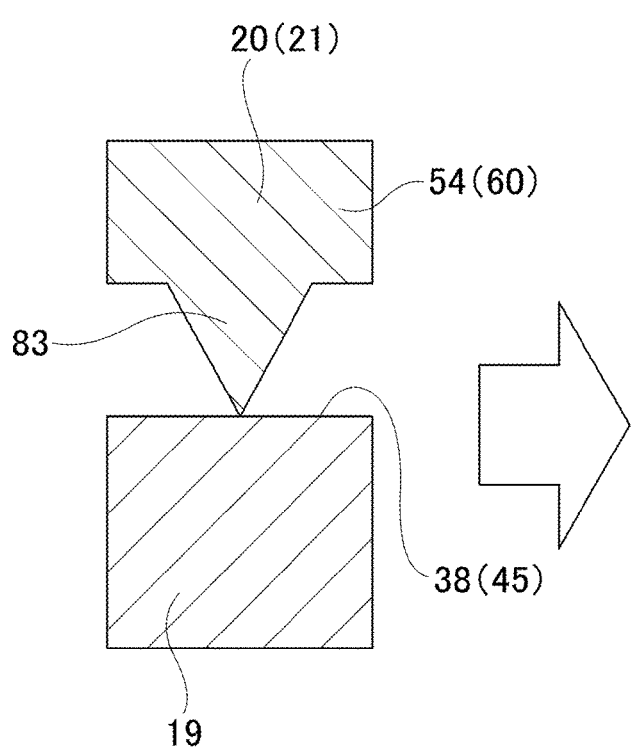
FIG. 46 is a schematic view illustrating the steps of ultrasonically welding the tip-end section in the axial direction of an annular convex portion to the bottom end section in the axial direction of an annular concave portion in order in relation to the ninth example.
Figure 46B:
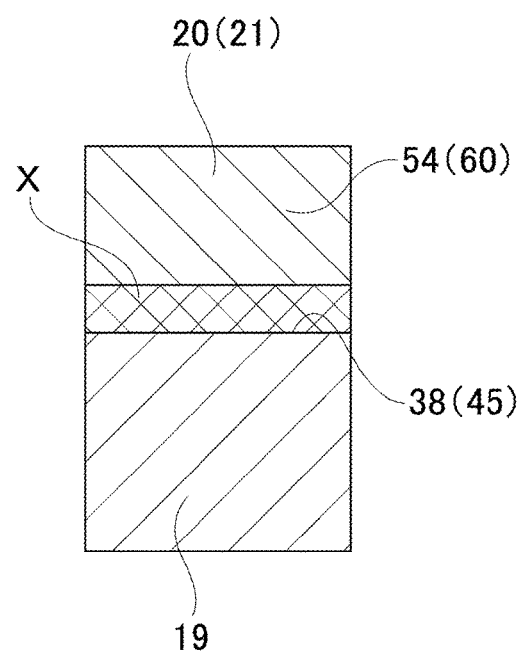

In the present example, the tip-end section in the axial direction of the first annular convex portion 54 (the second annular convex portion 60) of the first elastic member 20 (the second elastic member 21) and the bottom end section (bottom surface) in the axial direction of the first annular concave portion 38 (the second annular concave portion 45) of the intermediate transmission member 19 are welded by ultrasonic welding. In order for this, in the present example, a ridge section 83 having cross sectional shape of a triangular mountain shape is provided over the whole circumference in the tip-end section in the axial direction of the first annular convex portion 54 (the second annular convex portion 60) before ultrasonic welding. Further, as schematically illustrated in FIG. 46(a), while pressing the tip-end section of the ridge section 83 to the bottom end section in the axial direction of the first annular concave portion 38 (the second annular concave portion 45), by applying ultrasonic vibration to this pressed portion so as to melt the ridge section 83, as schematically illustrated in FIG. 46(b), the tip-end section in the axial direction of the first annular convex portion 54 (the second annular convex portion 60)

and the bottom end section in the axial direction of the first annular concave portion 38 (the second annular concave portion 45) are welded. In FIG. 46(*b*), an X section with oblique grid is a portion where the ridge section 83 changed its shape due to ultrasonic welding. In FIG. 45, for convenience, the ridge section 83 is illustrated in the free state before ultrasonic welding.

In the construction of the present example, as the tip-end section in the axial direction of the first annular convex portion 54 (the second annular convex portion 60) and the bottom end section in the axial direction of the first annular concave portion 38 (the second annular concave portion 45) are welded by ultrasonic welding, it is possible to improve the separation prevention effect of the first elastic member 20 (the second elastic member 21) with respect to the intermediate transmission member 19. Other configurations and functions are the same as in the case of the first example.

Tenth Example

Figure 47:
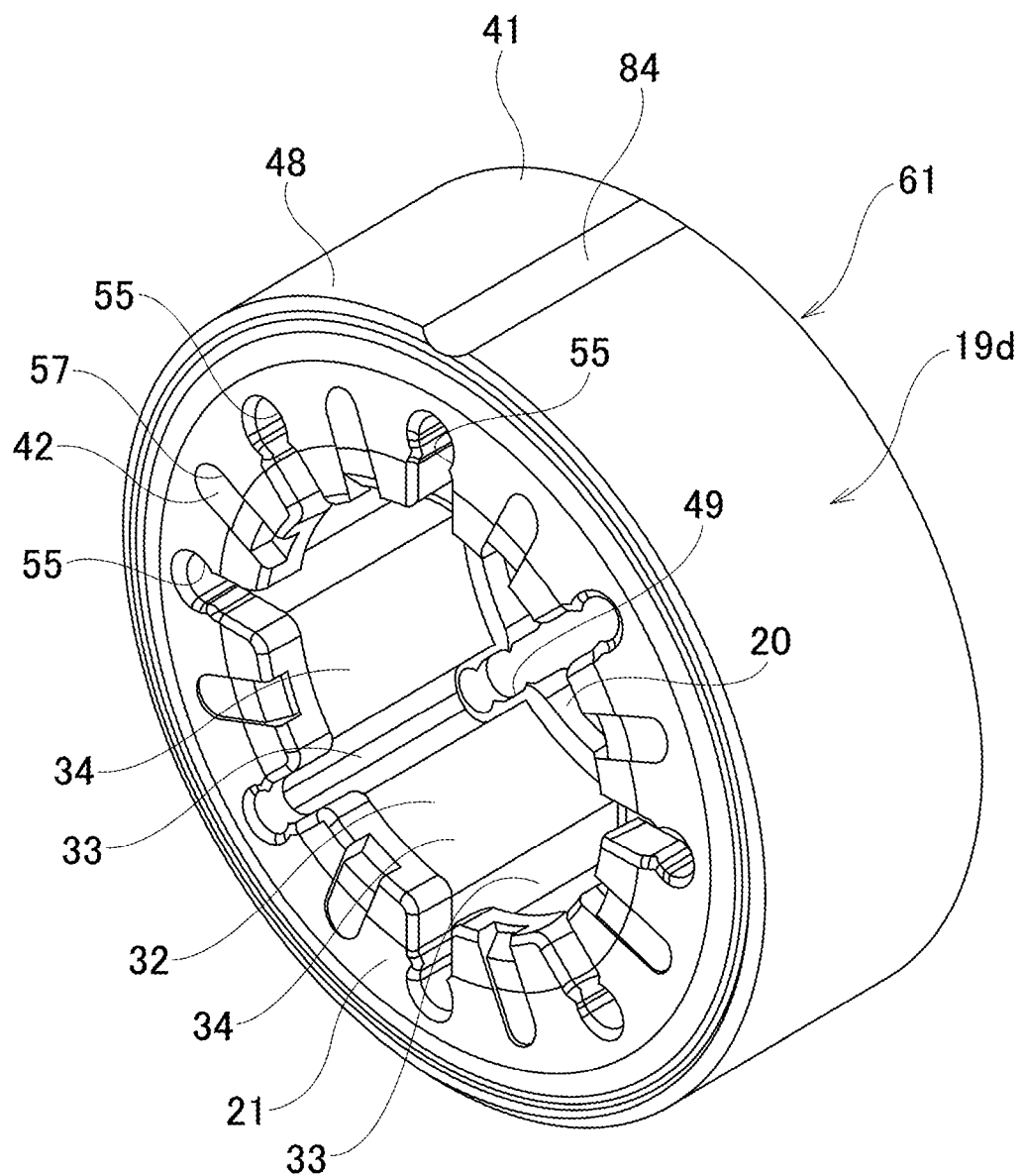
FIG. 47 is a perspective view of a combined body of an intermediate transmission member and the first transmission member (the second transmission member) of the tenth example of an embodiment of the present invention.
Figure 48:
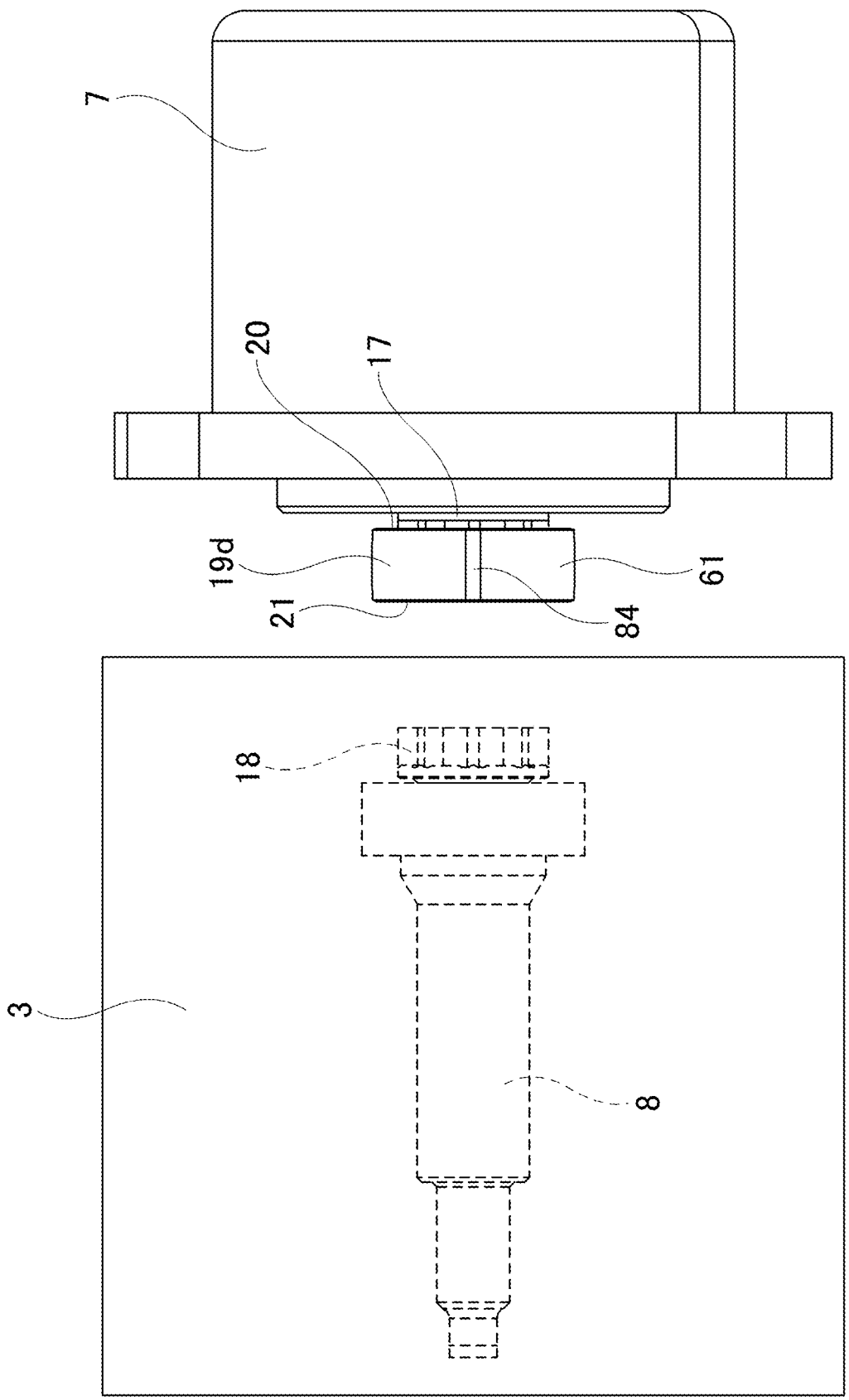
FIG. 48 is a figure illustrating a torque transmission joint in the middle of assembling to the place of use in relation to the tenth example.
Figure 49:
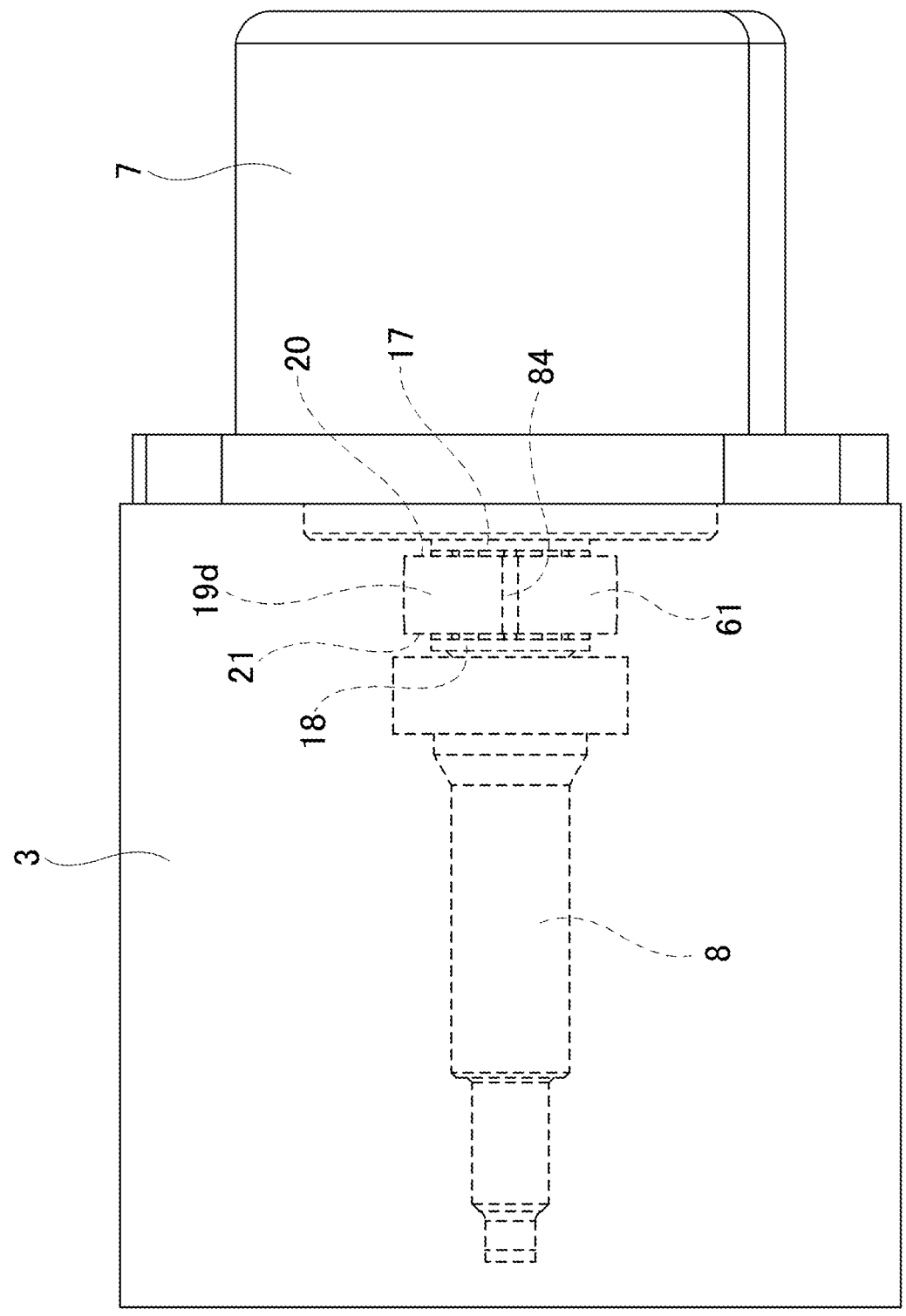
FIG. 49 is a figure illustrating a torque transmission joint in a state assembled to the place of use in relation to the tenth example.

The tenth example of an embodiment will be explained with reference to FIG. 47 to FIG. 49.

In the present example, a shape section for phase confirmation 84 is provided in one location in the circumferential direction of the outer circumference section of the intermediate transmission member 19*d*. The shape section for phase confirmation 84 is a section having a different shape with respect to a section adjacent in the circumferential direction of the outer circumference section of the intermediate transmission member 19*d*. In the present example, the shape section for phase confirmation 84 is a groove section that is formed over the entire length in the axial direction. Further, in the present example, the shape section for phase confirmation 84 and the concave portions 33 of the intermediate uneven section 32 (the first elastic slits 49 and the second elastic slits 55 in a state where the combined body 61 is assembled) are located in the same phase in the circumferential direction, however, the disposition phase in the circumferential direction of the shape section for phase confirmation 84 can be different from that of the present example.

In the construction of the present example, when assembling the torque transmission joint, the operator can comprehend the phase (the phase in the circumferential direction of the concave portions 33 and the convex portions 34 of the intermediate uneven section 32) in the circumferential direction of the intermediate transmission member 19*d* by touching the shape section for phase confirmation 84 with hands. Therefore, it is possible to facilitate the assembly operation of the torque transmission joint. For example, as illustrated in FIG. 48, the first transmission member 17 is fixed to the output shaft of the electric motor 7, the second transmission member 18 is fixed to the end section of the worm 8, and in a state where the first transmission member 17 is inserted to the inside in the radial direction of the combined body 61 of the intermediate transmission member 19*d*, the first elastic member 20 and the second elastic member 21, in the order as illustrated successively in FIG. 48 and FIG. 49, when inserting the second transmission member 18 inside in the radial direction of the combined body 61 inside the housing as well, the operator can comprehend the phase in the circumferential direction of the intermediate transmission member 19*d* by touching the shape section for phase confirmation 84 inside the housing 3. Meanwhile, the operator can comprehend the phase in the circumferential direction of the second transmission member 18 by touching the second uneven portion 26 inside the housing 3. Therefore, inside the housing 3, by aligning the phase in the circumferential direction of the intermediate transmission member 19*d* and the second transmission member 18, it is possible to easily perform operation of inserting the second transmission member 18 inside in the radial direction of the combined body 61.

Figure 50:
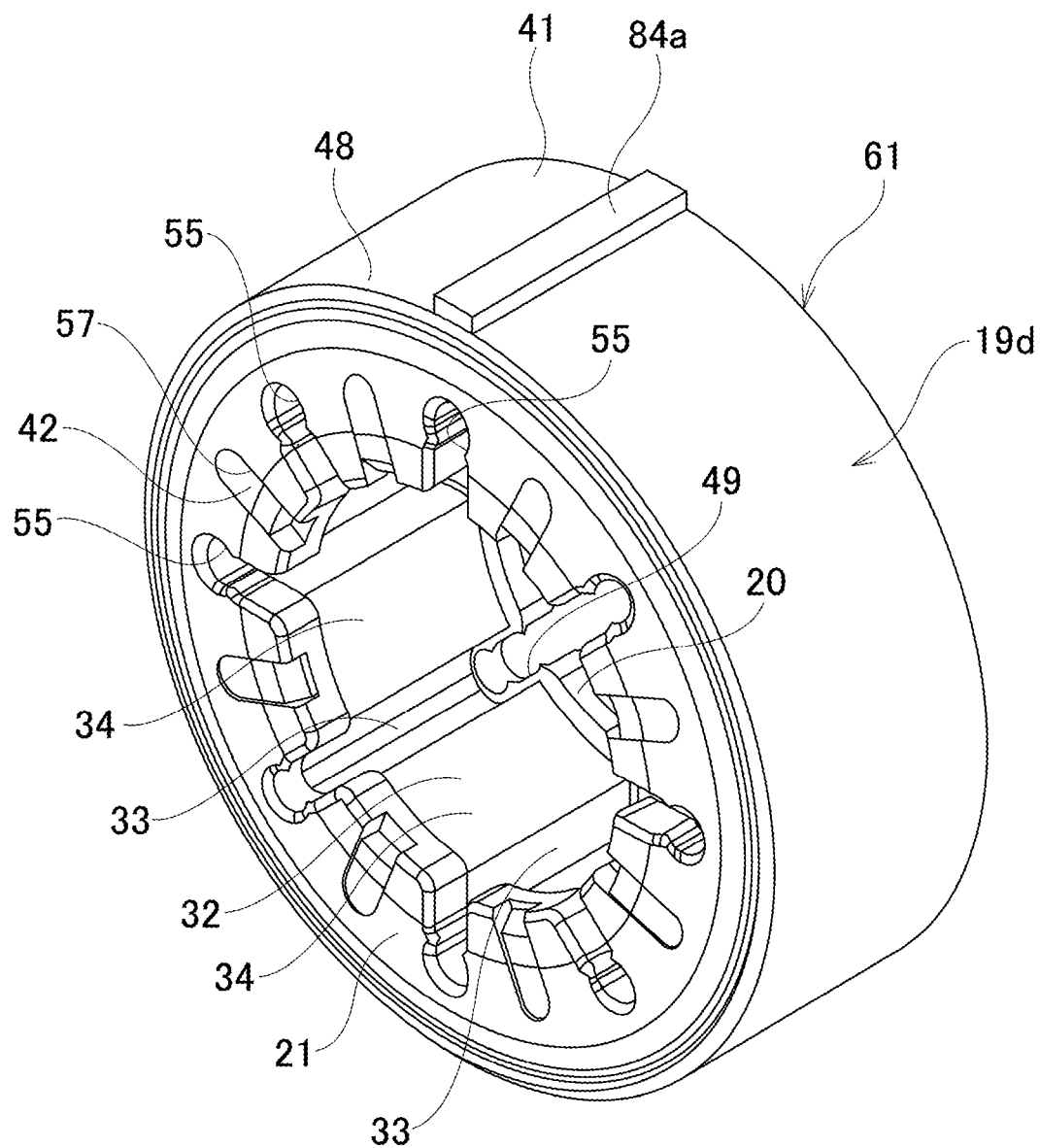
FIG. 50 is a figure similar to FIG. 47 which illustrates the first alternative example of the tenth example.
Figure 51:
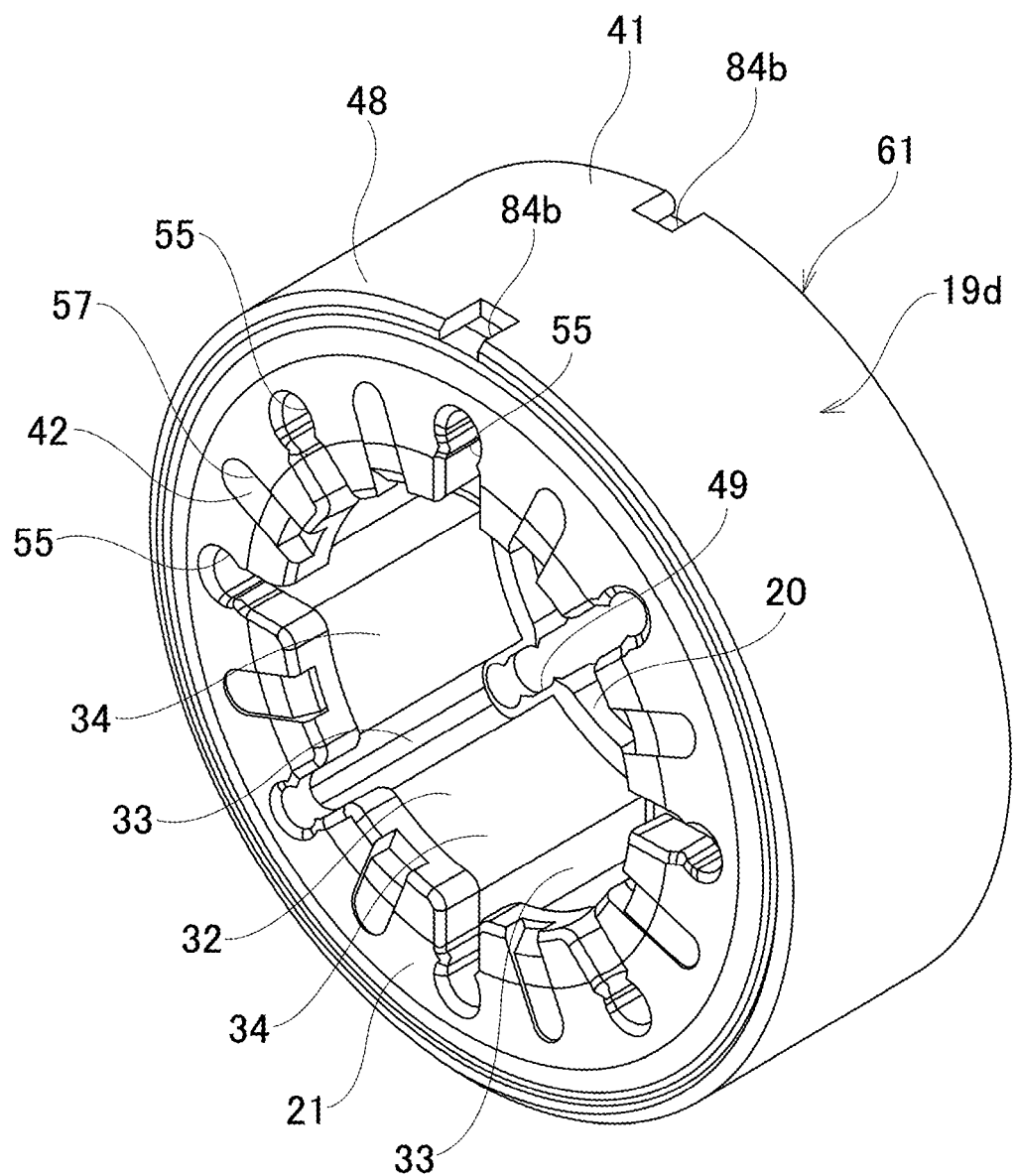
FIG. 51 is a figure similar to FIG. 47 which illustrates the second alternative example of the tenth example.

FIG. 50 and FIG. 51 illustrate alternative examples with respect to the present example. In the first alternative example illustrated in FIG. 50, the shape section for phase confirmation 84*a* is made as a protrusion which is formed over the entire length in the axial direction. In the second alternative example illustrated in FIG. 51, the shape section for phase confirmation 84*b* is made as notches that are opened outside in the axial direction and are provided in both end sections in the axial direction.

In case of embodying the present invention, for example, it is also possible to provide a shape section for phase confirmation 85 such as a notch that is opened outside in the radial direction such as illustrated with the virtual line in FIG. 13 (FIG. 14) on the perimeter edge section of the first flange section 25 of the first transmission member 17 (second flange section 29 of the second transmission member 18).

In case of embodying the present invention, the location, size, and shape of the shape section for phase confirmation that is provided on each member is not limited to the present example and its alternative examples but can be set arbitrarily. Further, the shape section for phase confirmation can also be provided at a plurality of places in the circumferential direction.

Other configurations and functions are the same as in the case of the first example.

In the present invention, it is possible to embody the constructions of the respective embodiments explained above (including the alternative examples) by suitably combining them to the extent that they do not contradict each other.

Further, in case of embodying the present invention, it is also possible to employ a construction where the outside in the radial direction corresponds to one side in the radial direction and the inside in the radial direction corresponds to the other side in the radial direction. That is, it is possible to employ a construction where the inside and outside in the radial direction with respect to the constructions of the respective embodiments explained above is reversed.

Further, in case of embodying the present invention, it is possible to employ a construction where, of the concave portion in the circumferential direction and the convex portion in the circumferential direction that engage with each other, a concave portion in the circumferential direction is provided in the elastic member and the convex portion in the circumferential direction is provided in the intermediate transmission member.

Further, in case of embodying the present invention, it is also possible to employ the constructions of the respective embodiments (including the constructions where these constructions are suitably combined) for either one of the both side sections (the one side section and the other side section) in the axial direction of the combined body of the intermediate transmission member and the couple of elastic members.

EXPLANATION OF REFERENCE NUMBERS

1 Steering wheel
2 Steering shaft
3 Housing

4 Worm wheel
5 Worm teeth
6, 6a Worm shaft
7 Electric motor
8 Worm
9a, 9b Rolling bearing
10 Pressure piece
11 Coil spring
12, 12a Output shaft
13 Spline hole
14 Spline shaft section
15 Biasing mechanism
16, 16a Torque transmission joint
17 First transmission member
18 Second transmission member
19, 19a-19d Intermediate transmission member
20, 20a-20e First elastic member
21, 21a-21e Second elastic member
22 First uneven portion
23 Concave portions
24 Convex portions
25 First flange section
26 Second uneven portion
27 Concave portions
28 Convex portions
29 Second flange section
30a, 30b Side surface for positioning
31 Body section
32, 32a Intermediate uneven section
33, 33a Concave portion
34, 34a Convex portion
35 First tooth section
36 Tilted side surface section
37 First engaging projection
38, 38a First annular concave portion
39, 39a Inner diameter side circumferential surface
40 Outer diameter side circumferential surface
41, 41a First cylindrical portion
42 Second tooth section
43 Tilted side surface section
44 Second engaging projection
45, 45a Second annular concave portion
46, 46a Inner diameter side circumferential surface
47 Outer diameter side circumferential surface
48, 48a Second cylindrical portion
49, 49a First elastic slits
50 Elastic protrusion
51 First through hole
52 First engaging beam
53 Tilted side surface section
54, 54a First annular convex portion
55, 55a Second elastic slits
56 Elastic protrusion
57 Second through-hole
58 Second engaging beam
59 Tilted side surface section
60, 60a Second annular convex portion
61 Combined body
62 First through-hole
63 First main convex portion
64 First notch
65 First sub convex portion
66 Second through-hole
67 Second main convex portion
68 Second notch
69 Second sub convex portion
70 First protruding section
71 First engaging concave portion
72 Second protruding section
73 Second engaging concave portion
74 First engaging slit
75 Second engaging slit
76 Flat section
77 Flat section
78, 78a, 78b, 78c, 78d Communication concave portion
79, 79 Ridge
80, 80a Inclined surface
81 First arc convex portion
82 Second arc convex portion
83 Ridge section
84, 84a, 84b Shape section for phase confirmation
85 Shape section for phase confirmation

What is claimed is:

1. A torque transmission joint comprising:
a combined body; and
a couple of end transmission members,
the combined body comprising:
an intermediate transmission member having an intermediate uneven section with concave portions and convex portions alternately arranged in a circumferential direction; and
a couple of elastic members made of elastic material, the elastic members respectively assembled to the intermediate transmission member at both sides in an axial direction of the combined body and respectively having elastic slits provided at a plurality of positions in the circumferential direction that are in a same phase with the concave portions of the intermediate uneven section, and every space in the circumferential direction of both side edges in the circumferential direction of the elastic slits being made smaller than every space in the circumferential direction of both side edges in the circumferential direction of the concave portions of the intermediate uneven section;
the couple of end transmission members respectively inserted and arranged in both side sections in the axial direction of the combined body and the couple of end transmission members respectively having an end uneven section with concave portions and convex portions alternately arranged in the circumferential direction; and
at each of the both side sections in the axial direction of the combined body, the convex portions of the end uneven section engaging with the elastic slits as well as engaging with the concave portions of the intermediate uneven section with a gap intervening in the circumferential direction therebetween; and
wherein in at least one of the both side sections in the axial direction of the combined body, the intermediate transmission member has a cylindrical portion that is provided at an outside portion in the axial direction of an outer end portion in the radial direction, and the elastic member is covered with the cylindrical portion.

2. The torque transmission joint according to claim 1, wherein in the at least one of the both side sections in the axial direction of the combined body, a side surface for positioning that contacts or closely faces an outside surface in the axial direction of the combined body is provided on the couple of end transmission members.

3. The torque transmission joint according to claim 1, wherein in the at least one of the both side sections in the axial direction of the combined body, the intermediate transmission member has a through-hole that is provided in the cylindrical portion so as to penetrate the cylindrical portion in the radial direction, and the elastic member has a main convex portion that engages with the through-hole.

4. The torque transmission joint according to claim 3, wherein in the at least one of the both side sections in the axial direction of the combined body, the intermediate transmission member has a notch that is opened to an outer edge in the axial direction of the cylindrical portion, and the elastic member has a sub convex portion that engages with the notch.

5. The torque transmission joint according to claim 1, wherein in the at least one of the both side sections in the axial direction of the combined body, the convex portion in the circumferential direction has a protruding section that protrudes in the radial direction in at least one place in the circumferential direction, and the concave portion in the circumferential direction has an engaging concave portion that is opened in the radial direction and the axial direction and engages with the protruding section.

6. The torque transmission joint according to claim 1, wherein in the at least one of the both side sections in the axial direction of the combined body, in at least one place in the circumferential direction of at least one circumferential surface of the circumferential surfaces of the concave portion in the circumferential direction and the circumferential surfaces of the convex portion in the circumferential direction, a communication concave portion that does not contact an opponent circumferential surface thereof that faces in the radial direction is provided over an entire length in the axial direction.

7. The torque transmission joint according to claim 6, wherein the communication concave portion is provided at a plurality of places in the circumferential direction of the at least one circumferential surface, and every width dimension in the circumferential direction of portions that are located between the communication concave portions that are adjacent in the circumferential direction is made smaller than every width dimension in the circumferential direction of the communication concave portions.

8. The torque transmission joint according to claim 1, wherein in the at least one of the both side sections in the axial direction of the combined body, the intermediate transmission member has a tooth section that protrudes in the axial direction in at least one place in the circumferential direction of an outside surface in the axial direction, and the elastic member has a section with material removed that engages at least in the circumferential direction with the tooth section.

9. The torque transmission joint according to claim 8, wherein in the at least one of the both side sections in the axial direction of the combined body, the intermediate transmission member has an engaging projection that protrudes from one side surface in the radial direction of the tooth section, and the elastic member engages with an inside surface in the axial direction of the engaging projection.

10. The torque transmission joint according to claim 1, wherein in the at least one of the both side sections in the axial direction of the combined body, every inner surface of the concave portions of the intermediate uneven section is inclined to a direction where a cross sectional area of the concave portion becomes larger toward an outside in the axial direction.

11. The torque transmission joint according to claim 1, wherein the concave portion in the circumferential direction and the convex portions in the circumferential direction are provided over a whole circumference.

12. The torque transmission joint according to claim 1, wherein the concave portion in the circumferential direction is provided over a whole circumference, and the convex portion in the circumferential direction is provided in a plurality of places that are arranged apart from one another in the circumferential direction.

13. The torque transmission joint according to claim 1, wherein a bottom end section in the axial direction of the concave portion in the circumferential direction and a tip end section in the axial direction of the convex portion in the circumferential direction are ultrasonically welded.

14. The torque transmission joint according to claim 1, wherein in the at least one of the both side sections in the axial direction of the combined body, a tilted side surface section is provided on an outside surface in the axial direction, in which the tilted side surface section is inclined inwards in the axial direction towards another side in the radial direction.

15. A torque transmission joint comprising:
a combined body; and
a couple of end transmission members,
the combined body comprising:
an intermediate transmission member having an intermediate uneven section with concave portions and convex portions alternately arranged in a circumferential direction; and
a couple of elastic members made of elastic material, the elastic members respectively assembled to the intermediate transmission member at both sides in an axial direction of the combined body and respectively having elastic slits provided at a plurality of positions in the circumferential direction that are in a same phase with the concave portions of the intermediate uneven section, and every space in the circumferential direction of both side edges in the circumferential direction of the elastic slits being made smaller than every space in the circumferential direction of both side edges in the circumferential direction of the concave portions of the intermediate uneven section;
the couple of end transmission members respectively inserted and arranged in both side sections in the axial direction of the combined body and the couple of end transmission members respectively having an end uneven section with concave portions and convex portions alternately arranged in the circumferential direction; and
at each of the both side sections in the axial direction of the combined body, the convex portions of the end uneven section engaging with the elastic slits as well as engaging with the concave portions of the intermediate uneven section with a gap intervening in the circumferential direction therebetween; and
in at least one of the both side sections in the axial direction of the combined body, the intermediate transmission member having a concave portion in the circumferential direction that is opened in the axial direction and extends in the circumferential direction, and one elastic member of the couple of elastic members having a convex portion in the circumferential direction that protrudes in the axial direction and extends in the circumferential direction, and the convex portion in the circumferential direction contacting to at least one circumferential surface of both circumferential surfaces in a radial direction of an inner surface of the concave portions in the circumferential direction elastically.

16. An electric-powered power steering apparatus, comprising:
a housing;

a worm wheel rotatably supported with respect to the housing;

a worm comprising: a worm shaft; and worm teeth provided in an outer circumferential surface of the worm shaft; the worm rotatably supported with respect to the housing in a state meshed with the worm wheel;

an electric motor having an output shaft for rotating and driving the worm; and a torque transmission joint connecting the output shaft of the electric motor and the worm shaft so as to enable torque transmission: wherein the torque transmission joint is constructed by the torque transmission joint according to claim 1; and one of the couple of end transmission members is fixed to or formed to be integral with a tip-end section of an output shaft of the electric motor, and another of the couple of end transmission members is fixed to or formed to be integral with a base-end section of the worm shaft.

17. The electric-powered power steering apparatus according to claim 16, wherein the couple of end transmission members respectively have a side surface for positioning, and a distance in the axial direction between the side surfaces for positioning of the couple of end transmission members is made to be larger than a width dimension in the axial direction of the combined body.

18. The torque transmission joint according to claim 15, wherein in the at least one of the both side sections in the axial direction of the combined body, the convex portion in the circumferential direction has a protruding section that protrudes in the radial direction in at least one place in the circumferential direction, and the concave portion in the circumferential direction has an engaging concave portion that is opened in the radial direction and the axial direction and engages with the protruding section.

19. The torque transmission joint according to claim 15, wherein in the at least one of the both side sections in the axial direction of the combined body, in at least one place in the circumferential direction of at least one circumferential surface of the circumferential surfaces of the concave portion in the circumferential direction and the circumferential surfaces of the convex portion in the circumferential direction, a communication concave portion that does not contact an opponent circumferential surface thereof that faces in the radial direction is provided over an entire length in the axial direction.

20. The torque transmission joint according to claim 19, wherein the communication concave portion is provided at a plurality of places in the circumferential direction of the at least one circumferential surface, and every width dimension in the circumferential direction of portions that are located between the communication concave portions that are adjacent in the circumferential direction is made smaller than every width dimension in the circumferential direction of the communication concave portions.

21. The torque transmission joint according to claim 15, wherein in the at least one of the both side sections in the axial direction of the combined body, the intermediate transmission member has a tooth section that protrudes in the axial direction in at least one place in the circumferential direction of an outside surface in the axial direction, and the elastic member has a section with material removed that engages at least in the circumferential direction with the tooth section.

22. The torque transmission joint according to claim 21, wherein in the at least one of the both side sections in the axial direction of the combined body, the intermediate transmission member has an engaging projection that protrudes from one side surface in the radial direction of the tooth section, and the elastic member engages with an inside surface in the axial direction of the engaging projection.

23. The torque transmission joint according to claim 15, wherein in the at least one of the both side sections in the axial direction of the combined body, every inner surface of the concave portions of the intermediate uneven section is inclined to a direction where a cross sectional area of the concave portion becomes larger toward an outside in the axial direction.

24. The torque transmission joint according to claim 15, wherein the concave portion in the circumferential direction and the convex portions in the circumferential direction are provided over a whole circumference.

25. The torque transmission joint according to claim 15, wherein the concave portion in the circumferential direction is provided over a whole circumference, and the convex portion in the circumferential direction is provided in a plurality of places that are arranged apart from one another in the circumferential direction.

26. The torque transmission joint according to claim 15, wherein a bottom end section in the axial direction of the concave portion in the circumferential direction and a tip end section in the axial direction of the convex portion in the circumferential direction are ultrasonically welded.

27. The torque transmission joint according to claim 15, wherein in the at least one of the both side sections in the axial direction of the combined body, a tilted side surface section is provided on an outside surface in the axial direction, in which the tilted side surface section is inclined inwards in the axial direction towards another side in the radial direction.

28. The torque transmission joint according to claim 15, wherein in the at least one of the both side sections in the axial direction of the combined body, a side surface for positioning that contacts or closely faces an outside surface in the axial direction of the combined body is provided on the couple of end transmission members.

* * * * *